United States Patent
Jung et al.

(10) Patent No.: US 11,432,131 B2
(45) Date of Patent: Aug. 30, 2022

(54) METHOD AND DEVICE FOR PERFORMING COMMUNICATION IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Anil Agiwal, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/278,469

(22) PCT Filed: Sep. 20, 2019

(86) PCT No.: PCT/KR2019/012239
§ 371 (c)(1),
(2) Date: Mar. 22, 2021

(87) PCT Pub. No.: WO2020/060289
PCT Pub. Date: Mar. 26, 2020

(65) Prior Publication Data
US 2022/0038878 A1    Feb. 3, 2022

(30) Foreign Application Priority Data

Sep. 21, 2018  (KR) .................. 10-2018-0114385
Feb. 14, 2019  (KR) .................. 10-2019-0017148

(51) Int. Cl.
*H04W 4/40*    (2018.01)
*H04W 4/90*    (2018.01)
(Continued)

(52) U.S. Cl.
CPC ............. *H04W 4/90* (2018.02); *H04W 4/021* (2013.01); *H04W 4/14* (2013.01); *H04W 4/40* (2018.02);
(Continued)

(58) Field of Classification Search
CPC ......... H04W 4/90; H04W 4/021; H04W 4/14; H04W 4/40; H04W 56/001; H04W 68/005; H04W 76/14; H04W 76/27; H04W 76/18
See application file for complete search history.

(56) References Cited

U.S. PATENT DOCUMENTS

2005/0073438 A1* 4/2005 Rodgers ................ G08G 1/161
                                                   340/944
2018/0090005 A1  3/2018 Philosof et al.
(Continued)

FOREIGN PATENT DOCUMENTS

EP    1 791 101 A1   5/2007
EP    3 349 514 B1   5/2020
(Continued)

OTHER PUBLICATIONS

International Search Report with Written Opinion and English translation dated Jan. 2, 2020; International Appln. No. PCT/KR2019/012239.
(Continued)

*Primary Examiner* — Marcus Hammonds
(74) *Attorney, Agent, or Firm* — Jefferson IP Law, LLP

(57) ABSTRACT

The present disclosure relates to a method and device by which a terminal performs communication in a wireless communication system. The terminal according to an embodiment of the present disclosure may receive risk area information from a base station, when it is determined, based on the risk area information, that the terminal is (Continued)

located in a risk area, obtain pedestrian-to-vehicle (P2V) data, and transmit the P2V data, on a resource allocated to the terminal by the base station.

14 Claims, 28 Drawing Sheets

(51) Int. Cl.
  *H04W 4/021* (2018.01)
  *H04W 4/14* (2009.01)
  *H04W 56/00* (2009.01)
  *H04W 68/00* (2009.01)

(52) U.S. Cl.
  CPC ....... *H04W 56/001* (2013.01); *H04W 68/005* (2013.01)

(56) References Cited

U.S. PATENT DOCUMENTS

| | | | | |
|---|---|---|---|---|
| 2018/0302768 | A1* | 10/2018 | Uchiyama | H04W 52/0216 |
| 2018/0310147 | A1* | 10/2018 | Kim | H04W 68/005 |
| 2019/0222983 | A1* | 7/2019 | Adachi | H04W 8/005 |
| 2020/0178113 | A1 | 6/2020 | Jin et al. | |
| 2020/0260496 | A1 | 8/2020 | Jin et al. | |
| 2020/0296678 | A1 | 9/2020 | Zhang et al. | |
| 2020/0296690 | A1 | 9/2020 | Lee et al. | |
| 2021/0297841 | A1* | 9/2021 | Jung | H04W 68/005 |

FOREIGN PATENT DOCUMENTS

| | | |
|---|---|---|
| JP | 2018-050101 A | 3/2018 |
| KR | 10-2018-0102110 A | 9/2018 |
| KR | 10-2018-0133194 A | 12/2018 |
| KR | 10-2019-0036251 A | 4/2019 |
| WO | 2017/041516 A1 | 3/2017 |
| WO | 2017/080706 A1 | 5/2017 |
| WO | 2017/134986 A1 | 8/2017 |
| WO | 2017/150958 A1 | 9/2017 |

OTHER PUBLICATIONS

ESA; Use case on Vulnerable Road User (5G_HYPOS); 3GPP TSG-SA WG1 Meeting #80; S1-174365 (revision of S1-174311); XP 51379023 A; Nov. 27-Dec. 1, 2017; Reno, Nevada.
European Search Report dated Sep. 2, 2021; European Appln. No. 19863859.5-1231 / 3840521 PCT/KR2019012239.

* cited by examiner

FIG. 1E
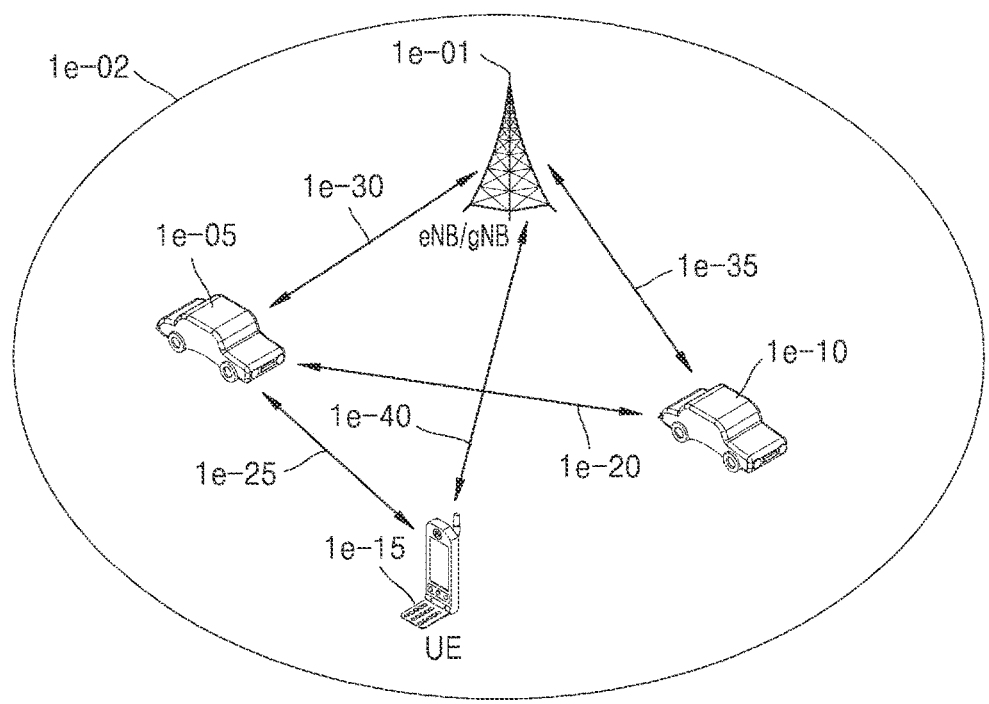
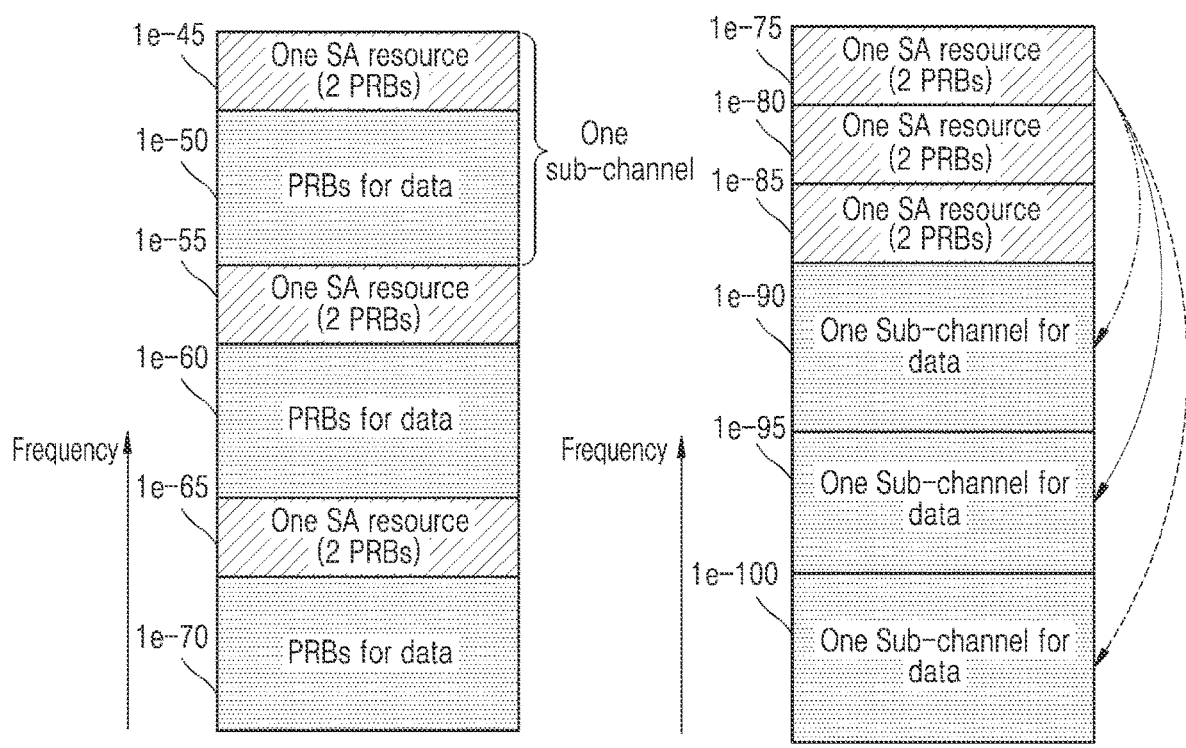

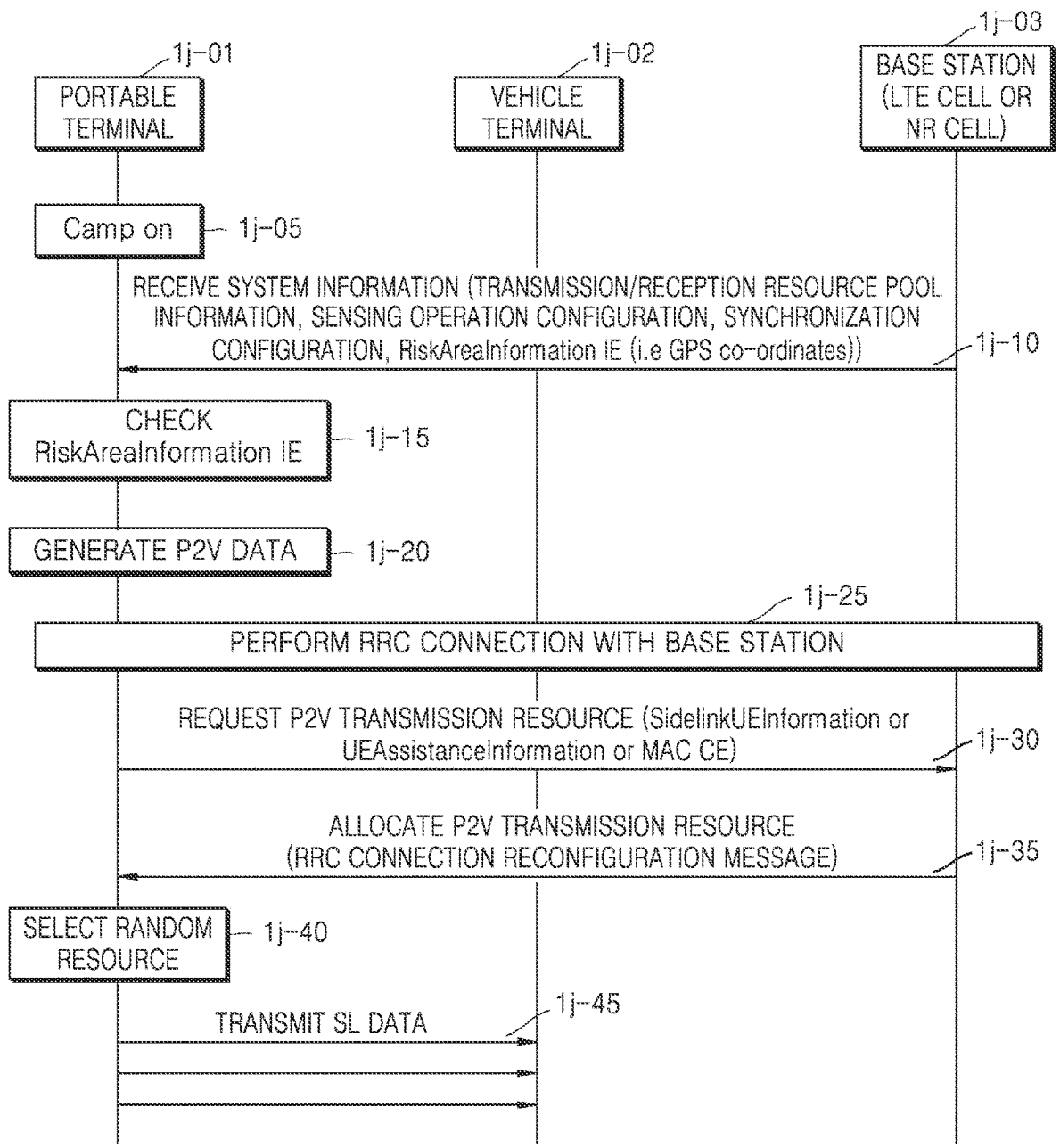

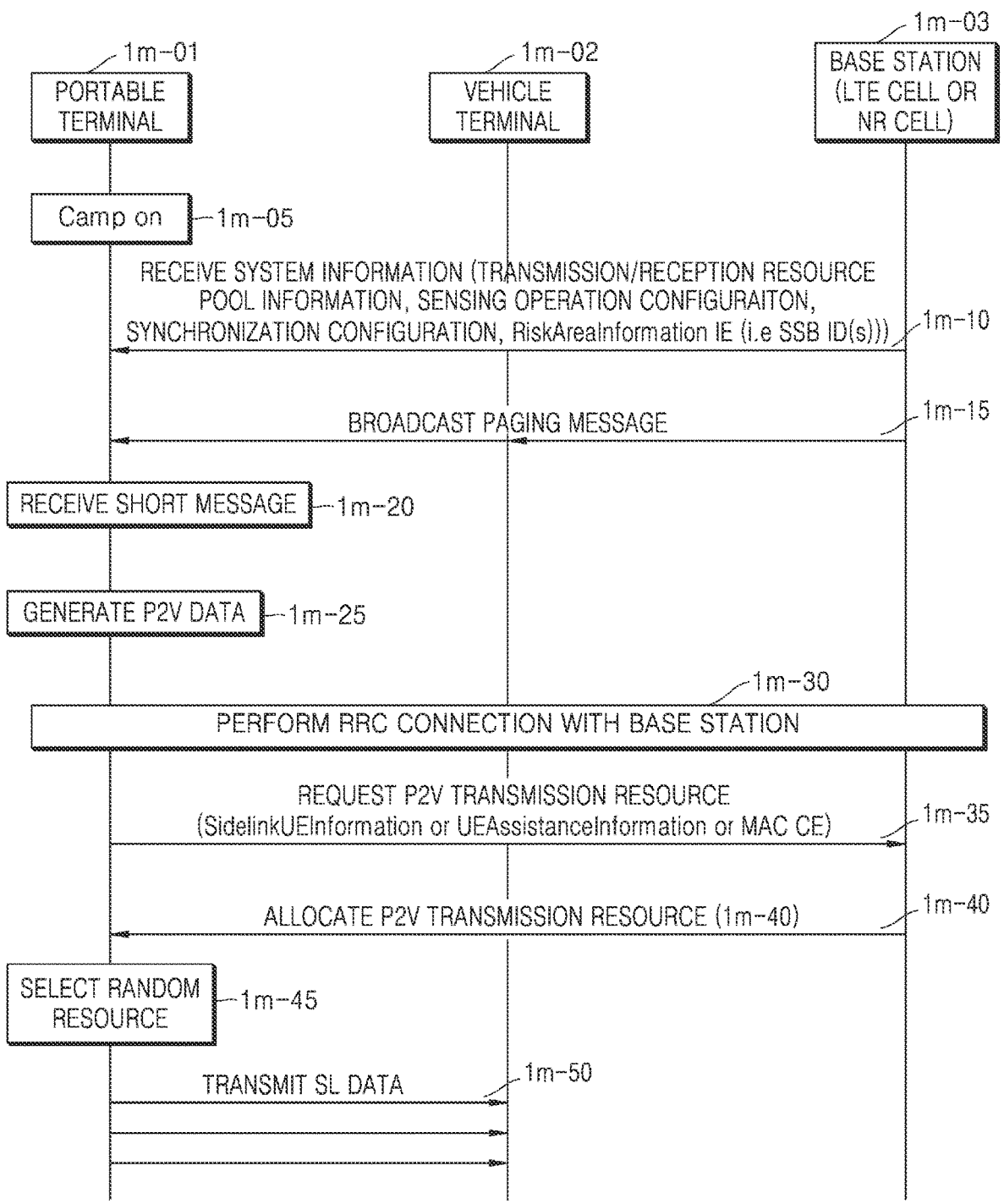

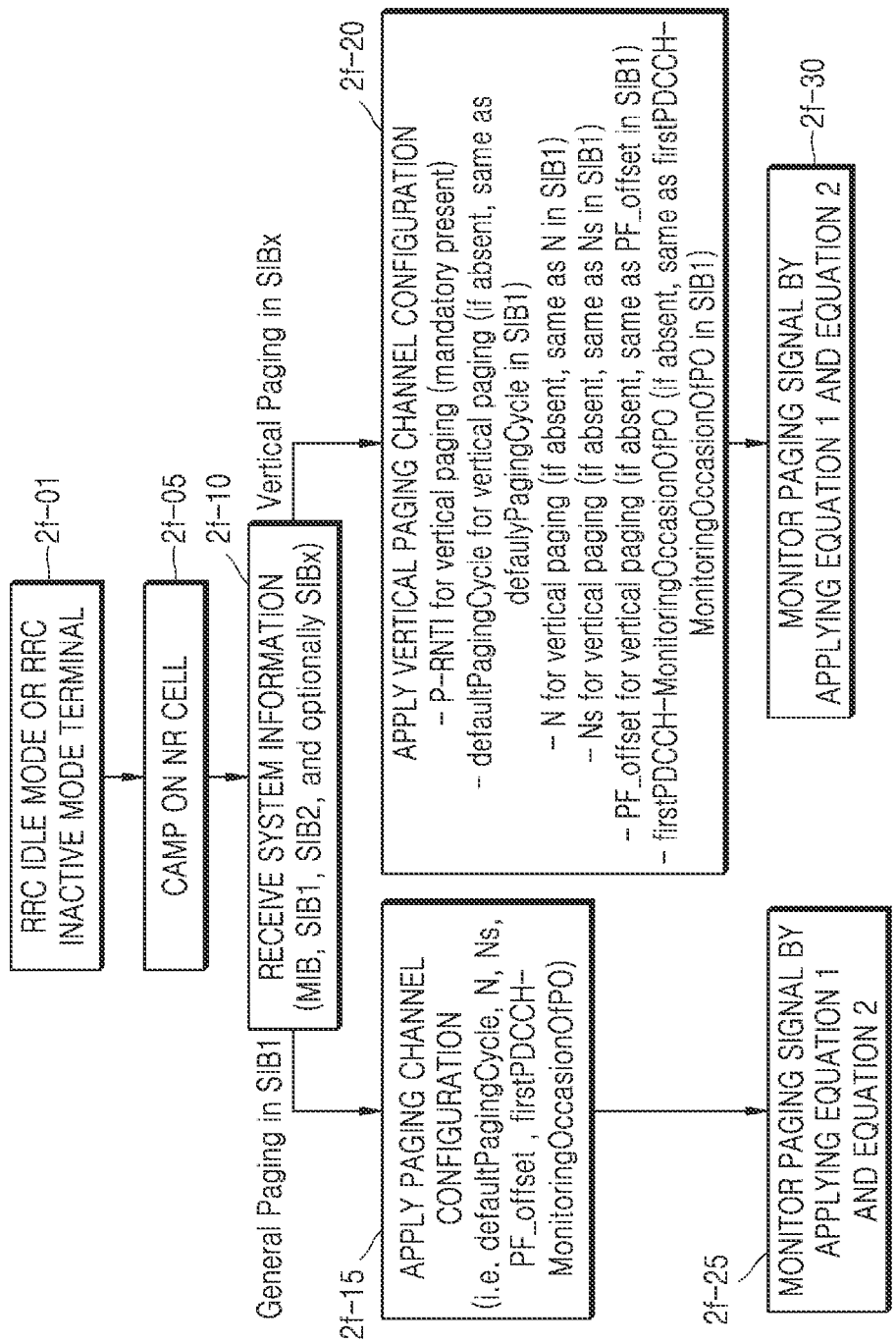

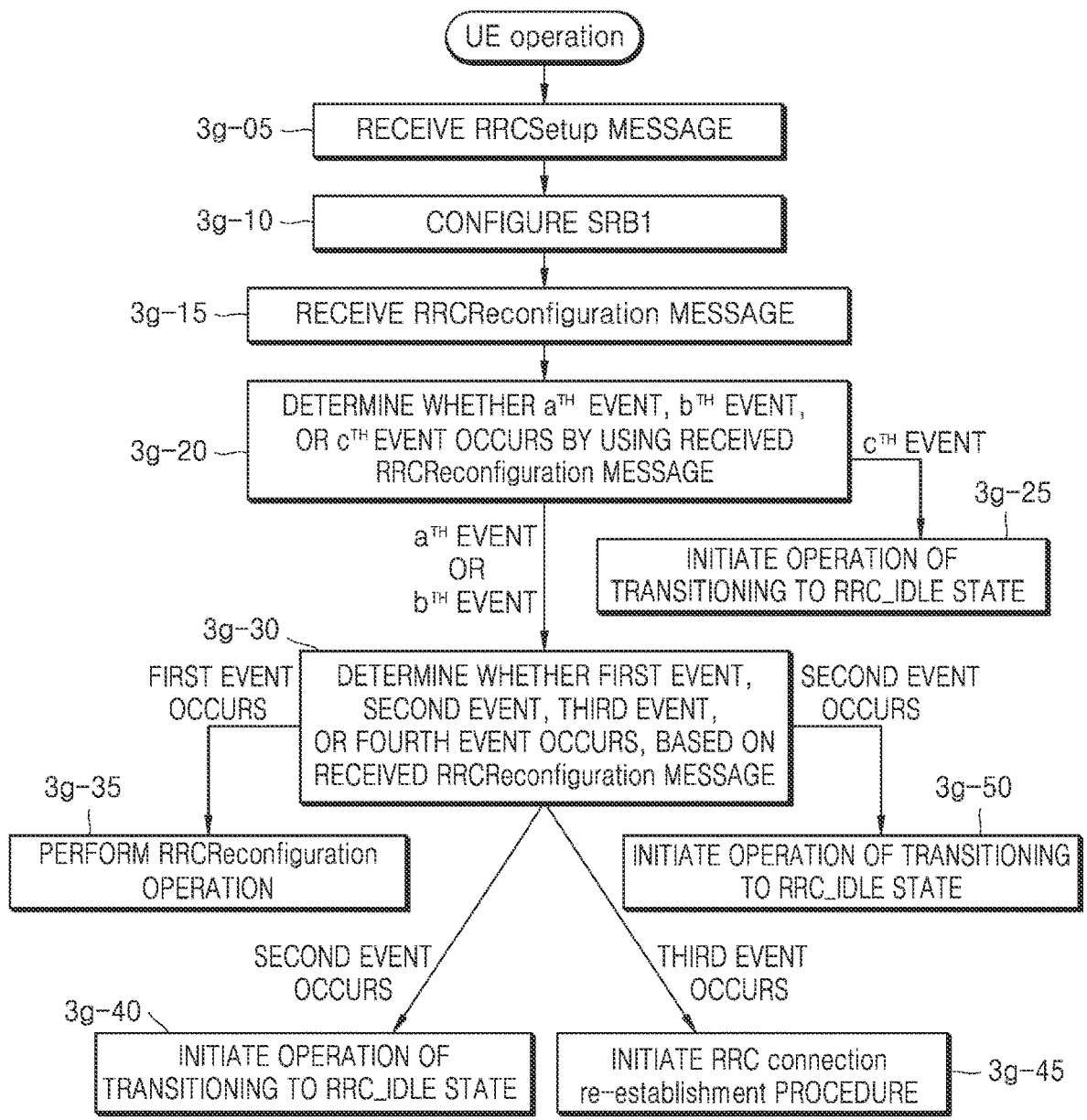

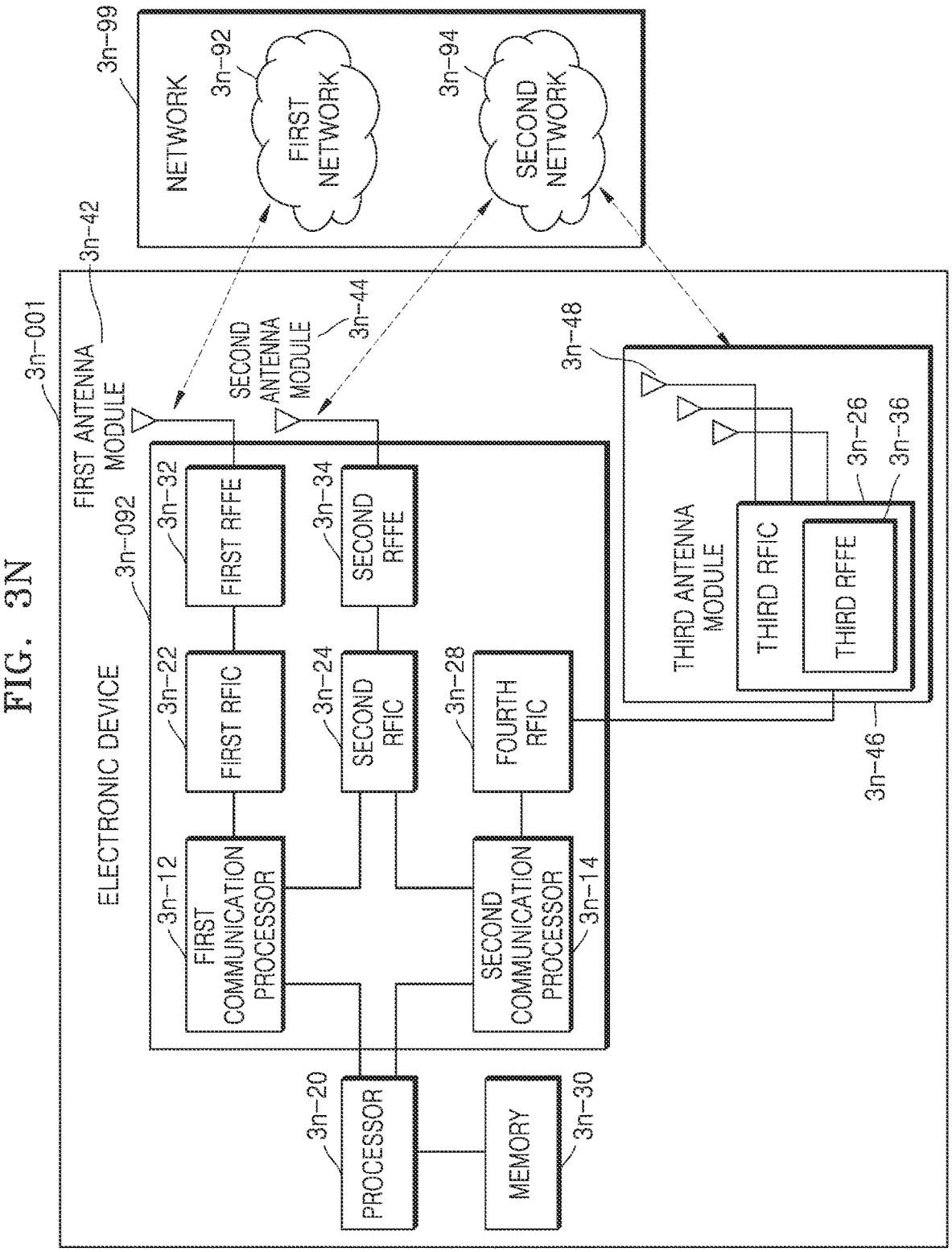

METHOD AND DEVICE FOR PERFORMING COMMUNICATION IN WIRELESS COMMUNICATION SYSTEM

TECHNICAL FIELD

The present disclosure relates to a wireless communication system, and more particularly, to a method and device for performing communication between a vehicle terminal and a pedestrian terminal in a wireless communication system. Also, the present disclosure relates to a method by which a terminal and a base station control radio resource control (RRC) connection according to a radio bearer configuration of the terminal.

BACKGROUND ART

In order to meet the increasing demand with respect to wireless data traffic after the commercialization of 4th generation (4G) communication systems, efforts have been made to develop improved 5th generation (5G) communication systems (e.g., new radio (NR) systems). In order to achieve a high data rate, 5G communication systems have been designed to operate in millimeter wave (mmW) frequency bands (e.g., 28 GHz bands). In order to reduce propagation path loss of radio waves and increase a propagation distance of radio waves in millimeter wave frequency bands, in 5G communication systems, technologies such as beamforming, massive multiple-input multiple-output (MIMO), full dimensional MIMO (FD-MIMO), array antenna, analog beamforming, and large scale antenna are being discussed. In 5G communication systems, unlike LTE, various subcarrier spacings (SCS) including 15 kHz, 30 kHz, 60 kHz, and 120 kHz are supported, and physical control channels use polar coding and physical data channels uses low density parity check (LDPC). Additionally, not only discrete Fourier transform spread orthogonal frequency division multiplexing (DFT-S-OFDM) but also cyclic prefix OFDM (CP-OFDM) are used as a waveform for uplink transmission. While LTE supports hybrid ARQ (HARQ) retransmission in units of transport blocks (TBs), 5G may additionally support HARQ retransmission based on a code block group (CBG) composed of multiple code blocks (CBs).

Also, in order to improve networks of systems, in 5G communication systems, technologies such as evolved small cell, advanced small cell, cloud radio access network (cloud RAN), ultra-dense network, device-to-device (D2D) communication, wireless backhaul, vehicle-to-everything (V2X) network, cooperative communication, coordinated multi-points (CoMP), and interference cancellation are being developed.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 3eG technology and IoT technology. A plurality of services may be provided to users in the above-described communication systems, and a method capable of providing different services within the same time period based on characteristics of the services and a device using the method are required to provide the plurality of services to the users. Various services provided by 5G communication systems are being studied, and one of the services is a service that satisfies requirements of low latency and high reliability. Such a service is called ultra-reliable low-latency communication (URLLC). As another example, vehicle-to-everything (V2X) is a generic term for all types of communication applicable to vehicles, and refers to a specific communication technology for implementing a 'connected vehicle' or a 'networked vehicle'. V2X networking is commonly divided into three types, i.e., vehicle-to-infrastructure (V2I) communication, vehicle-to-vehicle (V2V) communication, and vehicle-to-pedestrian (V2P) communication.

As various services may be provided due to the development of wireless communication systems as described above, a method capable of smoothly providing such services is required.

DESCRIPTION OF EMBODIMENTS

Technical Problem

An embodiment of the present disclosure provides a method of efficiently performing communication between a pedestrian terminal and a vehicle terminal in a wireless communication system. Also, another embodiment of the present disclosure provides a method by which a vehicle terminal efficiently performs paging according to characteristics of services in a wireless communication system.

An embodiment of the present disclosure provides a method by which, when only a signaling radio bearer 1 (SRB1) and a data radio bearer (DRB) are established (i.e., a signaling radio bearer 2 (SRB2) is not established) and security is activated in a terminal that is in a radio resource control (RRC) connected mode, the terminal receives an RRC connection reconfiguration message from a base station, and a reconfiguration failure occurs.

The terminal performs an RRC re-establishment procedure without immediately transitioning to an RRC idle mode.

Also, an embodiment of the present disclosure provides a method by which when only an SRB1 and a DRB are established and security is activated in a terminal that is in an RRC connected mode, and a handover related indicator (ReconfigurationWithSync) is included in an RRC connection reconfiguration message received from a base station, the terminal performs a normal RRC connection reconfiguration procedure with the base station.

Also, according to an embodiment of the present disclosure, when only an SRB1 and a DRB are established in a terminal that is in an RRC connected mode, a base station may indicate the terminal to transition to an inactive mode by transmitting an RRC connection release message including suspendConfig to the terminal.

Also, according to an embodiment of the present disclosure, even when only an SRB1 and a DRB are established, a terminal may be in an RRC inactive mode, and may perform a normal RRC connection resume procedure.

Also, according to an embodiment of the present disclosure, when only an SRB1 and a DRB are established in a terminal that is in an RRC connected mode and an integrity check failure occurs, an RRC connection re-establishment procedure may be performed. When only an SRB1 is established in a terminal that is in an RRC connected mode, the terminal may transmit minimization of drive test (MDT)-related information to a base station through the SRB1.

Solution to Problem

The present disclosure relates to a method and device by which a terminal performs communication in a wireless communication system. When a terminal according to an embodiment of the present disclosure receives risk area information from a base station and it is determined, based on the risk area information, that the terminal is located in a risk area, the terminal may obtain pedestrian-to-vehicle (P2V) data and may transmit the P2V data on a resource allocated to the terminal by the base station.

Advantageous Effects of Disclosure

According to the present disclosure, in a wireless communication system, a vehicle terminal or a pedestrian terminal may perform communication while efficiently using power.

According to the present disclosure, even when radio resource control (RRC) reconfiguration fails, if only a signaling radio bearer 1 (SRB1) and a data radio bearer (DRB) are established and security is activated in a terminal that is in an RRC connection state, signaling overhead may be reduced through an RRC re-establishment procedure and rapid connection may be performed. Also, according to the present disclosure, when only an SRB1 and a DRB are established and security is activated in a terminal that is in an RRC connection state, and a handover related indicator is included in an RRC connection reconfiguration message, the terminal may perform data transmission/reception with a target cell by maintaining an RRC connected mode without transitioning to an RRC idle mode.

Also, according to the present disclosure, even when only an SRB1 and a DRB are established in a terminal that is in an RRC connection state, the terminal may transition to an inactive mode, thereby reducing signaling overhead through an RRC connection resume procedure and performing rapid data transmission/reception. Also, according to the present disclosure, when only an SRB1 and a DRB are established in a terminal that is in an RRC connected mode and an integrity check failure occurs, an RRC connection re-establishment procedure may be performed, thereby making it possible for the terminal to maintain RRC connection with a base station.

Also, according to the present disclosure, a terminal that is in an RRC connected mode by establishing only an SRB1 may transmit minimization of drive test (MDT)-related information to a base station through the SRB1. That is, the terminal may transmit the MDT-related information to the base station without establishing a signaling radio bearer 2 (SRB2) or newly performing an RRC connection re-establishment procedure, thereby making it possible for the terminal to more rapidly receive the MDT-related information.

BRIEF DESCRIPTION OF DRAWINGS

FIG. 1E is a diagram for describing vehicle-to-everything (V2X) communication in a mobile communication system according to an embodiment of the present disclosure.

FIG. 1J is a diagram for describing a method by which a pedestrian terminal performs transmission/reception of a V2P signal with the help of a base station/vehicle terminal to reduce power consumption of the pedestrian terminal in V2P communication, according to an embodiment of the present disclosure.

FIG. 1M is a diagram for describing a method by which a pedestrian terminal performs transmission/reception of a V2P signal with the help of a base station/vehicle terminal to reduce power consumption of the pedestrian terminal in V2P communication, according to an embodiment of the present disclosure.

FIG. 2F is a diagram for describing a method by which an RRC idle mode or RRC inactive mode terminal monitors a general paging signal or a vertical paging signal in a next generation mobile communication system, according to an embodiment of the present disclosure.

FIG. 2I is a block diagram illustrating a structure of a base station according to an embodiment of the present disclosure.

FIG. 3G is a flowchart of a UE operation according to a condition in which a radio bearer configuration is indicated, when a terminal in an RRC connected mode (RRC_CONNECTED) receives an RRCReconfiguration message from a base station, according to an embodiment of the present disclosure.

FIG. 3N is a block diagram of an electronic device for supporting legacy network communication and 5th generation (5G) network communication, according to an embodiment of the present disclosure.

BEST MODE

Figure 1A:
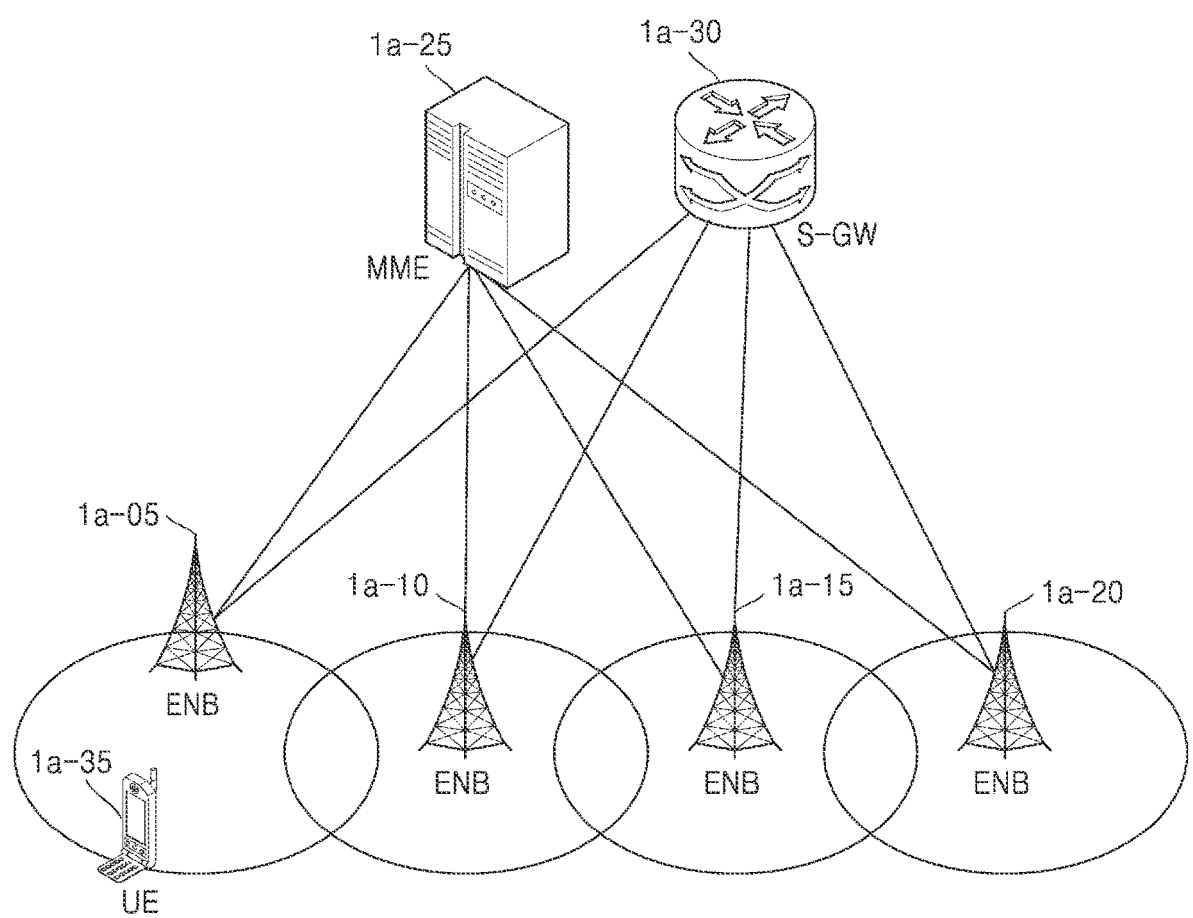
FIG. 1A is a diagram illustrating a structure of a long term evolution (LTE) system according to an embodiment of the present disclosure.

A method by which a terminal performs communication in a wireless communication system according to an embodiment may include: receiving risk area information from a base station; when it is determined, based on the risk area information, that the terminal is located in a risk area, obtaining pedestrian-to-vehicle (P2V) data; and transmitting the P2V data, on a resource allocated to the terminal by the base station.

The risk area information may be information indicating whether the terminal is located in the risk area.

The risk area information may include location information of the risk area, wherein the method further includes determining whether the terminal is located in the risk area, by comparing the location information of the risk area with location information of the terminal.

The risk area information may include synchronization signal block (SSB) identification information corresponding to the risk area, wherein the method further includes: performing SSB measurement; identifying an SSB in which an intensity of a received signal exceeds a threshold value, based on the SSB measurement; and determining whether the terminal is located in the risk area, by comparing the identified SSB with SSB identification information corresponding to the risk area.

The receiving of the risk area information may include receiving the risk area information through at least one of system information, a paging signal, and a short message.

The receiving of the risk area information may include: identification information on an SSB corresponding to the risk area from the system information or the paging signal; and receiving a short message indicating that the terminal is located in the risk area in an area covered by the SSB corresponding to the risk area.

A method by which a base station performs communication in a wireless communication system according to an embodiments may include: transmitting risk area information; receiving a P2V transmission resource allocation request from a terminal identified, based on the risk area information, to be located in a risk area; and allocating a P2V transmission resource to the terminal, based on the P2V transmission resource allocation request.

The transmitting of the risk area information may include transmitting the risk area information through at least one of a paging signal and a short message to a cover area of an SSB corresponding to the risk area.

A terminal for performing communication in a wireless communication system according to an embodiment may include: a transceiver; and a processor connected to the transceiver, wherein the processor is configured to control the transceiver to receive risk area information from a base station, when it is determined, based on the risk area information, that the terminal is located in a risk area, obtain pedestrian-to-vehicle (P2V) data, and control the transceiver to transmit the P2V data, on a resource allocated to the terminal by the base station.

A base station for performing communication in a wireless communication system may include: a transceiver; and a processor connected to the transceiver, wherein the processor is configured to control the transceiver to transmit risk area information, and receive a P2V transmission resource allocation request from a terminal identified, based on the risk area information, to be located in a risk area, and allocate a P2V transmission resource to the terminal, based on the P2V transmission resource allocation request.

MODE OF DISCLOSURE

Hereinafter, embodiments of the present disclosure will be described in detail with reference to the attached drawings. While describing the present disclosure, detailed descriptions of related well-known functions or configurations that may blur the points of the present disclosure are omitted. The terms used herein are those defined in consideration of functions in the present disclosure, but the terms may vary according to the intention of users or operators, precedents, etc. Therefore, the terms used herein have to be defined based on the meaning of the terms together with the description throughout the specification.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). Because these computer program instructions may also be stored in a computer usable or computer-readable memory that may direct a computer or other programmable data processing apparatus to function in a particular manner, the instructions stored in the computer usable or computer-readable memory may produce an article of manufacture including instruction means that implement the functions specified in the flowchart block(s). Because the computer program instructions may also be loaded onto a computer or other programmable data processing apparatus, a series of operational steps may be performed on the computer or other programmable apparatus to produce a computer implemented process, and thus the instructions executed on the computer or other programmable apparatus may provide steps for implementing the functions specified in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

The term "~ unit" used in the present embodiment refers to a software or hardware component, such as a field-programmable gate array (FPGA) or an application-specific integrated circuit (ASIC), which performs certain tasks. However, "~ unit" does not mean to be limited to software or hardware. The term "~ unit" may be configured to be in an addressable storage medium or configured to operate one or more processors. Thus, "~ unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units" or further separated into additional components and "~ units". Furthermore, components and "~ units" may be implemented to operate one or more central processors (CPUs) in a device or a secure multimedia card. Also, a unit in an embodiment may include one or more processors.

In the present disclosure, a downlink (DL) refers to a wireless transmission path of a signal that a base station transmits to a terminal, and an uplink (UL) refers to a wireless transmission path of a signal that the terminal transmits to the base station. Hereinafter, although a long term evolution (LTE) or LTE-advanced (LTE-A) system is described in an embodiment of the present disclosure, the embodiment of the present disclosure may be applied to other communication systems having a similar technical background or channel type. For example, other communication systems to which an embodiment of the present disclosure may be applied may include 5G mobile communication technology (5G, new radio (NR), etc.) developed after LTE-A, and 5G below may be a concept including existing LTE, LTE-A, and other similar services. The present disclosure may also be applied to other communication systems through some modifications without departing from the scope of the present disclosure based on determination by one of ordinary skill in the art.

Hereinafter, terms indicating a connection node, terms indicating network entities, terms indicating messages, terms indicating an interface between network entities, and terms indicating various pieces of identification information used herein are exemplified for convenience of explanation. Accordingly, the present disclosure is not limited to the terms to be described below, but other terms indicating objects having equal technical meanings may be used.

Hereinafter, some terms and names defined in the 3rd generation partnership project long term evolution (3GPP LTE) standard may be used for convenience of explanation. However, the present disclosure may not be limited to the terms and names, and may also be applied to systems following other standards.

Hereinafter, a base station is an entity performing resource allocation for a terminal and may include at least one of a gNode B, an eNode B, a Node B, a base station (BS), a radio access unit, a base station controller, and a node on a network. A terminal may include a user equipment (UE), a mobile station (MS), a cellular phone, a smartphone, a computer, or a multimedia system capable of performing a communication function. However, the present disclosure is not limited to the above examples.

In particular, the present disclosure may be applied to 3GPP NR (5G mobile communication standard). Also, the present disclosure may be applied to intelligent services based on 5G communication technology and Internet of Things (IoT)-related technology (e.g., smart home, smart building, smart city, smart car or connected car, health care, digital education, retail business, security, and safety-related services). In the present disclosure, an evolved node B (eNB) may be interchangeably used with a next generation node B (gNB) for convenience of explanation. That is, a base station described as an eNB may refer to a gNB. Also, the term "terminal" may refer to other wireless communication devices as well as mobile phones, NB-IoT devices, and sensors.

A wireless communication system has developed beyond the initially provided voice-based service into a broadband wireless communication system that provides a high speed and high quality packet data service, using communication standards such as high-speed packet access (HSPA) of 3rd generation partnership project (3GPP), long term evolution (LTE) or evolved universal terrestrial radio access (E-UTRA), LTE-advanced (LTE-A), LTE-Pro, high-rate packet data (HRPD) of 3GPP2, ultra-mobile broadband (UMB), and 802.16e of Institute of Electrical and Electronics Engineers (IEEE).

An LTE system, which is a representative example of a broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which a terminal (e.g., a user equipment (UE) or a mobile station (MS)) transmits data or a control signal to a base station (e.g., an eNode B), and the downlink is a radio link through which the base station transmits data or a control signal to the terminal. In the multi-access scheme described above, time-frequency resources for carrying data or control information are allocated and operated in a manner to prevent overlapping of the resources, i.e., to establish orthogonality between users so as to identify data or control information of each user.

As future communication systems after LTE, 5G communication systems should be able to freely reflect requirements of users and service providers, and thus services simultaneously satisfying the various requirements should be supported. Services considered for 5G communication systems include enhanced mobile broadband (eMBB), massive machine type communication (mMTC), and ultra-reliable low-latency communication (URLLC).

According to an embodiment, eMBB aims to provide a higher data rate than that supported by LTE, LTE-A or LTE-Pro. For example, in a 5G communication system, eMBB should be able to provide a peak data rate of 20 gigabits per second (Gbps) in a downlink and a peak data rate of 10 Gbps in an uplink with respect to one base station. Furthermore, the 5G communication system should be able to provide an increased user-perceived data rate of the terminal while providing the peak data rate. In order to satisfy such requirements, in the 5G communication system, various transmission and reception technologies including a further enhanced MIMO transmission technology must be improved. Furthermore, an LTE system transmits a signal by using a maximum transmission bandwidth of 20 megahertz (MHz) in a frequency band of 2 gigahertz (GHz). In contrast, the 5G communication system transmits a signal by using a frequency bandwidth wider than 20 MHz in a frequency band of 3 to 6 GHz or more, and thus may satisfy the data rate requirements necessary for the 5G communication system.

Furthermore, in the 5G communication system, mMTC is considered to support application services such as Internet of Things (IoT). In order for mMTC to efficiently provide the IoT, access by many terminals within a single cell, coverage improvement of a terminal, an increased battery time, a reduction in the cost of a terminal, etc. may be required. The IoT is attached to various sensors and various devices to provide a communication function, and thus should be able to support many terminals (e.g., 1,000,000 terminals/km2) within a cell. Furthermore, because a terminal is likely to be located in a shaded area that a cell does not cover such as in the basement of a building, wider coverage than other services provided the 5G communication systems may be required. Because a terminal supporting mMTC should include a cheap terminal and it is difficult to replace a battery of the terminal frequently, a very long battery life time (e.g., 10-15 years) may be required.

URLLC is a cellular-based wireless communication service used for mission-critical purposes, and may be used in remote control of robots or machinery, industrial automation, service used for unmanned aerial vehicles, remote health care, and emergency alert. Accordingly, communication provided by URLLC should provide very low latency and very high reliability. For example, services supporting URLLC should meet an air interface latency of less than 0.5 milliseconds and have a packet error rate of 10-5 or less. Accordingly, for services supporting URLLC, the 5G system should provide a transmission time interval (TTI) less than that of other services, and a design for broad resource allocation in a frequency band in order to ensure the reliability of a communication link may be required.

Three services considered for the 5G system, that is, eMBB, URLLC, and mMTC, may be multiplexed and transmitted in one system. In order to satisfy different requirements of the services, different transmission and reception schemes and transmission/reception parameters may be used between the services. However, the mMTC, URLLC, and eMBB are examples of different service types, and service types to which the present disclosure is applied are not limited thereto.

Also, although embodiments of the present disclosure are described by using an LTE, LTE-A, LTE Pro, or 5G (or NR) system, the embodiments of the present disclosure may be applied to other communication systems having a similar technical background or channel type. Also, the embodiments of the present disclosure may be applied to other communication systems through some modifications without departing from the scope of the present disclosure based on determination by one of ordinary skill in the art.

While describing the present disclosure, detailed descriptions of related well-known functions or configurations that may blur the points of the present disclosure are omitted. Hereinafter, an embodiment of the present disclosure will be described with reference to the drawings.

FIG. 1A is a diagram illustrating a structure of an LTE system according to an embodiment of the present disclosure.

Referring to FIG. 1A, a radio access network of an LTE system may include next generation base stations (evolved Node Bs (ENBs), Node Bs or base stations) 1a-05, 1a-10, 1a-15, and 1a-20, a mobility management entity (MME) 1a-25, and a serving-gateway (S-GW) 1a-30. A user equipment (UE) (or a terminal) 1a-35 may access an external network via the ENBs 1a-05 through 1a-20 and the S-GW 1a-30.

Referring to FIG. 1A, the ENBs 1a-05 through 1a-20 may correspond to existing node Bs in a universal mobile telecommunication system (UMTS) system. The ENB may be connected to the UE 1a-35 via a wireless channel, and may perform a more complicated role than the existing node B. In the LTE system, all user traffic including a real-time service such as voice over Internet protocol (IP) (VoIP) based on an Internet protocol may be provided via a shared channel. Accordingly, there is a need for a device that performs scheduling by collecting state information, such as a buffer state, an available transmission power state, a channel state, and the like of UEs, and the ENBs 1a-05 through 1a-20 may be responsible for the function.

One ENB may generally control a plurality of cells. For example, in order to ensure a data rate of 100 Mbps, the LTE system may use orthogonal frequency division multiplexing (OFDM) as a radio access technology in a bandwidth of 20 MHz. Also, an adaptive modulation and coding (AMC) scheme that determines a modulation scheme and a channel coding rate may be applied based on a channel state of a UE.

The S-GW 1a-30 is an entity for providing a data bearer, and may add or release a data bearer by the control of the MME 1a-25. The MME is an entity that is responsible for various control functions in addition to a mobility management function associated with UEs, and may be connected to a plurality of eNBs.

Figure 1B:
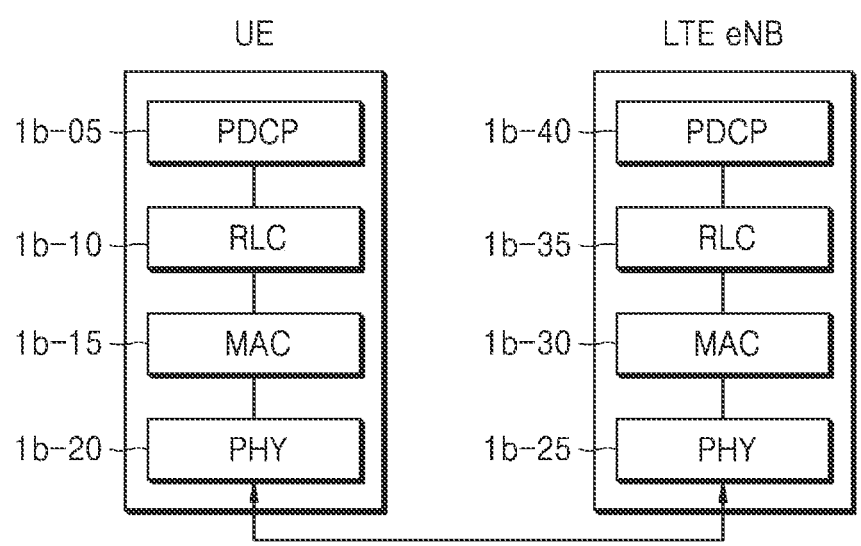
FIG. 1B is a diagram illustrating a radio protocol architecture of an LTE system according to an embodiment of the present disclosure.

FIG. 1B is a diagram illustrating a radio protocol architecture of an LTE system according to an embodiment of the present disclosure.

Referring to FIG. 1B, a radio protocol of an LTE system may include packet data convergence protocol (PDCP) layers 1b-05 and 1b-40, radio link control (RLC) layers 1b-10 and 1b-35, medium access control (MAC) layers 1b-15 and 1b-30 for a UE and an ENB. The PDCP layers 1b-05 and 1b-40 are responsible for IP header compression/decompression. Main functions of the PDCP layers 1b-05 and 1b40 may be summarized as follows:

Header compression and decompression: robust reader compression (ROHC) only
Transfer of user data
In-sequence delivery of upper layer packet data units (PDUs) at PDCP re-establishment procedure for RLC acknowledged mode (AM)
For split bearers in dual connectivity (DC) (only support for RLC AM): PDCP PDU routing for transmission and PDCP PDU reordering for reception
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based service data unit (SDU) discard in uplink The radio link control RLC layers 1b-10 and 1b-35 may segment a PDCP packet data unit (PDU) into segments having an appropriate size, and may perform an automatic repeat request (ARQ) operation or the like. Main functions of the RLC layers 1b-05 and 1b-40 may be summarized as follows:

Transfer of upper layer PDUs
Error correction through ARQ (only for AM data transfer)
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layers 1b-15 and 1b-30 may be connected to various RLC layers included in one UE, and may multiplex RLC PDUs into a MAC PDU and demultiplex RLC PDUs from a MAC PDU. Main functions of the MAC layers 1b-15 and 1b-30 may be summarized as follows:

Mapping between logical channels and transport channels
Multiplexing/demultiplexing of MAC SDUs belonging to one or different logical channels into/from transport blocks (TBs) delivered to/from the physical layer on transport channels
Scheduling information reporting
Error correction through HARQ
Priority handling between logical channels of one UE
Priority handling between UEs by means of dynamic scheduling
MBMS identification
Transport format selection
Padding Physical (PHY) layers 1b-20 and 1b-25 may perform channel-coding and modulation on upper layer data to generate an OFDM symbol and transmit the OFDM symbol via a wireless channel, or may perform demodulation and channel-decoding on an OFDM symbol received via the wireless channel and deliver the demodulated and channel-decoded OFDM symbol to an upper layer.

Figure 1C:
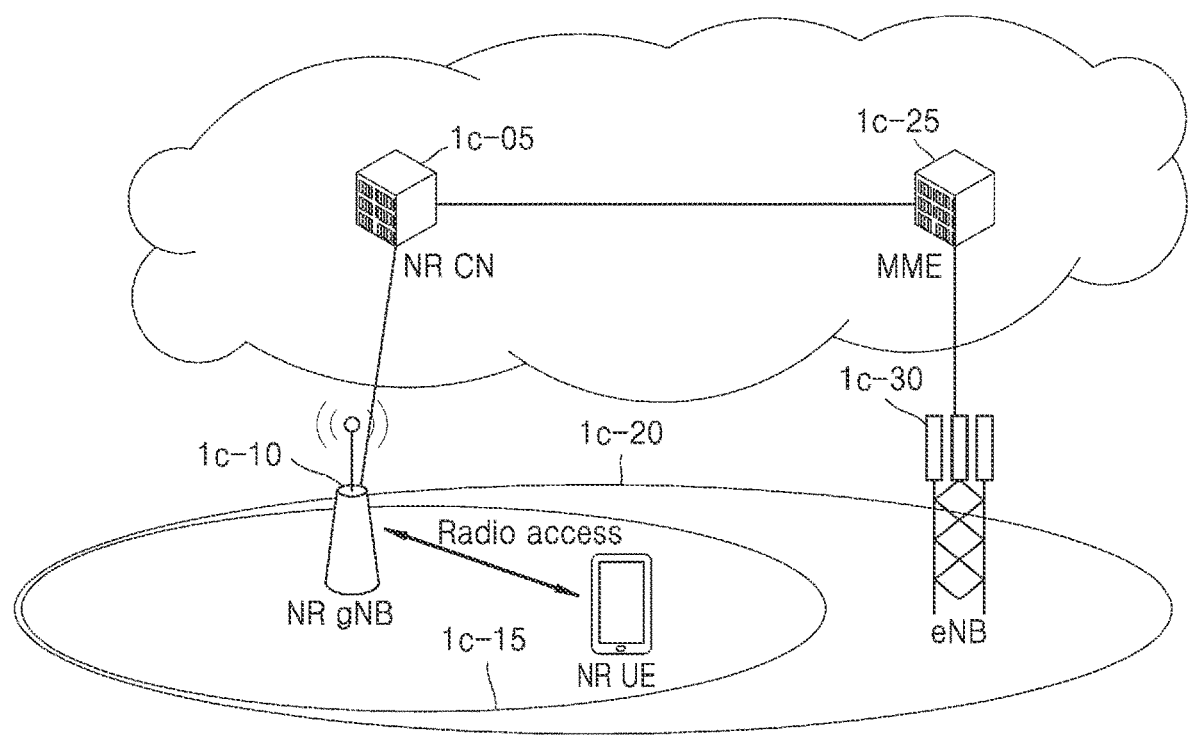
FIG. 1C is a diagram illustrating a structure of a next generation mobile communication system according to an embodiment of the present disclosure.

FIG. 1C is a diagram illustrating a structure of a next generation mobile communication system according to an embodiment of the present disclosure.

Referring to FIG. 1C, a radio access network of a next generation mobile communication system may include a next generation base station (a new radio node B (NR gNB) or an NR base station) 1c-10 and a new radio core network (NR CN) (or a next generation core network) 1c-05. A new radio user equipment (NR UE) (or a UE) 1c-15 may access an external network via the NR gNB 1c-10 and the NR CN 1c-05.

Referring to FIG. 1C, the NR gNB 1c-10 may correspond to an evolved nodeB (eNB) of an existing LTE system. The NR gNB 1c-10 may be connected to the NR UE 1c-15 via a wireless channel, and may provide a better service than a service from an existing node B. In the next generation mobile communication system, all user traffic may be provided via a shared channel. Accordingly, there is a need for a device that performs scheduling by collecting state information such as a buffer state, an available transmission power state, a channel condition, and the like of UEs, and the NR gNB 1c-10 may be responsible for the function. One NR gNB 1c-10 may control a plurality of cells. In order to provide ultra-high speed data transmission when compared to current LTE, a bandwidth wider than or equal to a current maximum bandwidth may be applied to the next generation mobile communication system. Also, orthogonal frequency division multiplexing (OFDM) may be used as a radio access technology and beamforming may be additionally used. Also, an adaptive modulation and coding (AMC) scheme that determines a modulation scheme and a channel coding rate may be applied based on a channel state of a UE.

The NR CN 1c-05 may perform a function of supporting mobility, configuring a bearer, configuring a quality of service (QoS), and the like. The NR CN 1c-05 is a device that is responsible for various control functions in addition to a mobility management function associated with UEs, and may be connected to a plurality of base stations. Also, the next generation mobile communication system may interoperate with an existing LTE system, and the NR CN 1c-05 may be connected to an MME 1c-25 via a network interface. The MME 1c-25 may be connected to an eNB 1c-30 which is an existing base station.

Figure 3E:
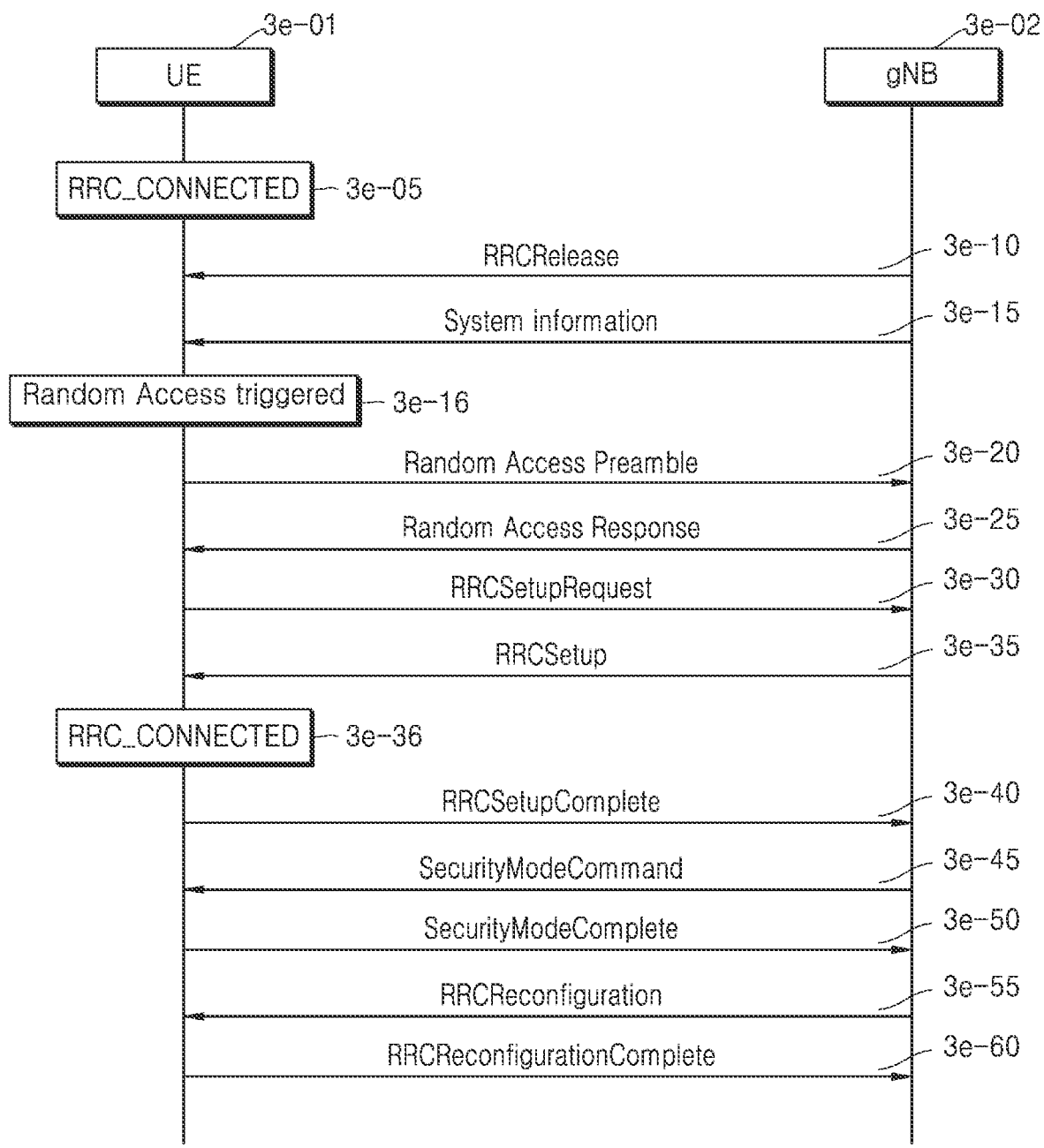
FIG. 3E is a diagram for describing a procedure by which a terminal performs an RRC connection establishment procedure with a base station to switch from an RRC idle mode to an RRC connected mode and a procedure by which the base station and the terminal perform an RRC connection reconfiguration (RRC reconfiguration) procedure, according to an embodiment of the present disclosure.
Figure 3F:
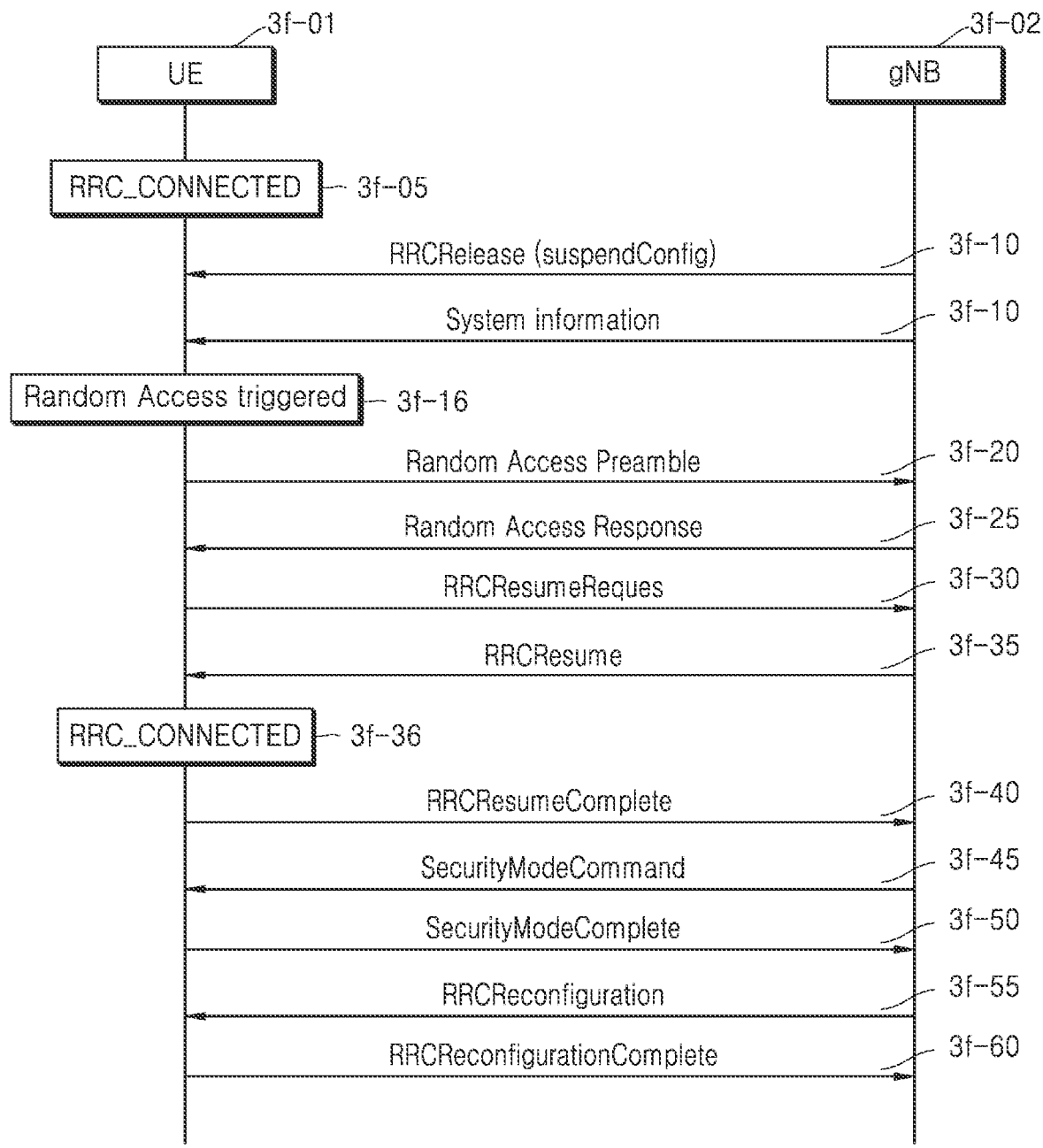
FIG. 3F is a diagram for describing a procedure by which a UE performs an RRC connection resume (RRC connection establishment) procedure with a gNB to switch from an RRC inactive mode (RRC idle mode) to an RRC connected mode and a procedure by which the gNB and the UE perform an RRC connection reconfiguration (RRC reconfiguration) procedure, according to an embodiment of the present disclosure.
Figure 3H:
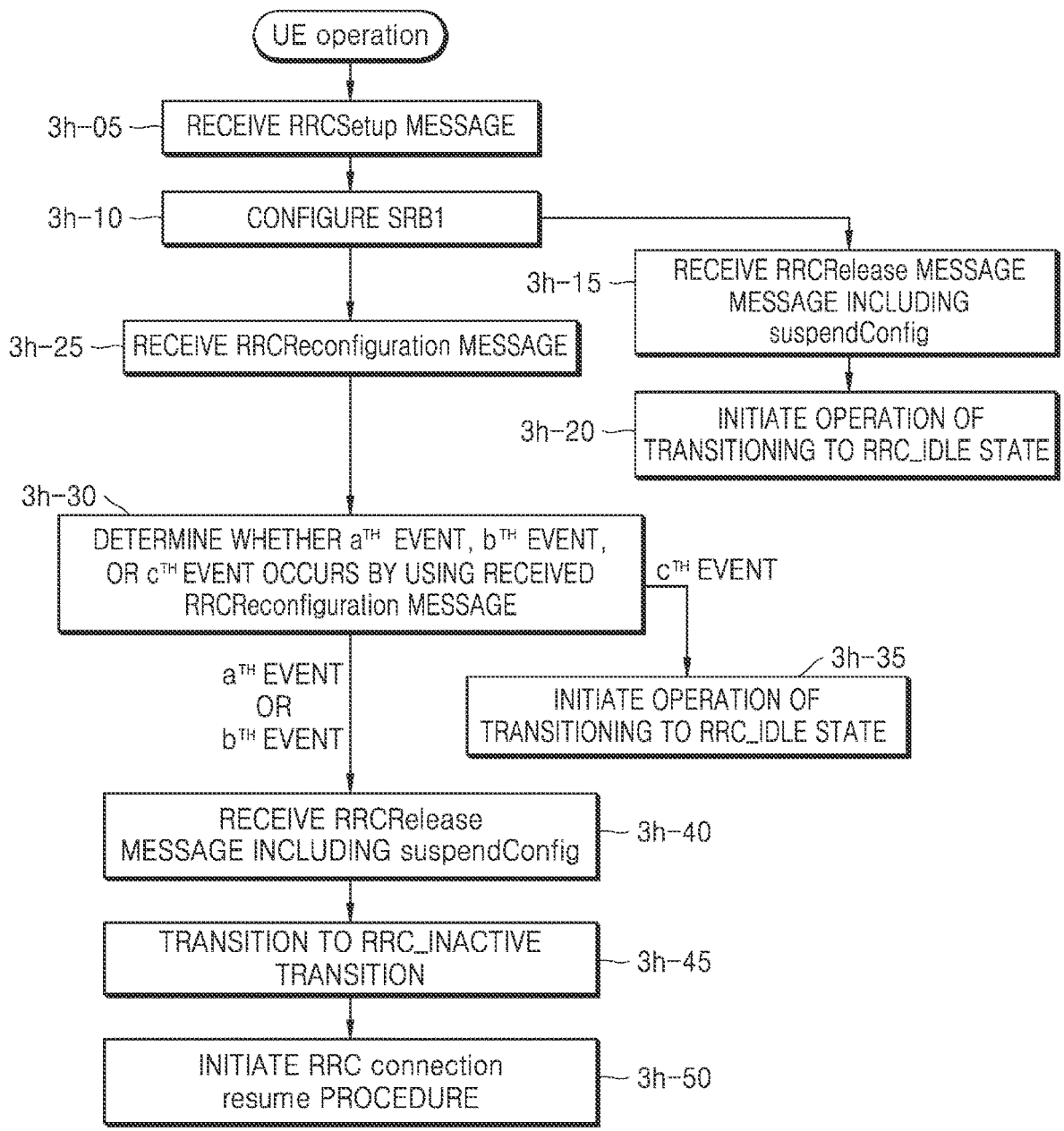
FIG. 3H is a flowchart of a UE operation according to a pre-configured radio bearer configuration, when a terminal in an RRC connected mode (RRC_CONNECTED) receives an RRCRelease message including suspend configuration information (suspendConfig) from a base station, according to an embodiment of the present disclosure.
Figure 3I:
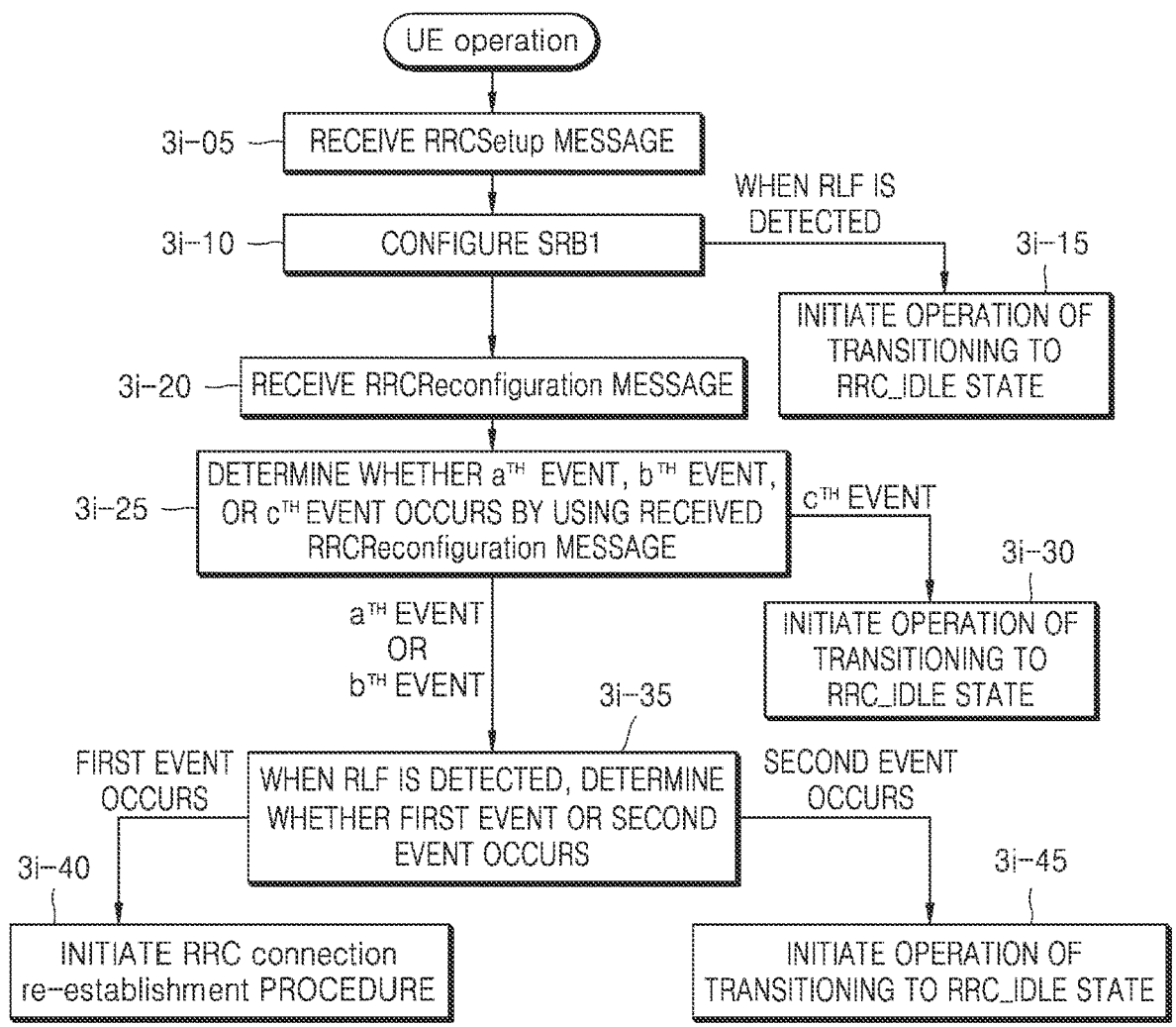
FIG. 3I is a flowchart of a UE operation according to a configured radio bearer, when a terminal in an RRC connected mode (RRC_CONNECTED) detects a radio link failure (RLF), according to an embodiment of the present disclosure.
Figure 3J:
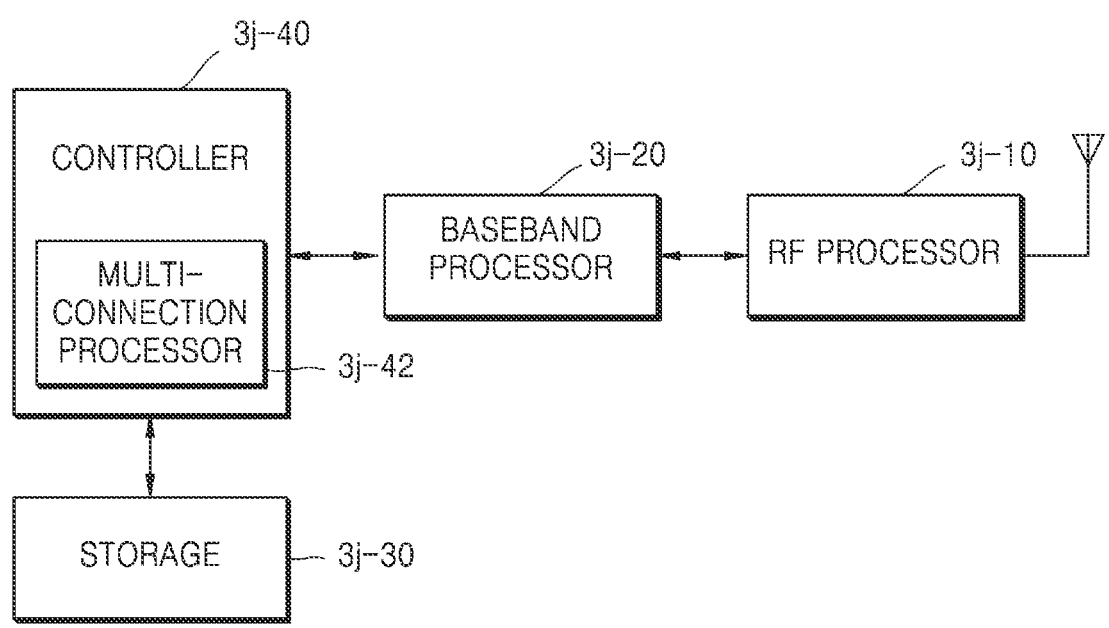
FIG. 3J is a block diagram illustrating a structure of a terminal according to an embodiment of the present disclosure.
Figure 3K:
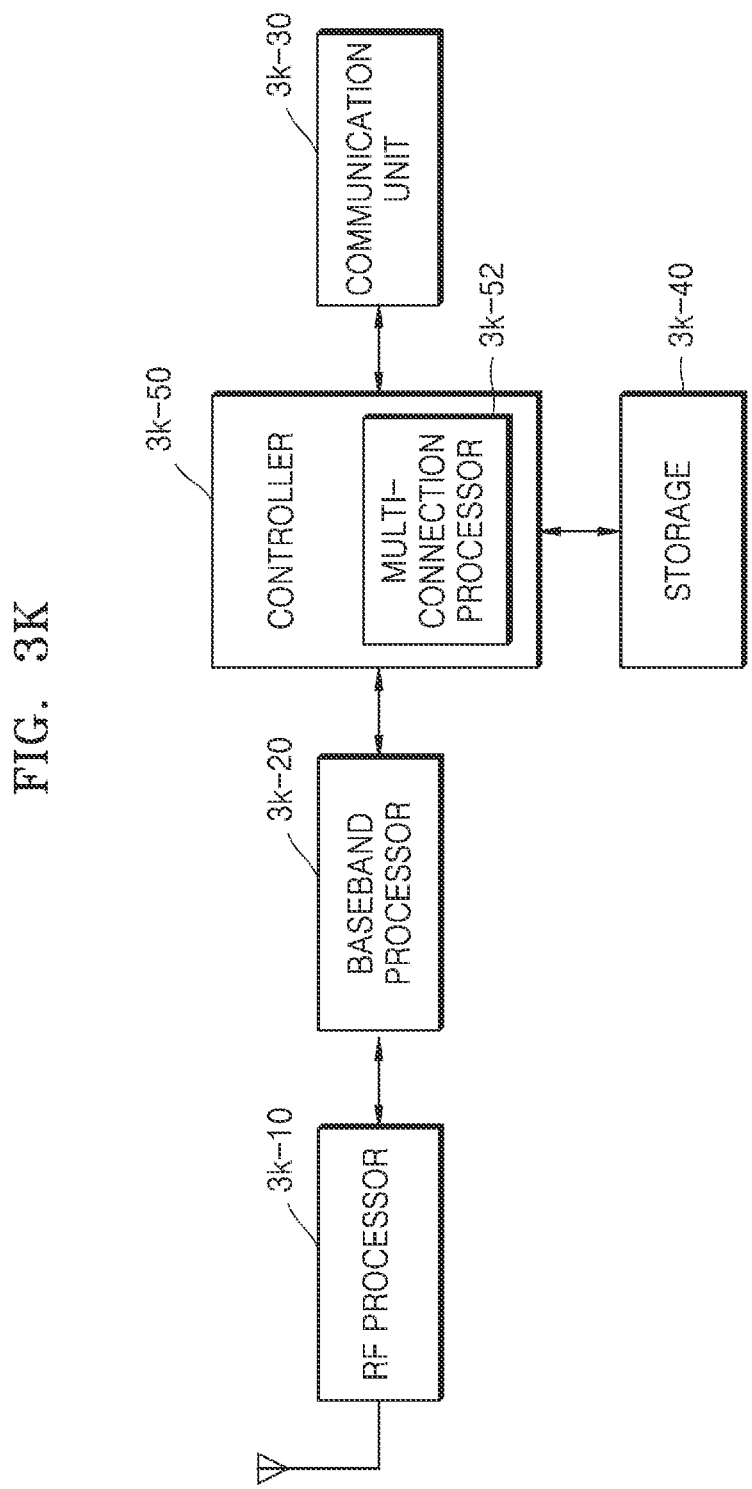
FIG. 3K is a block diagram illustrating a structure of a base station according to an embodiment of the present disclosure.
Figure 3L:
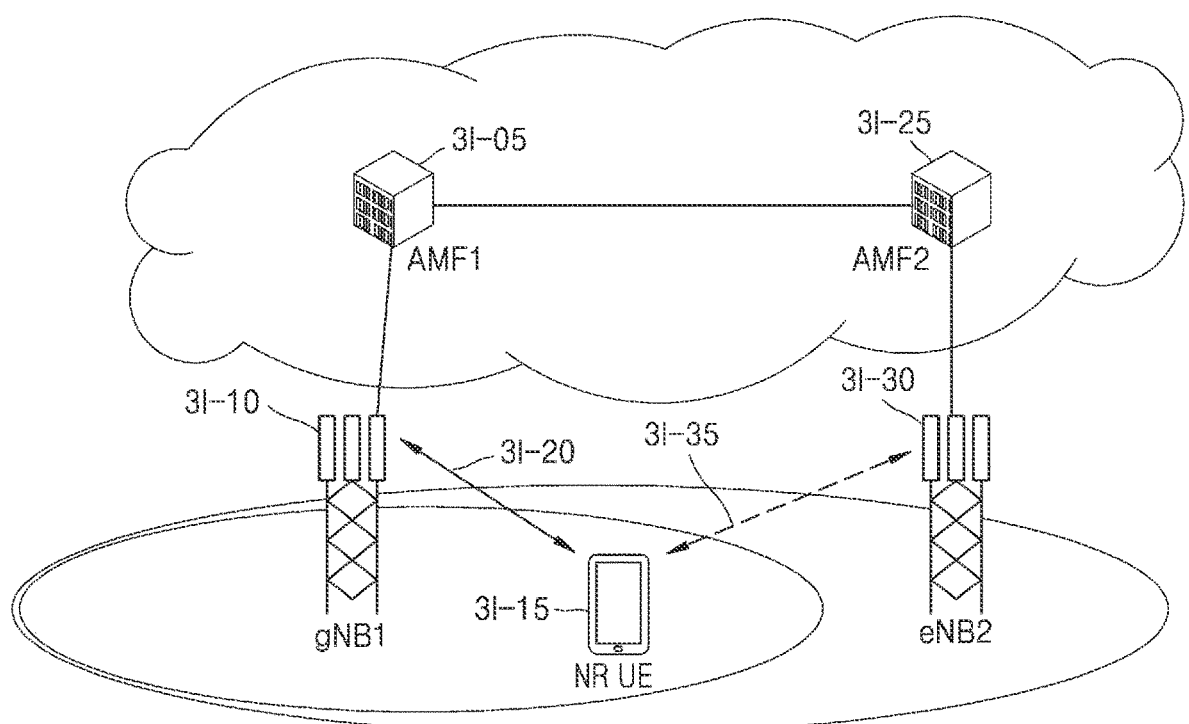
FIG. 3L is a diagram illustrating a new radio (NR)-dual connectivity (DC) structure according to an embodiment of the present disclosure.
Figure 3M:
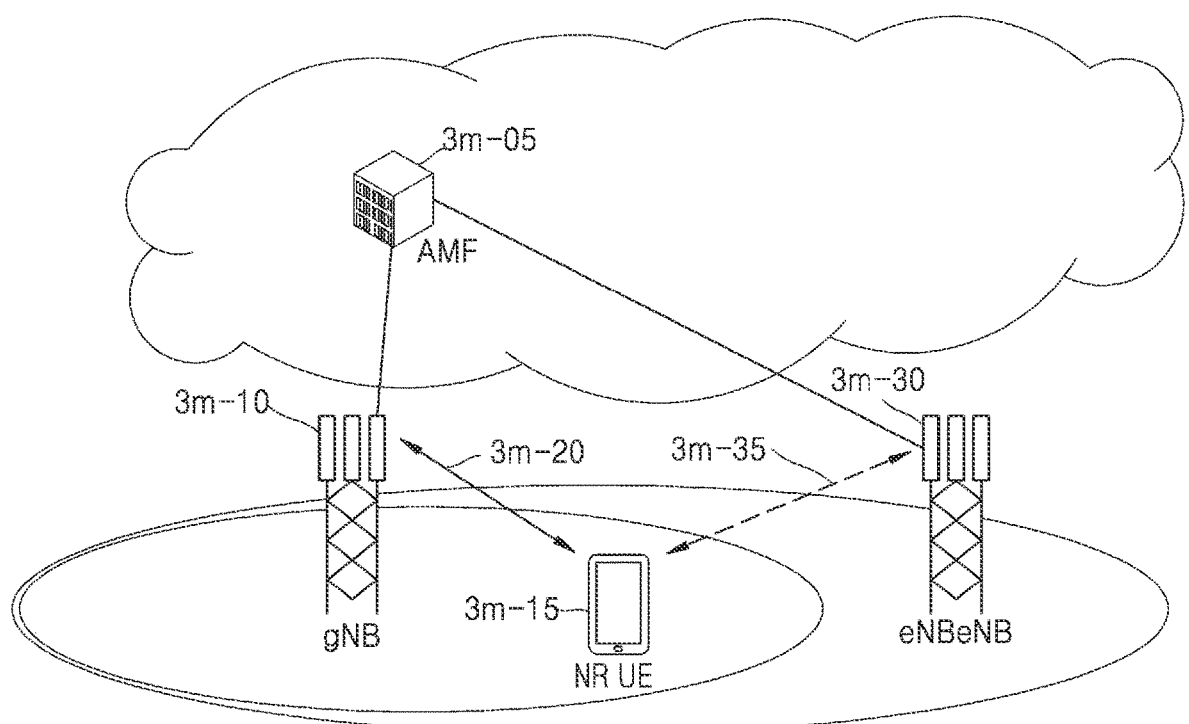
FIG. 3M is a diagram illustrating an NR-DC structure according to an embodiment of the present disclosure.

FIGS. 3L and 3M illustrate an NR-DC structure. As shown in FIGS. 3L and 3M, a radio access network of a next generation mobile communication system (e.g., a new radio (NR) system) may include next generation base stations (hereinafter, gNBs) 3l-10, 3l-30, and 1m-10 and access and mobility management functions (AMFs) 3l-05, 3l-25, 3m-05, and a new radio core network. New radio user equipments (NR UEs) (or UEs) 3*l*-15 and 3*m*-15 access an external network through the gNBs 3*l*-10 and 3*m*-10 and the AMFs 3*l*-05 and 3*m*-05.

Referring to FIGS. 3C, 3L, and 3M, a situation where a macro cell and a pico cell coexist may be considered. The macro cell is a cell controlled by a macro base station and provides a service in a relatively wide area. Conversely, the pico cell is a cell controlled by a SeNB, and generally provides a service in a narrower area than the macro cell. Although there is no strict criterion for distinguishing a macro cell and a pico cell, for example, it may be assumed that the area of a macro cell has a radius of about 500 m and the area of a pico cell has a radius of about tens of meters. In embodiments of the present disclosure, a pico cell and a small cell are interchangeably used. In this case, the macro cell may be an LTE or NR base station (MeNB or MgNB), and the pico cell may be an NR or LTE base station (SeNB or SgNB). Particularly, a 5G base station that supports a pico cell may use a frequency band equal to or greater than 6 GHz.

The embodiments of the present disclosure may consider a situation in which a macro cell and a macro cell coexist. The macro cell is a cell controlled by a macro base station, and provides a service in a relatively wide area. In this case, the macro cell may include an LTE base station (MeNB) and an LTE base station (SeNB). According to another embodiment, in this case, the macro cell may include an LTE base station (MeNB) and an NR base station (SgNB). According to another embodiment, in this case, the macro cell may include an NR base station (MgNB) and an LTE base station (SeNB). According to another embodiment, in this case, the macro cell may include an NR base station (MgNB) and an NR base station (SgNB).

Both a 4G system (LTE) and a 5G system are based on orthogonal frequency-division multiplexing (OFDM). In LTE, a subcarrier spacing (SCS) is fixed to be 15 kHz. However, in the 5G system, multiple subcarrier spacings (SCS), for example, 7.5 kHz, 15 kHz, 30 kHz, 60 kHz, 120 kHz, and the like, may be supported in order to provide various services (e.g., eMBB, URLLC, mMTC, and the like) and to provide wireless communication in various frequency ranges (e.g., sub-6 GHz, above-6 GHz, and the like). Furthermore, the 5G system may allow multiple SCSs to be time division multiplexed (TDM) or frequency division multiplexed (FDM) even in a single carrier. Also, a maximum bandwidth of a component carrier (CC) in LTE is assumed to be 20 MHz. However, the 5G system may consider a maximum bandwidth of a CC to be up to 1 GHz.

Therefore, in the case of the 5G system, radio resources having different SCSs may be FDM or TDM. In LTE, a subframe is assumed to be a base unit of scheduling. However, in the 5G system, a slot including 14 symbols may be assumed to be a base unit of scheduling. That is, in LTE, an absolute time of a subframe is always fixed to be 1 ms. However, in the 5G system, a length of a slot may vary according to an SCS.

Particularly, the 3GPP defines a synchronous signal/physical broadcast channel (SS/PBCH) block for a synchronous signal (SS) which is used for an initial access procedure. The SS/PBCH block may include at least a primary synchronous signal (PSS), a secondary synchronous signal (SSS), and a PBCH. When the SS/PBCH block is transmitted, the PSS, the SSS, and the PBCH may always be transmitted in a certain sequence. Also, the SS/PBCH block may be transmitted with one of 15 kHz, 30 kHz, 120 kHz, and 240 kHz SCS according to a frequency band. In detail, the SS/PBCH block may be transmitted with 15 kHz or 30 kHz SCS in a sub-6 GHz frequency band, and may be transmitted with 120 kHz or 240 kHz SCS in an above-6 GHz frequency band. The above frequency band may be classified in more detail and the SS/PBCH block may be transmitted in each frequency band.

Also, multiple SS/PBCH blocks may be transmitted in one operating band. This is to allow UEs having different capabilities to coexist and operate in a system bandwidth. In this case, although the system bandwidth increases, a location of an SS/PBCH received by a UE may vary according to network settings. Also, a transmission time of the SS/PBCH block may also vary according to the network settings. A transmission interval of the SS/PBCH block may not be constant. In more detail, like the following message [*d*1], information indicating a channel bandwidth of a system may provide an SCS value used in the channel bandwidth.

Figure 1D:
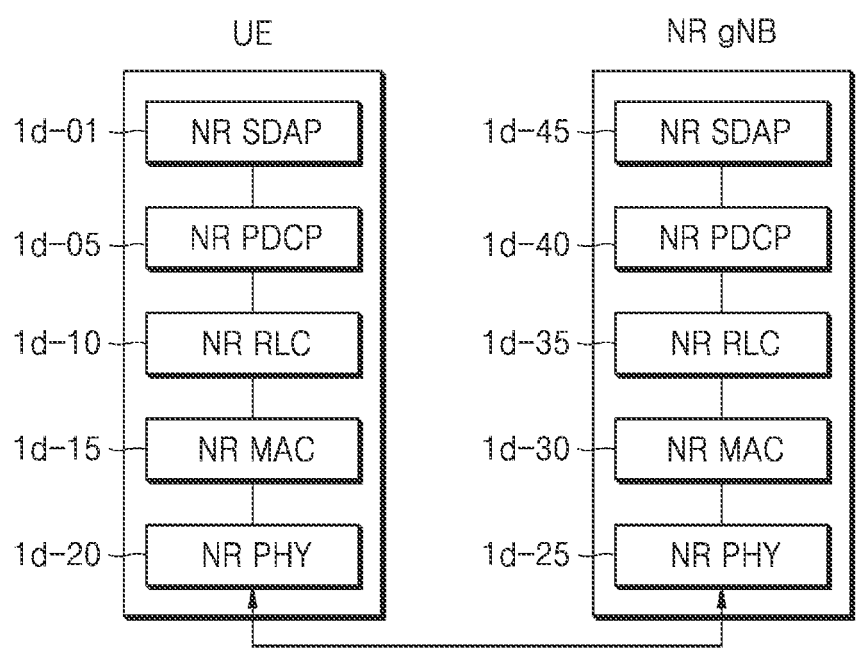
FIG. 1D is a diagram illustrating a radio protocol architecture of a next generation mobile communication system according to an embodiment of the present disclosure.

FIG. 1D is a diagram illustrating a radio protocol architecture of a next generation mobile communication system according to an embodiment of the present disclosure.

Referring to FIG. 1D, a radio protocol of a next generation mobile communication system may include NR service data adaptation protocol (SDAP) layers 1*d*-01 and 1*d*-45, NR PDCP layers 1*d*-05 and 1*d*-40, NR RLC layers 1*d*-10 and 1*d*-35, and NR MAC layers 1*d*-15 and 1*d*-30 for a UE and an NR gNB.

Main functions of the NR SDAP layers 1*d*-01 and 1*d*-45 may include some of the following functions:
  Transfer of user plane data
  Mapping between a QoS flow and a DRB for both DL and UL
  Marking QoS flow ID in both DL and UL packets
  Reflective QoS flow to DRB mapping for the UL SDAP PDUs For an SDAP layer, whether to use a header of the SDAP layer or whether to use a function of the SDAP layer may be configured in the UE via an RRC message for each PDCP layer, for each bearer, or for each logical channel. When the SDAP header is configured, a 1-bit non-access stratum (NAS) reflective QoS configuration indicator and a 1-bit access stratum (AS) reflective QoS configuration indicator of the SDAP header may indicate the UE to update or reconfigure mapping information between a quality of service (QoS) flow and a data bearer for an uplink or a downlink. The SDAP header may include QoS flow ID information indicating QoS. The QoS information may be used as data processing priority information, scheduling information, or the like for supporting a smooth service.

Main functions of the NR PDCP layers 1*d*-05 and 1*d*-40 may include some of the following functions:
  Header compression and decompression: robust header compression (ROHC) only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink The reordering function of the NR PDCP layers 1*d*-05 and 1*d*-40 may refer to a function of sequentially reordering PDCP PDUs received from a lower layer based on a PDCP sequence number (SN). The reordering function of the NR PDCP layers 1*d*-05 and 1*d*-40 may include a function of transferring data to an upper layer in a reordered sequence or transferring the data directly to the upper layer without considering the sequence. Also, the reordering function may include a function of reordering the sequence to record missing PDCP PDUs, a function of reporting status of the missing PDCP PDUs to a transmitting end, and a function of requesting retransmission of the missing PDCP PDUs.

Main functions of the NR RLC layers 1d-10 and 1d-35 may include some of the following functions:

Transfer of upper layer PDUs
In-sequence delivery of upper layer PDUs
Out-of-sequence delivery of upper layer PDUs
Error Correction through ARQ
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC layers 1d-10 and 1d-35 is a function of sequentially transferring RLC SDUs, received from a lower layer, to an upper layer. When a single original RLC SDU is divided into multiple RLC SDUs and the multiple RLC SDUs are received, the in-sequence delivery function of the NR RLC layers 1d-10 and 1d-35 may include a function of re-assembling and transferring the multiple RLC SDUs.

The in-sequence delivery function of the NR RLC layers 1d-10 and 1d-35 may include a function of reordering received RLC PDUs based on an RLC sequence number (SN) or a PDCP SN, a function of ordering the sequence to record missing RLC PDUs, a function of reporting status of the missing RLC PDUs to a transmitting end, and a function of requesting retransmission of the missing RLC PDUs.

The in-sequence delivery function of the NR RLC layers 1d-10 and 1d-35 may include, when there is a missing RLC SDU, a function of sequentially transferring only RLC SDUs before the missing RLC SDU, to an upper layer. Also, when there is a missing RLC SDU but a timer expires, the in-sequence delivery function of the NR RLC layers 1d-10 and 1d-35 may include a function of sequentially transferring all RLC SDUs, received before the timer starts, to an upper layer. Also, when there is a missing RLC SDU but a timer expires, the in-sequence delivery function of the NR RLC layers 1d-10 and 1d-35 may include a function of sequentially transferring all RLC SDUs, received up to the present, to an upper layer.

The NR RLC layers 1d-10 and 1d-35 may transfer RLC PDUs to the PDCP layers 1d-05 and 1d-40 regardless of a sequence number (out-of-sequence delivery) by processing the RLC PDUs in an order of reception.

When the NR RLC layers 1d-10 and 1d-35 receive segments, the NR RLC layers 1d-10 and 1d-35 may receive segments, which are stored in a buffer or which are to be received later, may reconfigure the segments into a complete RLC PDU, and may transfer the complete RLC PDU to a PDCP layer.

The NR RLC layer may not include a concatenation function. The concatenation function may be performed in the NR MAC layer or may be replaced with a multiplexing function in the NR MAC layer.

The out-of-sequence delivery function of the NR RLC layers 1d-10 and 1d-35 may refer to a function of transferring RLC SDUs, received from a lower layer, to an upper layer regardless of a sequence. When a single original RLC SDU is divided into multiple RLC SDUs and the multiple RLC SDUs are received, the out-of-sequence delivery function of the NR RLC layers 1d-10 and 1d-35 may include a function of re-assembling and transferring the multiple RLC SDUs. The out-of-sequence delivery function of the NR RLC layers 1d-10 and 1d-35 may include a function of storing RLC SNs or PDCP SNs of received RLC PDUs and ordering a sequence to record missing RLC PDUs.

The NR MAC layers 1d-15 and 1d-30 may be connected to multiple NR RLC layers included in a single UE, and main functions of the NR MAC layers 1d-15 and 1d-30 may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
Multimedia broadcast multicast service (MBMS) identification
Transport format selection
Padding NR PHY layers 1d-20 and 1d-25 may perform channel-coding and modulation on upper layer data to generate an OFDM symbol and transmit the OFDM symbol via a wireless channel, or may perform demodulation and channel-decoding on an OFDM symbol received via the wireless channel and deliver the demodulated and channel-decoded OFDM symbol to an upper layer.

FIG. 1E is a diagram for describing V2X communication in a mobile communication system according to an embodiment of the present disclosure.

V2X collectively refers to communication technology through all interfaces with vehicles, and includes vehicle-to-vehicle (V2V), vehicle-to-infrastructure (V2I), vehicle-to-pedestrian (V2P), and vehicle-to-network (V2N) depending on its type and components of communication. V2P and V2V may follow a structure and operation principle of Rel-13 device-to-device (D2D). That is, V2P and V2V may basically perform a sidelink operation (PC5), and a real data packet may be transmitted/received through a sidelink that is a transmission channel between terminals, instead of an uplink/downlink between a base station and a terminal. This basic concept may be applied not only to V2X defined in LTE but also to V2X newly defined in next generation mobile communication (NR), and an upgrade may be applied in a specific scenario.

A base station 1e-01 may include one or more vehicle terminals 1e-05 and 1e-10 and a pedestrian portable terminal 1e-15 located in a cell 1e-02 supporting V2X. That is, the vehicle terminals 1e-05 and 1e-01 may perform cellular communication with the base station 1e-01 by using vehicle terminal-base station links (Uu) 1e-30 and 1e-35, and the pedestrian portable terminal 1e-15 may perform cellular communication by using a pedestrian terminal-base station link (Uu) 1e-40. The vehicle terminal 1e-05 may perform device-to-device communication with the other vehicle terminal 1e-10 or the pedestrian portable terminal 1e-15 by using sidelinks (PC5) 1e-20 and 1e-25. The base station 1e-01 may be a gNB or an upgraded eNB supporting NR. In order for the vehicle terminals 1e-05 and 1e-10 and the pedestrian portable terminal 1e-15 to directly transmit and receive information by using the sidelinks 1e-20 and 1e-25, the base station 1e-01 should allocate a resource pool that may be used for sidelink communication. A method by which a base station allocates resources to a terminal in V2X of an LTE system is described below in detail, and a similar approach may also be applied to V2X of an NR system.

However, different numerology may be used in NR, and a design of a sidelink resource pool may be different.

In an LTE system, resource allocation may be divided into two types, scheduled resource allocation (mode 3) and UE autonomous resource allocation (mode 4) according to a method for a gNB to allocate resources to a UE for V2X sidelink communication.

In the case of the scheduled resource allocation, a gNB allocates resources used for sidelink transmission to radio resource control (RRC)-connected UEs in a dedicated scheduling manner. The above method is effective for interference management and resource pool management (dynamic allocation and semi-persistence transmission) because the gNB may manage the resources of the sidelink. In the case of the scheduled resource allocation (mode 3) in which the gNB allocates and manages resources for V2X, when the RRC-connected UE has data to be transmitted to other UEs, information on the data may be transmitted to the gNB using an RRC message or a medium access control (MAC) control element (CE). In this case, SidelinkUEInformation and UEAssistanceInformation messages may be used as the RRC message.

Meanwhile, the MAC CE may be, for example, a buffer status report MAC CE in a new format (including at least an indicator indicating that the corresponding report is a buffer status report for V2P communication and information on a size of data buffered for sidelink communication). A detailed format and content of the buffer status report used in 3GPP are based on the 3GPP standard TS36.321 "E-UTRA MAC Protocol Specification".

On the other hand, in the case of the UE autonomous resource allocation, a gNB provides a sidelink transmission/reception resource pool for V2X as system information to a UE and the UE selects a resource pool according to a given rule. The resource selection method of the UE may include zone mapping or sensing-based resource selection and random selection. In a structure of a resource pool for V2X, one sub-channel may be configured by allowing resources 1e-45, 1e-55, and 1e-65 for scheduling allocation (SA) and resources 1e-50, 1e-60, and 1e-70 for data transmission to be adjacent to each other and resources for SAs 1e-75, 1e-80 and 1e-85 and data 1e-90, 1e-95 and 1e-100 may not be adjacent to each other. Whichever of the above two structures is used, each SA may include two consecutive PRBs and may have content indicating a location of a resource for data. The number of UEs receiving a V2X service in one cell may be many and a relationship between the base station 1e-01 and the terminals 1e-05, 1e-10, and 1e-15 as described above may be extended and applied.

Also, for sidelink data transmission/reception through a resource pool, V2X services are basically divided through destination layer2 ID (or destination ID) in V2X of an LTE system. That is, source/destination layer2 IDs (each 24-bit size) of a terminal may be included in a header of a V2X data packet (i.e., MAC PDU) transmitted through a sidelink, and the destination layer2 ID may indicate a service type of V2X data traffic transmitted by the terminal. The source layer2 ID refers to an identifier of the terminal.

When another terminal receiving the destination layer2 ID sent by the transmission terminal is subscribed to a service for the destination layer2 ID and configured to receive the service, the terminal may decode the data packet belonging to the MAC PDU and may transmit a decoding result to an upper layer. Mapping information between the destination layer2 ID and the V2X data packet may be transmitted from a V2X server to a V2X control function, and may be provisioned to the terminal.

Figure 1F:
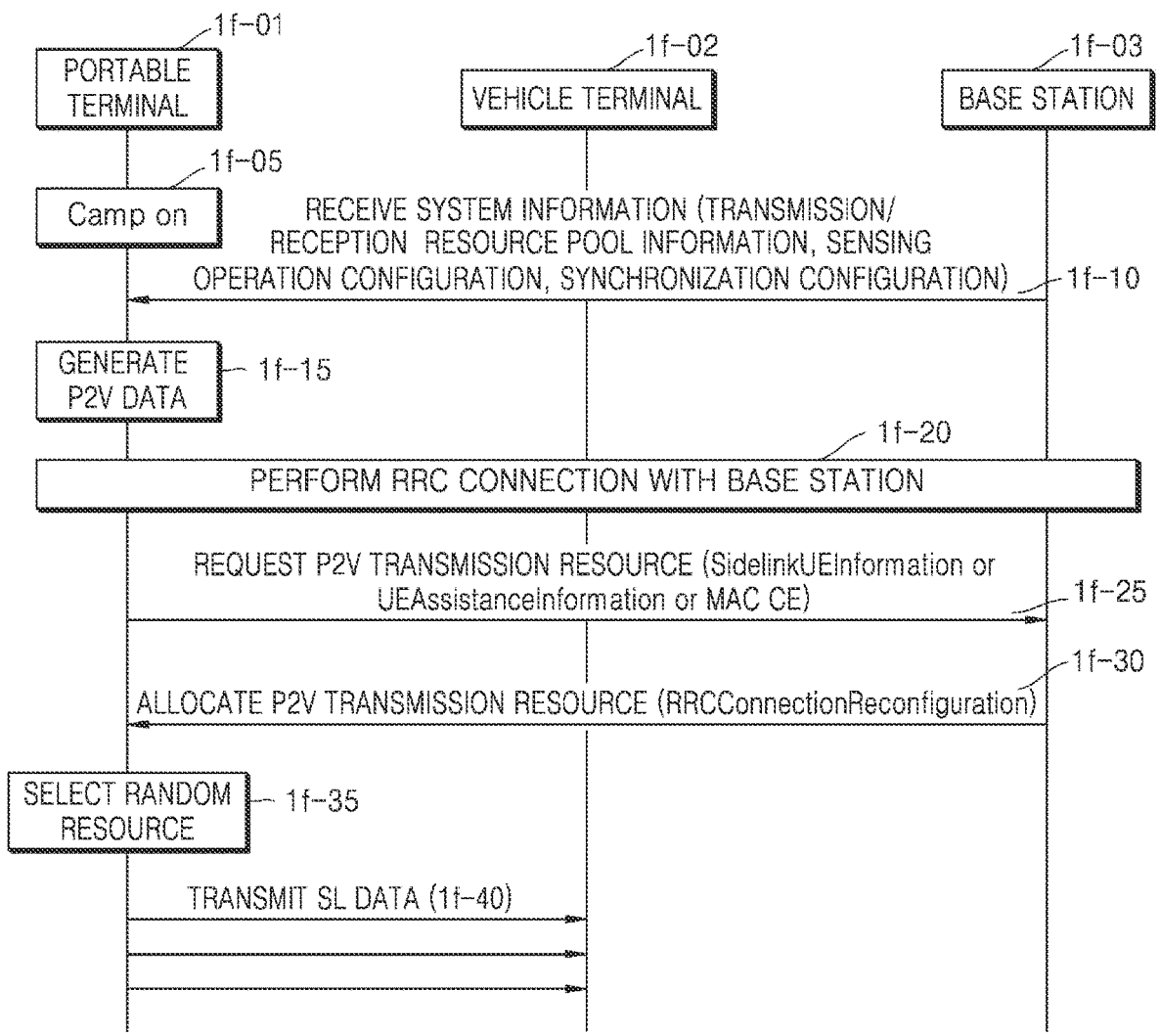
FIG. 1F is a diagram for describing a procedure by which, when a base station allocates resources to a terminal by using a scheduled resource allocation method, the terminal selects a random resource, according to an embodiment of the present disclosure.

FIG. 1F is a diagram for describing a procedure by which, when a base station allocates resources to a terminal by using a scheduled resource allocation method, the terminal selects a random resource, according to an embodiment of the present disclosure.

Referring to FIG. 1F, in V2P communication, a base station 1*f*-03 may allocate a resource pool for random resource selection and a pool for resource selection through partial sensing for a pedestrian portable terminal 1*f*-01. However, in order for the portable terminal 1*f*-01 to perform a partial sensing operation, the portable terminal 1*f*-01 should have sidelink reception capability. Accordingly, the base station may provide a resource pool for at least one random resource selection because there will be at least the portable terminal 1*f*-01 that does not have sidelink reception capability in a cell.

The portable terminal 1*f*-01 that camps on (1*f*-05) may receive system information (SIB21 or SIB22, or SIBx to be newly defined for vehicle communication) from the base station 1*f*-03 (1*f*-10). The system information received by the portable terminal 1*f*-01 may include resource pool information for transmission and reception, configuration information for a sensing operation, information for configuring synchronization, and the like.

The portable terminal 1*f*-01 may generate data traffic for pedestrian-to-vehicle (P2V) communication (1*f*-15), and may perform RRC connection with the base station 1*f*-03 (1*f*-20). An RRC connection procedure between the portable terminal 1*f*-01 and the base station 1*f*-03 may be performed before the portable terminal 1*f*-01 generates the data traffic (1*f*-15).

The portable terminal 1*f*-01 may request the base station 1*f*-03 for transmission resources capable of P2V communication with other vehicle terminals 1*f*-02 (1*f*-25). In this case, the portable terminal 1*f*-01 may request the base station 1*f*-03 for the transmission resources capable of P2V communication by using an RRC message or a MAC CE. Here, SidelinkUEInformation and UEAssistanceInformation messages may be used as the RRC message. Meanwhile, the MAC CE may be, for example, a buffer status report MAC CE in a new format (including at least an indicator indicating that the corresponding report is a buffer status report for V2P communication and information on a size of data buffered for D2D communication).

The base station 1*f*-03 may allocate P2V transmission resources to the portable terminal 1*f*-01 through a dedicated RRC message (1*f*-30). The dedicated RRC message may be included in an RRCConnectionReconfiguration message.

The portable terminal 1*f*-01 may randomly select a resource of a time/frequency domain from among the resources allocated from the base station 1*f*-03 (1*f*-35), and may transmit data to the vehicle terminal 1*f*-02 by using the selected resource of the time/frequency domain (1*f*-40).

Figure 1G:
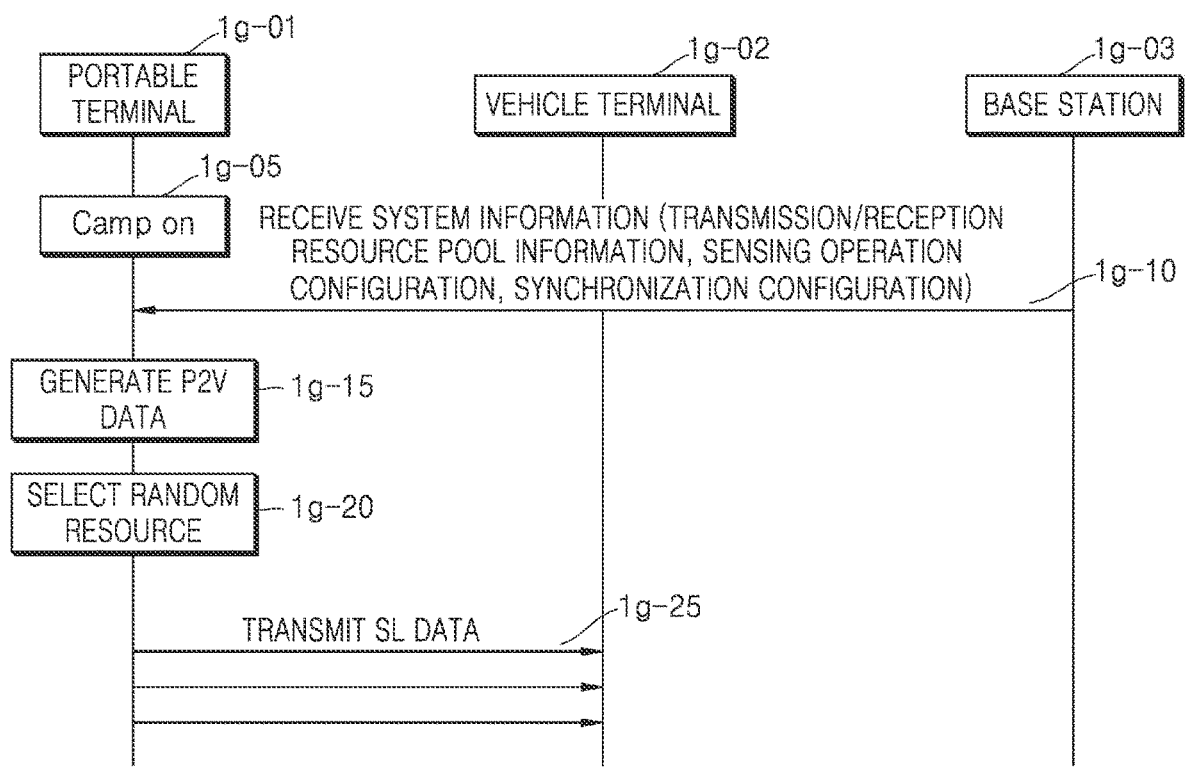
FIG. 1G is a diagram for describing a procedure by which, when a base station allocates resources to a terminal by using a user equipment (UE) autonomous resource allocation method, the terminal selects a random resource, according to an embodiment of the present disclosure.

FIG. 1G is a diagram for describing a procedure by which, when a base station allocates resources to a terminal by using an UE autonomous resource allocation method, the terminal selects a random resource, according to an embodiment of the present disclosure.

Unlike a scheduled resource allocation mode (mode 3) in which a base station 1*g*-03 directly participates in resource allocation, a UE autonomous resource allocation mode (mode 4) operation may be characterized in that a portable terminal 1*g*-01 autonomously selects a resource based on a resource pool of system information which is received in advance and transmits data. In V2P communication, the base station 1*g*-03 may allocate a resource pool for random resource selection and a pool for resource selection through partial sensing for the portable terminal 1g-01. However, in order for the portable terminal 1g-01 to perform a partial sensing operation, the portable terminal 1g-01 should have sidelink reception capability. That is, the base station may provide a source pool for at least one random resource selection because there will be at least the portable terminal 1g-01 that does not have sidelink reception capability in a cell.

The portable terminal 1g-01 that camps on (1g-05) may receive system information (SIB21 or SIB22, or SIBx to be newly defined for vehicle communication) from the base station 1g-03 (1g-10). The system information received by the portable terminal 1g-01 from the base station 1g-03 may include resource pool information for transmission and reception, configuration information for a sensing operation, information for configuring synchronization, and the like. The portable terminal 1g-01 may generate data traffic for P2V communication (1g-15), may select a pool capable of random resource selection from among the resource pools received through the system information from the base station 1g-03, and may randomly select a resource of a time/frequency domain (1g-20). The portable terminal 1g-01 may transmit data to a vehicle terminal 1g-02 by using the selected resource of the time/frequency domain (1g-25).

Figure 1H:
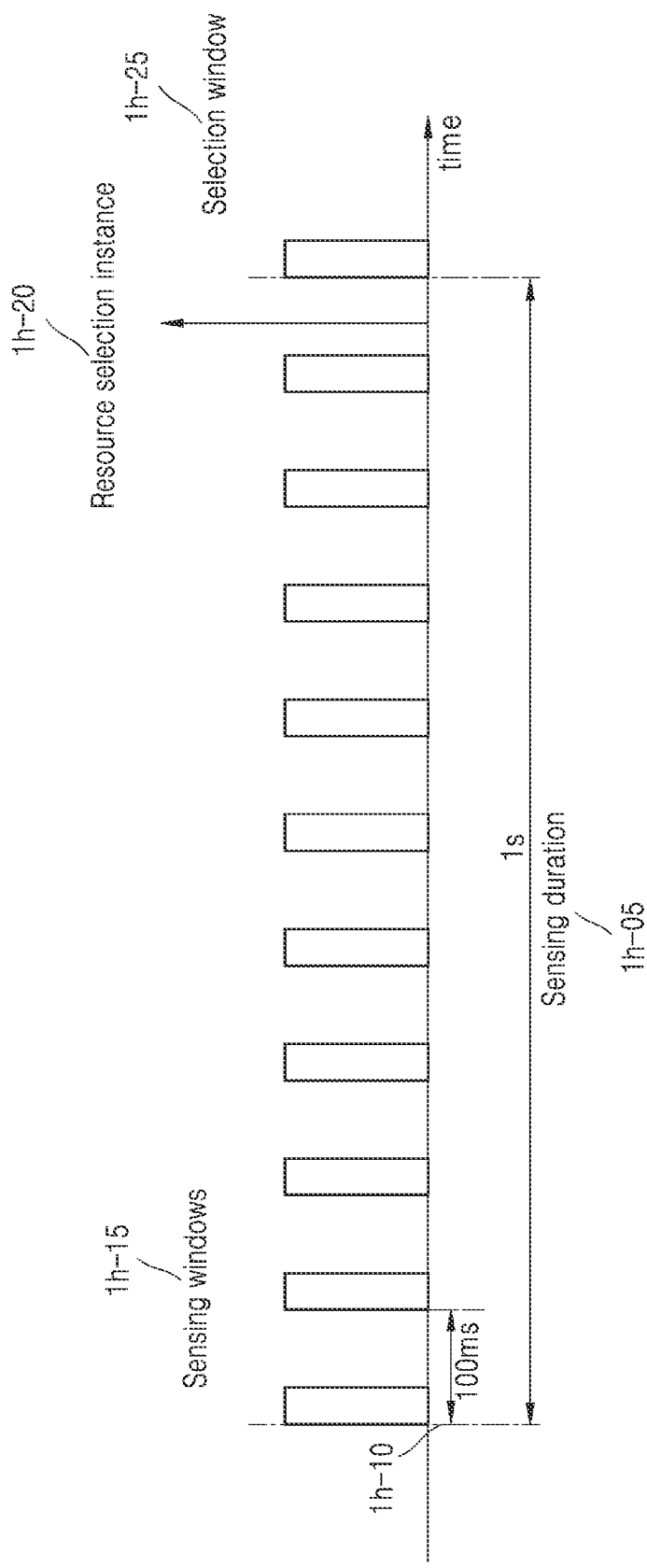
FIG. 1H is a diagram for describing a partial sensing operation of a terminal in V2P communication.

FIG. 1H is a diagram for describing a partial sensing operation of a terminal in vehicle-to-pedestrian (V2P) communication.

Referring to FIG. 1H, a pedestrian portable terminal (or a P2V portable terminal) may perform a random resource selection or partial sensing operation for data transmission/reception. The pedestrian portable terminal may repeat an operation of sensing surrounding resources only for a certain period of 100 ms during a sensing period 1h-05, without using a sensing window of 1 second used in a conventional sensing operation. Here, the sensing window 1h-15 may have a small size of about 10 ms.

The pedestrian portable terminal may select the resources in operation 1h-20 by reflecting a sensing result measured 10 times during the sensing period 1h-05. That is, as a result of sensing, the pedestrian portable terminal may select an empty resource except the resources occupied by other terminals. In operation 1h-25, the pedestrian portable terminal may transmit SA and related data through the resources determined through the selection window. The partial sensing operation may be performed only for a pedestrian portable terminal having sidelink Rx capability.

In a next generation mobile communication system, V2P communication allows communication between a vehicle and other vehicles, infrastructure, road side units (RSUs), and users on the road to improve driver safety, and is expected to support a vulnerable road user use case to smoothly perform autonomous driving. Technical requirements for V2P communication in a next generation mobile communication system to support a vulnerable road user use case may be as follows:

1. Determining a time when a V2P signal is transmitted and a time when a V2P signal is received to reduce power consumption of a pedestrian portable terminal (pedestrian-UE (P-UE)) (here, P-UE refers to a portable terminal of a pedestrian, a bicycle rider, a motorcycle, an impaired person, or a person who is difficult to move due to regional limitations)

2. Positioning accuracy: collision warning message requiring an accuracy of 50 cm to 1 m, and an awareness message requiring an accuracy of 1 m to 5 m 3. Determining a pedestrian using a localized base station (localized infrastructure) having an infra or multi-access edge computing (MEC) function (e.g., a localized base station having a surveillance camera or wireless technology) and cooperatively determining a pedestrian through vehicle-to-vehicle communication The present disclosure provides a method by which a pedestrian portable terminal performs transmission/reception of a V2P signal with the help of a base station/vehicle terminal to support a vulnerable road user use case.

Figure 1I:
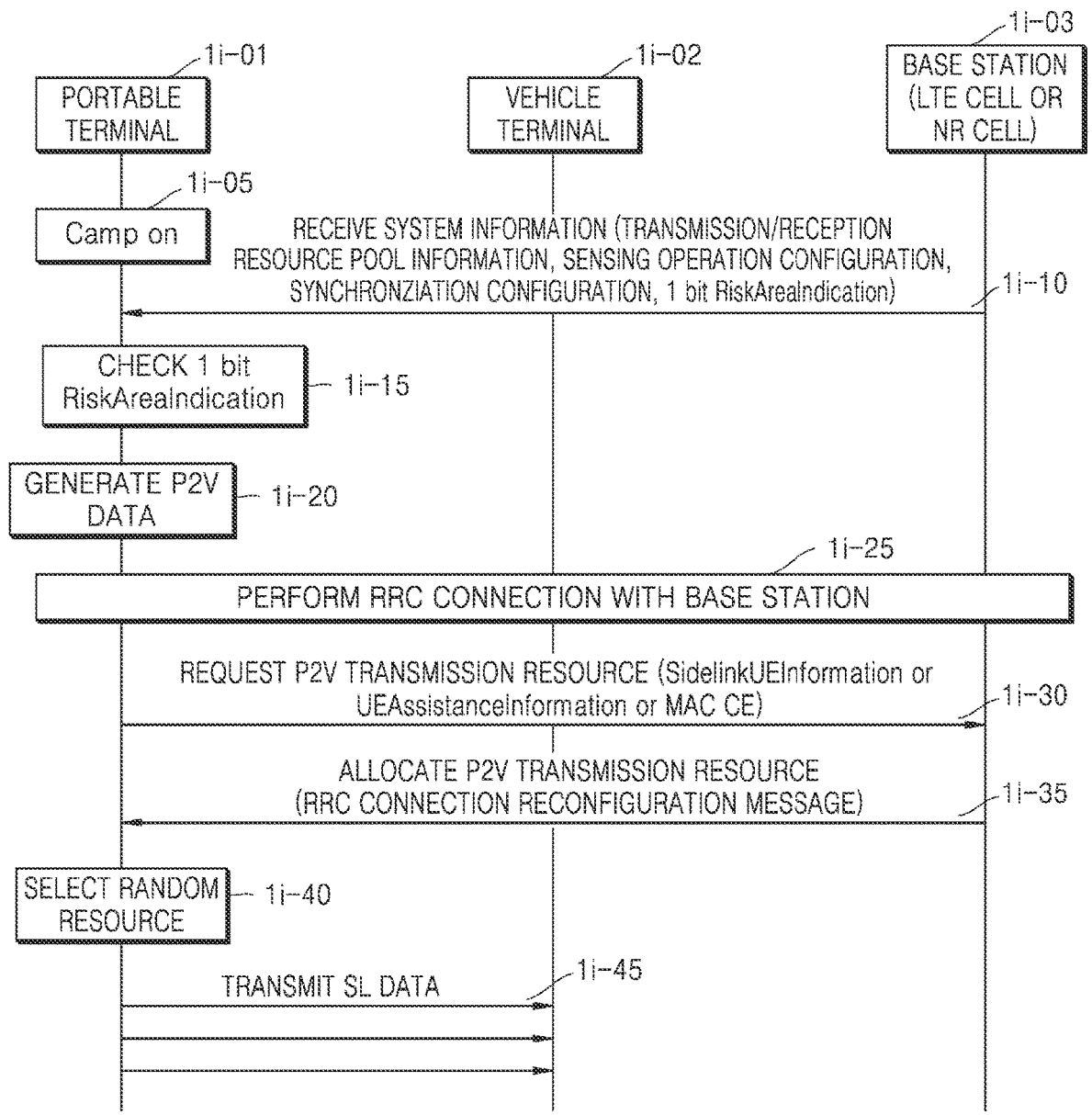
FIG. 1I is a diagram for describing a method by which a pedestrian terminal performs transmission/reception of a V2P signal with the help of a base station/vehicle terminal to reduce power consumption of the pedestrian terminal in V2P communication, according to an embodiment of the present disclosure.

FIG. 1I is a diagram for describing a method by which a pedestrian terminal performs transmission/reception of a V2P signal with the help of a base station/vehicle terminal to reduce power consumption of the pedestrian terminal in vehicle-to-pedestrian (V2P) communication, according to an embodiment of the present disclosure.

Referring to FIG. 1I, a pedestrian portable terminal 1i-01 may camp on an LTE cell or an NR cell 1i-03 (1i-05). The LTE cell or the NR cell 1i-03 configured as a risk area may broadcast system information (SIB21 or SIB26, or SIBx to be newly defined for vehicle communication) including 1 bit indicating a risk area.

The pedestrian portable terminal 1i-01 may camp on the LTE cell or the NR cell and then may receive the system information (1i-10). The pedestrian portable terminal 1i-01 may determine whether the 1 bit indicating the risk area is included in the received system information (e.g., the bit is configured as TRUE) (1i-15). When it is determined that the 1 bit indicating the risk area is not included in the received system information, the pedestrian portable terminal 1i-01 may not transmit a P2V signal to a vehicle terminal 1i-02, and may not receive a V2P signal transmitted by the vehicle terminal 1i-02. When it is determined that the 1 bit indicating the risk area is included in the received system information, the pedestrian portable terminal 1i-01 may receive a V2P message. The pedestrian portable terminal may perform a series of processes to periodically broadcast a P2V message to another vehicle terminal.

The pedestrian portable terminal 1i-01 may generate P2V data to notify whether a pedestrian exists (indicator or GPS coordinates indicating a current location) to a nearby vehicle terminal or another pedestrian terminal 1i-02 (1i-20).

When the pedestrian portable terminal 1i-01 and the vehicle terminal 1i-02 operate in a scheduled resource allocation mode (mode 3), the pedestrian portable terminal 1i-01 and the vehicle terminal 1i-02 may perform RRC connection with the base station 1i-03 (1i-25). An RRC connection procedure may be performed before the P2V data is generated (1i-20). The pedestrian portable terminal 1i-01 may request the base station 1i-03 for transmission resources capable of P2V communication with the vehicle terminal 1i-02 (1i-30). In this case, the pedestrian portable terminal 1i-01 may request the base station 1i-03 for the transmission resources capable of P2V communication by using an RRC message or a MAC CE. Here, SidelinkUEInformation and UEAssistanceInformation messages may be used as the RRC message.

Meanwhile, the MAC CE may be, for example, a buffer status report MAC CE in a new format (including at least an indicator indicating that the corresponding report is a buffer status report for V2P communication and information on a size of data buffered for D2D communication). The base station 1i-03 may allocate P2V transmission resources to the portable terminal 1i-01 through a dedicated RRC message (1i-35). The dedicated RRC message may be included in an RRCConnectionReconfiguration message. The pedestrian portable terminal 1i-01 may randomly select a resource of a time/frequency domain from among the resources or an exception pool indicated by the base station 1i-03 (1i-40), and may periodically transmit the P2V data to the vehicle terminal 1*i*-02 (1*i*-45). The vehicle terminal 1*i*-02 receiving the P2V data may use the P2V data (e.g., indicate a location of the pedestrian portable terminal in a navigation device) while driving, or may transmit the P2V data received from the portable terminal 1*i*-01 to a nearby vehicle terminal.

After the pedestrian portable terminal 1*i*-01 generates the P2V data to notify whether a pedestrian exists to the vehicle terminal 1*i*-02 (1*i*-50), when the pedestrian portable terminal 1*i*-01 operates in a UE autonomous resource allocation mode (mode 4), the pedestrian portable terminal 1*i*-01 may not perform operations 1*i*-25, 1*i*-30, and 1*i*-35, and may select a pool capable of random resource selection from among resource pools transmitted through the system information from the base station 1*i*-03 and may randomly select a resource of a time/frequency domain (1*i*-40).

The pedestrian portable terminal 1*i*-01 may transmit the P2V data to the vehicle terminal 1*i*-02 by using the selected resource of the time/frequency domain (1*i*-45). The vehicle terminal 1*i*-02 receiving the P2V data may use the P2V data (e.g., indicate a location of the pedestrian portable terminal in a navigation device) while driving, or may transmit the P2V data received from the portable terminal 1*i*-01 to a nearby vehicle terminal.

FIG. 1J is a diagram for describing a method by which a pedestrian terminal performs transmission/reception of a vehicle-to-pedestrian (V2P) signal with the help of a base station/vehicle terminal to reduce power consumption of the pedestrian terminal in V2P communication, according to an embodiment of the present disclosure.

Referring to FIG. 1J, a pedestrian portable terminal 1*j*-01 may camp on an LTE cell or an NR cell 1*j*-03 (1*j*-05). The LTE cell or the NR cell 1*j*-03 configured as a risk area may broadcast system information (SIB21 or SIB26, or SIBx to be newly defined for vehicle communication) including a risk area information element (RiskAreaInformation Information Element (RiskAreaInformation IE)). Information indicating a risk area (e.g., GPS coordinates) may be included in the RiskAreaInformation IE included in the system information. The pedestrian portable terminal 1*j*-01 may camp on the LTE cell or the NR cell and then may receive the system information (1*j*-10). The pedestrian portable terminal 1*j*-01 may determine whether the RiskAreaInformation IE is included in the received system information (1*j*-15).

When the RiskAreaInformation IE indicating the risk area is not included in the received system information, the pedestrian portable terminal 1*j*-01 may not transmit a P2V signal to a vehicle terminal 1*j*-02, and may not receive a V2P signal transmitted by the vehicle terminal 1*j*-02. When the RiskAreaInformation IE indicating the risk area is included in the received system information, the pedestrian portable terminal 1*j*-01 may compare its location with the RiskAreaInformation IE. When it is determined that the location of the pedestrian portable terminal 1*j*-01 is within the risk area, the pedestrian portable terminal 1*j*-01 may receive a V2P message. The pedestrian portable terminal 1*j*-01 may perform a series of processes to periodically broadcast a P2V message to another vehicle terminal.

The pedestrian portable terminal 1*j*-01 may generate P2V data to notify whether a pedestrian exists (indicator or GPS coordinates indicating a current location) to a nearby vehicle terminal or another pedestrian terminal 1*j*-02 (1*j*-20).

When the pedestrian portable terminal 1*j*-01 and the vehicle terminal 1*j*-02 operate in a scheduled resource allocation mode (mode 3), the pedestrian portable terminal 1*j*-01 and the vehicle terminal 1*j*-02 may perform RRC connection with the base station 1*j*-03 (1*j*-25). An RRC connection procedure may be performed before the P2V data is generated (1*j*-20). The pedestrian portable terminal 1*j*-01 may request the base station 1*j*-03 for transmission resources capable of P2V communication with the vehicle terminal 1*j*-02 (1*j*-30). In this case, the pedestrian portable terminal 1*j*-01 may request the base station 1*j*-03 for the transmission resources capable of P2V communication by using an RRC message or a MAC CE. Here, SidelinkUEInformation and UEAssistanceInformation messages may be used as the RRC message. Meanwhile, the MAC CE may be, for example, a buffer status report MAC CE in a new format (including at least an indicator indicating that the corresponding report is a buffer status report for V2P communication and information on a size of data buffered for D2D communication).

The base station 1*j*-03 may allocate P2V transmission resources to the portable terminal 1*j*-01 through a dedicated RRC message (1*j*-35). The dedicated RRC message may be included in an RRCConnectionReconfiguration message. The pedestrian portable terminal 1*j*-01 may randomly select a resource of a time/frequency domain from among the resources or an exception pool indicated by the base station 1*j*-03 (1*j*-40), and may periodically transmit the P2V data to the vehicle terminal 1*j*-02 (1*j*-45). The vehicle terminal 1*j*-02 receiving the P2V data may use the P2V data (e.g., indicate a location of the pedestrian portable terminal in a navigation device) while driving, or may transmit the P2V data received from the portable terminal 1*j*-01 to a nearby vehicle terminal.

After the pedestrian portable terminal 1*j*-01 generates the P2V data to notify whether a pedestrian exists to the vehicle terminal 1*j*-02 (1*j*-50), when the pedestrian portable terminal 1*j*-01 operates in a UE autonomous resource allocation mode (mode 4), the pedestrian portable terminal 1*j*-01 may not perform operations 1*j*-25, 1*j*-30, and 1*j*-35, and may select a pool capable of random resource selection from among resource pools transmitted through the system information from the base station 1*j*-03 and may randomly select a resource of a time/frequency domain (1*j*-40). The pedestrian portable terminal 1*j*-01 may transmit the P2V data to the vehicle terminal 1*j*-02 by using the selected resource of the time/frequency domain (1*j*-45). The vehicle terminal 1*j*-02 receiving the P2V data may use the P2V data (e.g., indicate a location of the pedestrian portable terminal in a navigation device) while driving, or may transmit the P2V data received from the portable terminal 1*j*-01 to a nearby vehicle terminal. The pedestrian portable terminal 1*j*-01 may perform a series of processes to periodically broadcast a P2V message to another vehicle terminal.

Figure 1K:
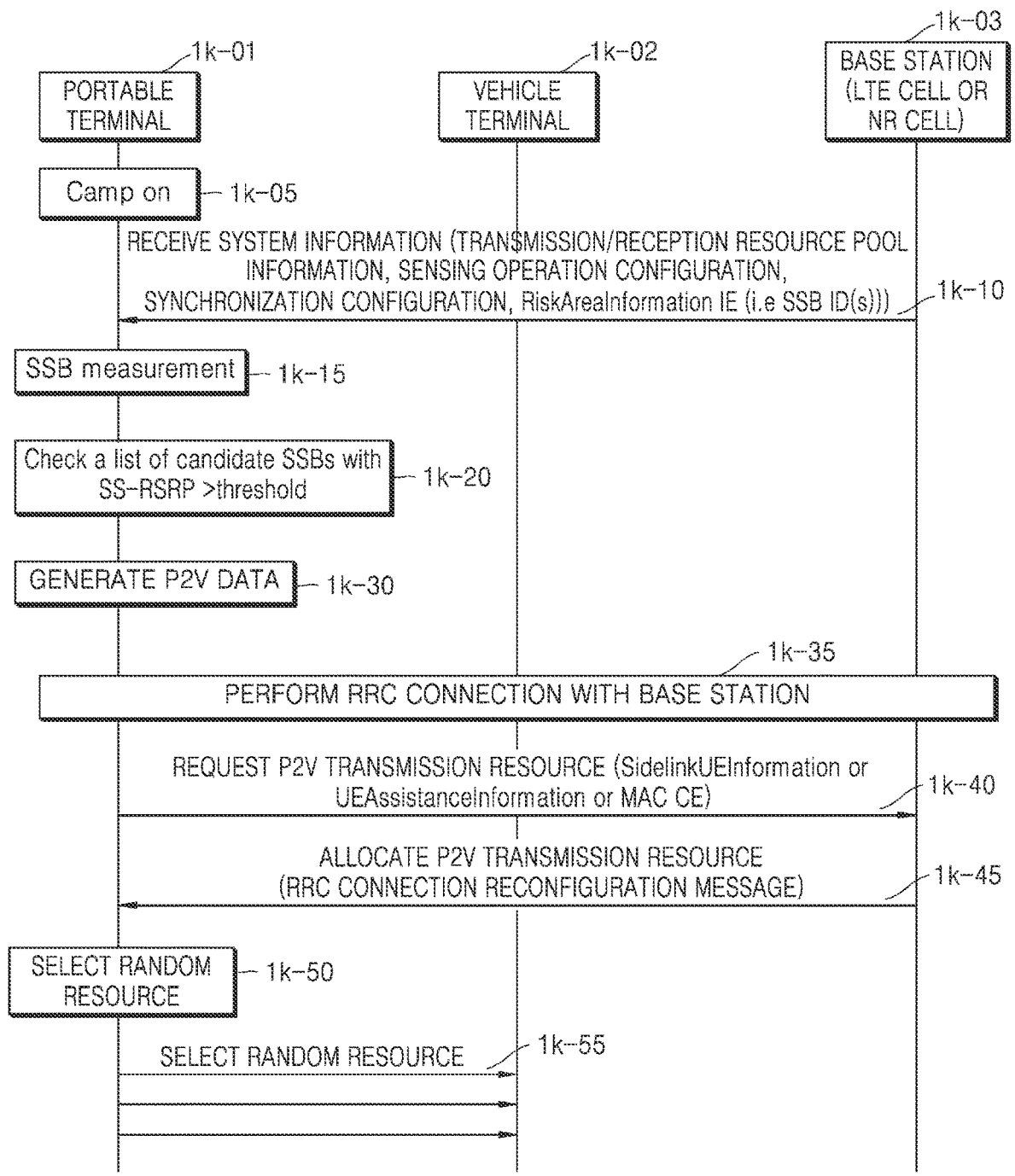
FIG. 1K is a diagram for describing a method by which a pedestrian terminal performs transmission/reception of a V2P signal with the help of a base station/vehicle terminal to reduce power consumption of the pedestrian terminal in V2P communication, according to an embodiment of the present disclosure.

FIG. 1K is a diagram for describing a method by which a pedestrian terminal performs transmission/reception of a vehicle-to-pedestrian (V2P) signal with the help of a base station/vehicle terminal to reduce power consumption of the pedestrian terminal in V2P communication, according to an embodiment of the present disclosure.

Referring to FIG. 1K, a pedestrian portable terminal 1*k*-01 may camp on an LTE cell or an NR cell 1*k*-03 (1*k*-05). The LTE cell or the NR cell 1*k*-03 configured as a risk area may broadcast system information (SIB21 or SIB26, or SIBx to be newly defined for vehicle communication) including a risk area information element (RiskAreaInformation Information Element (RiskAreaInformation IE)). A risk area in the RiskAreaInformation IE included in the system information may be represented as beam information (e.g., synchronization signal/physical broadcast channel block IDs (SSB IDs)). The pedestrian portable terminal 1*k*-01 may camp on the LTE cell or the NR cell and then may receive the system information (1k-10). The pedestrian portable terminal 1k-01 may perform SSB measurement (1k-15). The pedestrian portable terminal 1k-01 may identify an SSB ID list having a synchronization signal reference received power (SS-RSRP) exceeding a threshold as a result of the SSB measurement (1k-20). The pedestrian portable terminal 1k-01 may compare the SSB ID list with the SSB ID(s) included in the system information. When there is no matched SSB ID, the pedestrian portable terminal 1k-01 may not transmit a P2V signal to a vehicle terminal 1k-02, and may not receive a V2P signal transmitted by the vehicle terminal 1k-02. When there is a matched SSB ID, the pedestrian portable terminal 1k-01 may receive a V2P message. The pedestrian portable terminal 1k-01 may perform a series of processes to periodically broadcast a P2V message to another vehicle terminal.

The pedestrian portable terminal 1k-01 may generate P2V data to notify whether a pedestrian exists (indicator or GPS coordinates indicating a current location) to a nearby vehicle terminal or another pedestrian terminal 1k-02 (1k-30).

When the pedestrian portable terminal 1k-01 and the vehicle terminal 1k-02 operate in a scheduled resource allocation mode (mode 3), the pedestrian portable terminal 1k-01 and the vehicle terminal 1k-02 may perform RRC connection with the base station 1k-03 (1k-35). An RRC connection procedure may be performed before the P2V data is generated (1k-30). The pedestrian portable terminal 1k-01 may request the base station 1k-03 for transmission resources capable of P2V communication with the vehicle terminal 1k-02 (1k-40). In this case, the pedestrian portable terminal 1k-01 may request the base station 1k-03 for the transmission resources capable of P2V communication by using an RRC message or a MAC CE. Here, SidelinkUE-Information and UEAssistanceInformation messages may be used as the RRC message. Meanwhile, the MAC CE may be, for example, a buffer status report MAC CE in a new format (including at least an indicator indicating that the corresponding report is a buffer status report for V2P communication and information on a size of data buffered for D2D communication).

The base station 1k-03 may allocate P2V transmission resources to the portable terminal 1k-01 through a dedicated RRC message (1k-45). The dedicated RRC message may be included in an RRCConnectionReconfiguration message. The pedestrian portable terminal 1k-01 may randomly select a resource of a time/frequency domain from among the resources or an exception pool indicated by the base station 1k-03 (1k-50), and may periodically transmit the P2V data to the vehicle terminal 1k-02 (1k-55). The vehicle terminal 1k-02 receiving the P2V data may use the P2V data (e.g., indicate a location of the pedestrian portable terminal in a navigation device) while driving, or may transmit the P2V data received from the portable terminal 1k-01 to a nearby vehicle terminal.

After the pedestrian portable terminal 1k-01 generates the P2V data to notify whether a pedestrian exists to the nearby vehicle terminal 1k-02 (1k-30), when the pedestrian portable terminal 1k-01 operates in a UE autonomous resource allocation mode (mode 4), the pedestrian portable terminal 1k-01 may not perform operations 1k-35, 1k-40, and 1k-45, and may select a pool capable of random resource selection from among resource pools transmitted through the system information from the base station 1k-03 and may randomly select a resource of a time/frequency domain (1k-50). The pedestrian portable terminal 1k-01 may transmit the P2V data to the vehicle terminal 1k-02 by using the selected resource of the time/frequency domain (1k-55). The vehicle terminal 1k-02 receiving the P2V data may use the P2V data (e.g., indicate a location of the pedestrian portable terminal in a navigation device) while driving, or may transmit the P2V data received from the portable terminal 1k-01 to a nearby vehicle terminal.

Figure 1L:
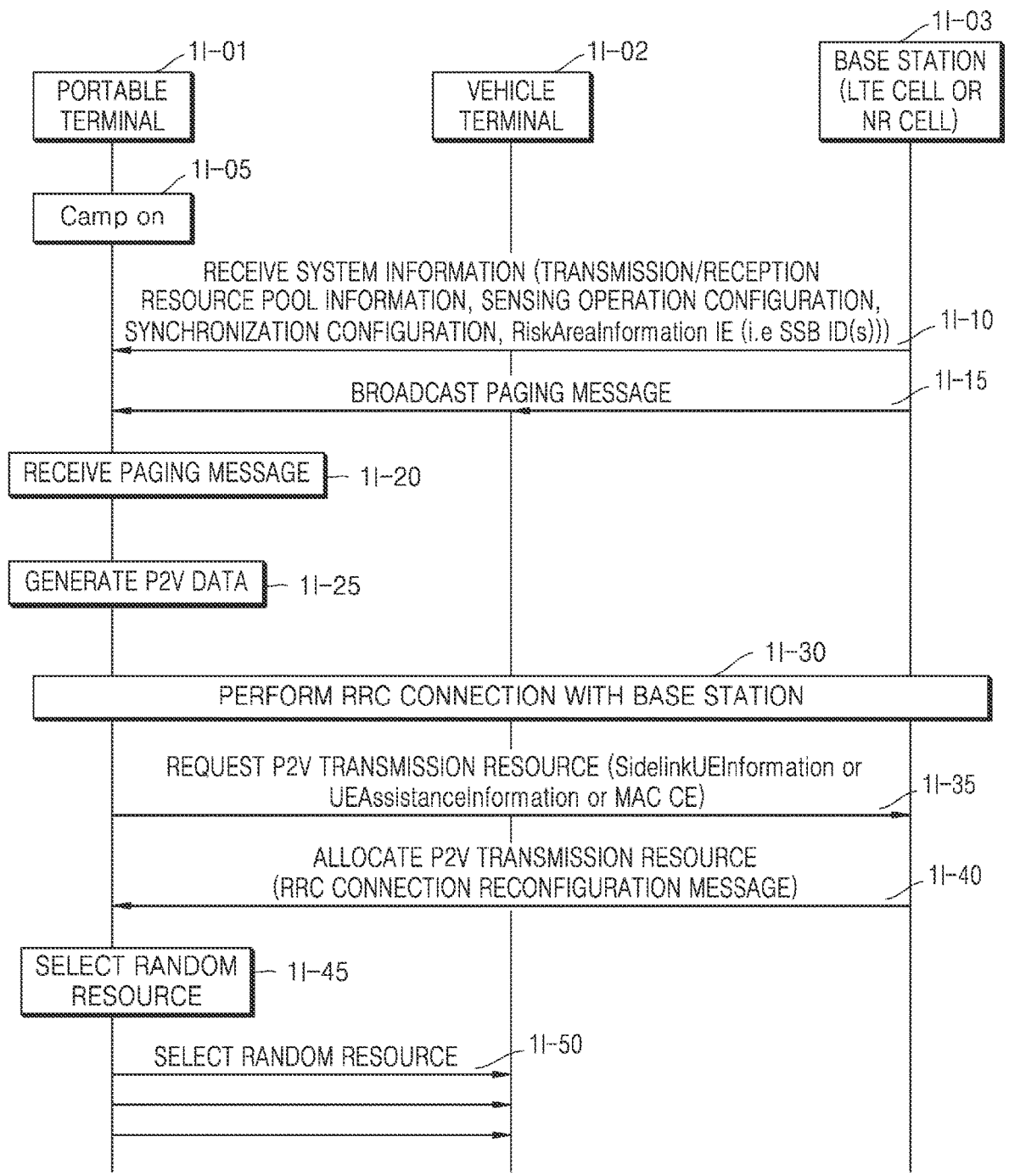
FIG. 1L is a diagram for describing a method by which a pedestrian terminal performs transmission/reception of a V2P signal with the help of a base station/vehicle terminal to reduce power consumption of the pedestrian terminal in V2P communication, according to an embodiment of the present disclosure.

FIG. 1L is a diagram for describing a method by which a pedestrian portable terminal performs transmission/reception of a vehicle-to-pedestrian (V2P) signal with the help of a base station/vehicle terminal to reduce power consumption of the pedestrian terminal in V2P communication, according to an embodiment of the present disclosure.

Referring to FIG. 1L, a pedestrian portable terminal 1l-01 may camp on an LTE cell or an NR cell 1l-03 (1l-05). The LTE cell or the NR cell 1l-03 configured as a risk area may broadcast system information (SIB21 or SIB26, or SIBx to be newly defined for vehicle communication). The pedestrian portable terminal 1l-01 may camp on the LTE cell or the NR cell and then may receive the system information (1l-10). The LTE cell or the NR cell 1l-03 may broadcast a beam-based paging message to a place determined as a risk area (1l-15). In this case, the LTE cell or the NR cell 1l-03 may broadcast the paging message only in a place covered by SSB ID(s) mapped to the risk area, and may broadcast the paging message including 1 bit indicating the risk area. Alternatively, the LTE cell or the NR cell 1l-03 may broadcast the paging message only in a place covered by SSB ID(s) mapped to the risk area, and may broadcast the paging message including 1 bit indicating the pedestrian portable terminal to transmit a P2V message. The pedestrian portable terminal 1l-01 receiving the paging message may receive a V2P message. The pedestrian portable terminal 1l-01 may perform a series of processes to periodically broadcast a P2V message to another vehicle terminal.

The pedestrian portable terminal 1l-01 may generate P2V data to notify whether a pedestrian exists (indicator or GPS coordinates indicating a current location) to a nearby vehicle terminal or another pedestrian terminal 1l-02 (1l-25).

When the pedestrian portable terminal 1l-01 and the vehicle terminal 1l-02 operate in a scheduled resource allocation mode (mode 3), the pedestrian portable terminal 1l-01 and the vehicle terminal 1l-02 may perform RRC connection with the base station 1l-03 (1l-30). An RRC connection procedure may be performed before the P2V data is generated (1l-25). The pedestrian portable terminal 1l-01 may request the base station 1l-03 for transmission resources capable of P2V communication with the vehicle terminal 1l-02 (1l-35). In this case, the pedestrian portable terminal 1l-01 may request the base station 1l-03 for the transmission resources capable of P2V communication by using an RRC message or a MAC CE. Here, SidelinkUE-Information and UEAssistanceInformation messages may be used as the RRC message.

Meanwhile, the MAC CE may be, for example, a buffer status report MAC CE in a new format (including at least an indicator indicating that the corresponding report is a buffer status report for V2P communication and information on a size of data buffered for D2D communication). The base station 1l-03 may allocate P2V transmission resources to the portable terminal 1l-01 through a dedicated RRC message (1l-40). The dedicated RRC message may be included in an RRCConnectionReconfiguration message. The pedestrian portable terminal 1l-01 may randomly select a resource of a time/frequency domain from among the resources or an exception pool indicated by the base station 1l-03 (1l-45), and may periodically transmit the P2V data to the vehicle terminal 1l-02 (1l-50). The vehicle terminal 1l-02 receiving the P2V data may use the P2V data (e.g., indicate a location of the pedestrian portable terminal in a navigation device) while driving, or may transmit the P2V data received from the portable terminal 1*l*-01 to a nearby vehicle terminal.

After the pedestrian portable terminal 1*l*-01 generates the P2V data to notify whether a pedestrian exists to the nearby vehicle terminal 1*l*-02 (1*l*-25), when the pedestrian portable terminal 1*l*-01 operates in a UE autonomous resource allocation mode (mode 4), the pedestrian portable terminal 1*l*-01 may not perform operations 1*l*-30, 1*l*-35, and 1*l*-40, and may select a pool capable of random resource selection from among resource pools transmitted through the system information from the base station 1*l*-03 and may randomly select a resource of a time/frequency domain (1*l*-45). The pedestrian portable terminal 1*l*-01 may transmit the P2V data to the vehicle terminal 1*l*-02 by using the selected resource of the time/frequency domain (1*l*-50). The vehicle terminal 1*l*-02 receiving the P2V data may use the P2V data (e.g., indicate a location of the pedestrian portable terminal in a navigation device) while driving, or may transmit the P2V data received from the portable terminal 1*l*-01 to a nearby vehicle terminal.

FIG. 1M is a diagram for describing a method by which a pedestrian terminal performs transmission/reception of a vehicle-to-pedestrian (V2P) signal with the help of a base station/vehicle terminal to reduce power consumption of the pedestrian terminal in V2P communication, according to an embodiment of the present disclosure.

Referring to FIG. 1M, a pedestrian portable terminal 1*m*-01 may camp on an LTE cell or an NR cell 1*m*-03 (1*m*-05). The LTE cell or the NR cell 1*m*-03 configured as a risk area may broadcast system information (SIB21 or SIB26, or SIBx to be newly defined for vehicle communication). The pedestrian portable terminal 1*m*-01 may camp on the LTE cell or the NR cell 1*m*-03 and then may receive the system information (1*m*-10). The LTE cell or the NR cell may broadcast a beam-based short message to a place determined as a risk area (1*m*-15). The short message in the present disclosure may be defined as follows:

The short message may be transmitted on a physical downlink control channel (PDCCH) using a paging radio network temporary identifier (P-RNTI) with or without associated paging message by using a short message field in DCI format 1_0. The following table defines the short message. Bit 1 is the most significant bit. (Short messages can be transmitted on PDCCH using P-RNTI with or without associated Paging message using Short message field in DCI formal 1_0. The below table defines Short messages. Bit 1 is the most significant bit.)

tem (CMAS) modification. Also, according to the table, when bit 3 in the short message is set to 1, it indicates a risk or P2V/V2P transmission/reception. In the short message, bits 4-8 may not be used, and may be ignored by a UE when received.

In this case, the LTE cell or the NR cell 1*m*-03 may broadcast the short message only in a place covered by SSB ID(s) mapped to the risk area, and 1 bit indicating the risk area may be included in the short message. Information on SSB IDs mapped to the risk area may be provided through the system information or paging message. Alternatively, the LTE cell or the NR cell 1*m*-03 may broadcast the short message only in a place covered by SSB ID(s) mapped to the risk area, and may broadcast the short message including 1 bit indicating the pedestrian portable terminal 1*m*-01 to transmit a P2V message. The pedestrian portable terminal 1*m*-01 receiving the short signal may receive a V2P message. The pedestrian portable terminal 1*m*-01 may perform a series of processes to periodically broadcast a P2V message to another vehicle terminal.

The pedestrian portable terminal 1*m*-01 may generate P2V data to notify whether a pedestrian exists (indicator or GPS coordinates indicating a current location) to a nearby vehicle terminal or another pedestrian terminal 1*m*-02 (1*m*-25).

When the pedestrian portable terminal 1*m*-01 and the vehicle terminal 1*m*-02 operate in a scheduled resource allocation mode (mode 3), the pedestrian portable terminal 1*m*-01 and the vehicle terminal 1*m*-02 may perform RRC connection with the base station 1*m*-03 (1*m*-30). An RRC connection procedure may be performed before the P2V data is generated (1*m*-25). The pedestrian portable terminal 1*m*-01 may request the base station 1*m*-03 for transmission resources capable of P2V communication with the vehicle terminal 1*m*-02 (1*m*-35). In this case, the pedestrian portable terminal 1*m*-01 may request the base station 1*m*-03 for the transmission resources capable of P2V communication by using an RRC message or a MAC CE. Here, SidelinkUEInformation and UEAssistanceInformation messages may be used as the RRC message.

Meanwhile, the MAC CE may be, for example, a buffer status report MAC CE in a new format (including at least an indicator indicating that the corresponding report is a buffer status report for V2P communication and information on a size of data buffered for D2D communication). The base station 1*m*-03 may allocate P2V transmission resources to the portable terminal 1*m*-01 through a dedicated RRC message (1*m*-40). The dedicated RRC message may be included in an RRCConnectionReconfiguration message. The pedes-

| Bit | Short message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 2 | p2vindication (or riskAreaIndication)<br>If set to 1: indication of risk are or P2V/V2P transmission/reception |
| 4-[8] | Not used in this release of the specification, and shall be ignored by UE if received. |

According to the table, when bit 1 in the short message is set to 1, it indicates a broadcast control channel (BCCH) modification other than SIB6, SIB7, and SIB8, and when bit 2 is set to 1, it indicates an earthquake and tsunami warning system (ETWS) primary notification and/or an ETWS secondary notification, and/or a commercial mobile alert systrian portable terminal 1*m*-01 may randomly select a resource of a time/frequency domain from among the resources or an exception pool indicated by the base station 1*m*-03 (1*m*-45), and may periodically transmit the P2V data to the vehicle terminal 1*m*-02 (1*m*-50). The vehicle terminal 1*m*-02 receiving the P2V data may use the P2V data (e.g., indicate a location of the pedestrian portable terminal in a navigation device) while driving, or may transmit the P2V data received from the portable terminal 1m-01 to a nearby vehicle terminal.

After the pedestrian portable terminal 1m-01 generates the P2V data to notify whether a pedestrian exists to the nearby vehicle terminal 1m-02 (1m-25), when the pedestrian portable terminal 1m-01 operates in a UE autonomous resource allocation mode (mode 4), the pedestrian portable terminal 1m-01 may not perform operations 1m-30, 1m-35, and 1m-40, and may select a pool capable of random resource selection from among resource pools transmitted through the system information from the base station 1m-03 and may randomly select a resource of a time/frequency domain (1m-45). The pedestrian portable terminal 1m-01 may transmit the P2V data to the vehicle terminal 1m-02 by using the selected resource of the time/frequency domain (1m-50). The vehicle terminal 1m-02 receiving the P2V data may use the P2V data (e.g., indicate a location of the pedestrian portable terminal in a navigation device) while driving, or may transmit the P2V data received from the portable terminal 1m-01 to a nearby vehicle terminal.

In a next generation mobile communication system, various vertical services such as vehicle-to-everything (V2X) and industrial Internet of things (IIoT) are expected to be activated. Accordingly, various terminals suitable for various vertical services are expected to exist. However, current paging mechanism is designed for various purposes based on a single paging resource set commonly applied to all terminals, without considering requirements of various vertical services and various terminals. A single paging resource set refers to a set of physical/logical resources required to transmit a paging signal for various purposes based on the same paging identifier basically used by all terminals (default and common P-RNTI across UEs). The various purposes refer to a paging message indicating that there is a mobile terminated (MT) call, a short message indicating that system information is changed/modified, and a short message indicating that an accident occurs, to a terminal based on a paging record. Accordingly, a general paging mechanism designed in a UMTS system, an LTE system, or an NR Phase 1 system may be summarized as in Table 1. Referring to Table 1, purposes of general paging may be divided into paging for MT, system information update, and ETWS/CMAS.

TABLE 1

| Category | Purposes | P-RNTI | Relevant Information |
|---|---|---|---|
| General Paging | Paging for MT System Info Update ETWS/CMAS | Default and Common P-RNTI across all UEs | PagingRecord in Paging message systemInfoModification in Short message etwsAndCMasIndication in Short message |

Currently designed general paging is not differently designed for a specific vertical service and all terminals. Accordingly, general paging may unnecessarily provide paging information to specific terminals that desire a specific vertical service, and thus the terminals may unnecessarily wake up and consume power. Accordingly, the present disclosure provides a method by which a base station configures vertical paging in a terminal on a need basis in addition to general paging. The vertical paging may be summarized as in Table 2. According to Table 2, purposes of the vertical paging may be divided into paging for V2X specific MT, paging for V2X specific system information update, and group paging for V2X specific UEs.

TABLE 2

| Category | Purposes | P-RNTI | Relevant Information |
|---|---|---|---|
| General Paging | Paging for MT System Info Update ETWS/CMAS | Default and Common P-RNTI across all UEs | PagingRecord in Paging message systemInfoModification in Short message etwsAndCMasIndication in Short message |
| Paging for Vertical 1. | Paging for V2X specific MT Paging for V2X specific System Info Update Paging for V2X specific P2V indication Group paging for V2V specific UEs | P-RNTI configured for V2X | V2X Paging Record in V2X Paging message V2X-specific systemInfoModification in V2X Short message P2V transmission and V2P reception in V2X Short message V2V PagingRecord in V2X Paging message |
| Paging for Vertical 2. | Paging for IIoT specific MT . . . | P-RNTI configured for IIoT | IIoT PagingRecord in IIoT Paging message . . . |
| Paging for Vertical 3. | . . . | . . . | . . . |

Referring to Table 2, in a next generation mobile communication system, general paging may be basically configured through a base station in a terminal in an RRC idle mode or an RRC inactive mode. For example, when the terminal is subscribed to a V2X service, the base station may propose the terminal to configure V2X paging in addition to the general paging. Although a V2X service is described as an example in the present disclosure, the above method may also be applied even when various other vertical services such as an IIoT service are supported.

Figure 2E:
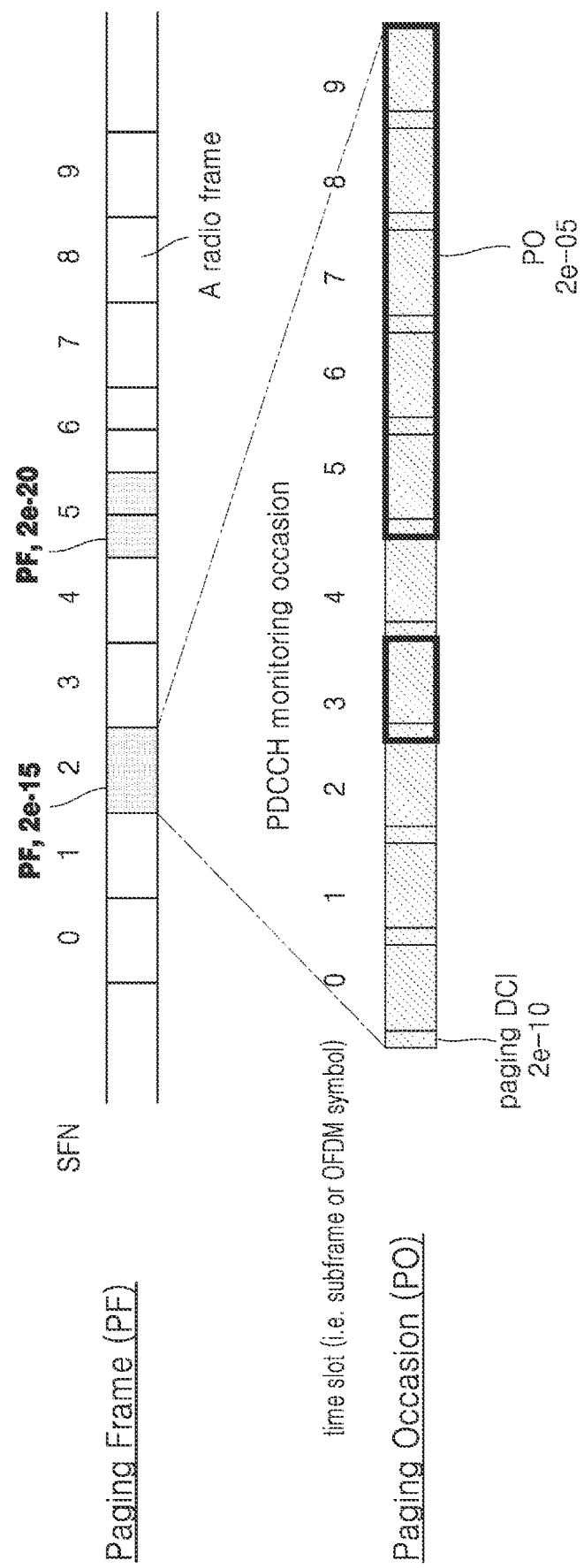
FIG. 2E is a conceptual diagram for describing a general or vertical paging time of a radio resource control (RRC) idle mode or RRC inactive mode terminal in a next generation mobile communication system, according to an embodiment of the present disclosure.

FIG. 2E is a conceptual diagram for describing a general or vertical paging time of an RRC idle mode or RRC inactive mode terminal in a next generation mobile communication system, according to an embodiment of the present disclosure.

In order for the RRC idle mode or RRC inactive mode terminal to receive a paging signal from a base station, the RRC idle mode or RRC inactive mode terminal may perform a discontinuous reception (DRX) operation. The DRX operation refers to trying to receive a paging signal by periodically performing a reception operation in one paging occasion (PO) 2e-05, instead of always monitoring a paging signal, to reduce power consumption. In detail, the PO 2e-05 including a set of PDCCH monitoring occasions may exist in one or more time slots in which paging downlink control information I) 2e-10 is transmitted. A unit of a time slot may be one sub-frame or one OFDM symbol. A system frame number (SFN) may increase by 1 for every radio frame. A paging frame (PF) may exist in a radio frame. Alternatively, a PF including one or more POs may refer to one radio frame (2f-15). Also, as another example, when a PF including one or more POs exists over a plurality of radio frames, starting points of the POs may be regarded as the PF (2f-20).

FIG. 2F is a diagram for describing a method by which an RRC idle mode or RRC inactive mode terminal monitors a general paging signal or a vertical paging signal in a next generation mobile communication system, according to an embodiment of the present disclosure.

Referring to FIG. 2F, an RRC idle mode or RRC inactive mode terminal 2f-01 may camp on an NR cell (2f-05). The RRC idle mode or RRC inactive mode terminal camping on the NR cell may receive system information from the cell (2f-10). The system information may include at least one of MasterInformationBlock (MIB), SystemInformationBlock1 (SIB1), and SystemInformationBlock2 (SIB2) Also, a terminal supporting a vertical service may additionally receive system information (SIBx) for a vertical service (2f-10). The present disclosure provides that a DRX operation of the RRC idle mode or RRC inactive mode terminal receiving the system information is performed through Equations 1 and 2.

A system frame number (SFN) may increase by 1 for every radio frame. When a paging signal is transmitted in a radio frame satisfying Equation 1, the terminal may perform a reception operation by using DRX. The radio frame may be referred to as a paging frame (PF). The PF may include one or more paging occasions. When the PF includes one or more POs over multiple radio frames, starting points of the POs may be regarded as the PF. The RRC idle mode or RRC inactive mode terminal may monitor its paging signal in the PF derived from Equation 1 and one PO derived from Equation 2 (2f-15).

$$(SFN + PF\_offset) \bmod T = (T \text{ div } N) * (UE\_ID \bmod N) \quad \text{Equation 1}$$

$$i\_s = \text{floor}(UE\_ID/N) \bmod Ns \quad \text{Equation 2}$$

Here, each parameter may be defined as follows:
SFN: system frame number, which is 10 bits.
T: DRX cycle of a UE (T is determined as a shortest value of a UE specific DRX value when configured by RRC or upper layers, and has a default ERX value in system information. When UE specific DRX is not specified by RRC or upper layers, a default value may be applied)(DRX cycle of the UE (T is determined by the shortest of the UE specific DRX value, if configured by RRC or upper layers, and a default DRX value in system information. IF UE specific DRX is not configured by RRC or upper layers, the default value is applied).
N: number of total paging frames in T
PF_offset: offset used for PF determination
UE_ID: 5G-S-TMSI mod 1024
I_s: index indicating the start of a set of PDCCH monitoring occasions for the paging DCI The system frame number (SFN) may have 10 bits. A base station may transmit the MasterInformationBlock (MIB) that is one of the system information and explicitly includes six most significant bits of the SFN to the terminal, and may transmit four least significant bits of the SFN to the terminal as part of channel coding in a physical broadcast channel (PBCH) transport block. In Table 2, in order to receive a general paging signal, the terminal may derive Equations 1 and 2 by applying paging channel configuration information (PCCH-Config) included in the SIB1 broadcast from the base station (2f-15). In contrast, in Table 2, in order to receive a vertical paging signal, the terminal may derive Equations 1 and 2 by applying vertical paging channel configuration information (PCCH-Config for Vertical Paging) included in the SIBx broadcast by the base station (2f-20).

In operation 2f-20, in order to receive a general paging signal, the terminal may apply a default DRX cycle (defaultPagingCycle) included in the SIB broadcast by the base station. In operation 2f-20, in order to receive a vertical paging signal, the terminal may apply a default DRX cycle (defaultPagingCycle for vertical paging) to the SIBx broadcast by the base station. When a defaultPagingCycle for vertical paging value does not exist in the SIBx broadcast by the base station, the terminal may apply a default DRX cycle (defaultPagingCycle) included in the SIB1 broadcast by the base station.

A T value in Equation 1 may be derived through coordination between the terminal, the base station, and an AMF. When the terminal wants a DRX cycle shorter than a default DRX cycle, the terminal may provide a UE specific DRX value to the AMF through an ATTACH process. When there exists paging for the terminal, the AMF may transmit the UE specific DRX value received from the terminal along with the paging to the base station. The terminal may determine a shorter value from among the UE specific DRX value transmitted to the AMF and a default DRX value received from the base station as a DRX cycle. The base station may also determine a shorter value from among the UE specific DRX value received from the AMF and the default DRX value broadcast from the base station as a DRX cycle. A DRX cycle value may be an actual T value in Equation 1. Accordingly, the terminal and the base station may select the same DRX cycle. The base station may determine a PF by using Equation 1 based on the DRX cycle, and then may transmit paging to the terminal. In order to receive a general paging signal, the terminal may apply the number of all PFs in T (N), an offset used for PF determination (PF_offset), the number of POs for a PF (Ns), and a value indicating a first PDDCH monitoring occasion of each PO in the PF (firstPDDCH-MonitoringOccasionOfPO), by using paging channel configuration information included in the SIB1 broadcast by the base station. Also, in order to receive a vertical paging signal, the terminal may apply the number of all PFs in T (N), an offset used for PF determination (PF_offset), the number of POs for a PF (Ns), and a value indicating a first PDDCH monitoring occasion of each PO in the PF (firstPDDCH-MonitoringOccasionOfPO), by using vertical paging channel configuration information included in the SIBx broadcast by the base station. When an N value does not exist in the SIBx, the terminal may derive Equation 1 or 2 by applying an N value broadcast in the SIB1 to receive a vertical paging signal. Likewise, the terminal may derive Equation 1 or 2 by applying each value of the above procedure to PF_offset, Ns, and firstPDCCH-MonitoringOccasionOfPO. 5G-S-temporary mobile subscriber identity (TMSI) may be a unique number assigned when the terminal is registered in a network, and UE_ID may be 0 when the terminal is not registered in the network.

PDDCH monitoring occasions for receiving a general paging signal may be determined by a paging search space configured in the SIB1 transmitted by the base station to the terminal and firstPDCCH-MonitoringOccasionOfPO configured in the SIBx. Otherwise, PDCCH monitoring occasions for receiving a general paging signal may be associated and determined to be the same as for remaining minimum system information (RMSI), which may be referred to as default association. When PDCCH monitoring occasions for receiving a general paging signal are default associated, Ns may have a value of 1 or 2. When Ns has a value of 1, i_s may have a value of 0 by Equation 2. This means that there exists only one PO starting from one PF. When Ns has a value of 1, the terminal may monitor a paging signal in a PF derived from Equation 1 and a PO derived according to Equation 2. When Ns has a value of 2, i_s may have a value of 0 or 1 by Equation 2. When i_s is 0, it means a first half radio frame, and when i_s is 1, it means a second half radio frame. That is, when an i_s value derived according to Equation 2 in a PF derived from Equation 1 is 0, the terminal may monitor a paging signal in a first half radio frame (meaning PO) of the PF, and when the value derived from Equation 2 is 1, the terminal may monitor a paging signal in a second half radio frame (meaning PO) of the PF (2f-25).

When a paging search space is used and PDCCH monitoring occasions for receiving a general paging signal are not default associated (non-default association), the terminal may perform monitoring of a paging signal by monitoring a (i_s+1)th PO by using an is value derived from Equation 2 in a PF derived from Equation 1 (2f-25). In this case, when PDCCH monitoring occasions for receiving a general paging signal do not overlap uplink symbols, the PDCCH monitoring occasions may be indexed from 0 starting from a first PDCCH monitoring occasion. When firstPDCCH-MonitoringOccasionOfPO exists in the SIB1, a (i_s+1)th PO refers to a set of S consecutive PDCCH monitoring occasions from a PDCCH monitoring occasion indicated by the firstPDCCH-MonitoringOccasionOfPO. Otherwise, a (i_s+1)th PO refers to a set of S consecutive PDCCH monitoring occasions from a (i_s*S)th PDCCH monitoring occasion. Here, S refers to the number of synchronization signal/physical broadcast channel blocks (SSBs) that are actually transmitted, and may be determined by ssb-PositionsInBurst included in the SIB1. A Kth PDDCH monitoring occasion in a PO corresponds to an SSB that is transmitted in a Kth place.

PDDCH monitoring occasions for receiving a vertical paging signal in the above embodiment may be determined by a paging search space configured in the SIB1 and firstPDCCH-MonitoringOccasionOfPO configured in the SIBx transmitted from the base station to the terminal. Otherwise, PDCCH monitoring occasions for receiving a vertical paging signal may be associated and determined to be the same as for remaining minimum system information (RMSI), which may be referred to as default association. When PDCCH monitoring occasions for receiving a vertical paging signal are default associated, Ns may have a value of 1 or 2. When Ns has a value of 1, i_s may have a value of 0 by Equation 2. This means that there exists only one PO starting from one PF. When Ns has a value of 1, the terminal may monitor a paging signal in a PF derived from Equation 1 and a PO derived from Equation 2 (2f-30). When Ns has a value of 2, is may have a value of 0 or 1 by Equation 2. When i_s is 0, it may mean a first half radio frame, and when i_s is 1, it may man a second half radio frame. That is, when an i_s value derived from Equation 2 in a PF derived from Equation 1 is 0, the terminal may monitor a paging signal in a first half radio frame (meaning PO) of the PF, and when the value derived from Equation 2 is 1, the terminal may monitor a paging signal in a second half radio frame (meaning PO) of the PF.

When a paging search space is used and PDCCH monitoring occasions for receiving a vertical paging signal are not default associated (non-default association), the terminal may perform monitoring of a paging signal by monitoring a (i_s+1)th PO by using an is value derived from Equation 2 in a PF derived from Equation 1 (2f-30). In this case, when PDCCH monitoring occasions for receiving a vertical paging signal do not overlap uplink symbols, the PDCCH monitoring occasions may be indexed from 0 starting from a first PDCCH monitoring occasion. When firstPDCCH-MonitoringOccasionOfPO exists in the SIBx, a (i_s+1)th PO refers to a set of S consecutive PDCCH monitoring occasions from a PDCCH monitoring occasion indicated by the firstPDCCH-MonitoringOccasionOfPO. Otherwise, a (i_s+1)th PO refers to a set of S consecutive PDCCH monitoring occasions from a (i_s*S)th PDCCH monitoring occasion. Here, S refers to the number of synchronization signal/physical broadcast channel blocks (SSBs) that are actually transmitted, and may be determined by ssb-PositionsInBurst included in the SIB1 or may be determined by ssb-PositionsInBurst included in the SIBx. A Kth PDDCH monitoring occasion in a PO corresponds to an SSB that is transmitted in a Kth place.

Figure 2G:
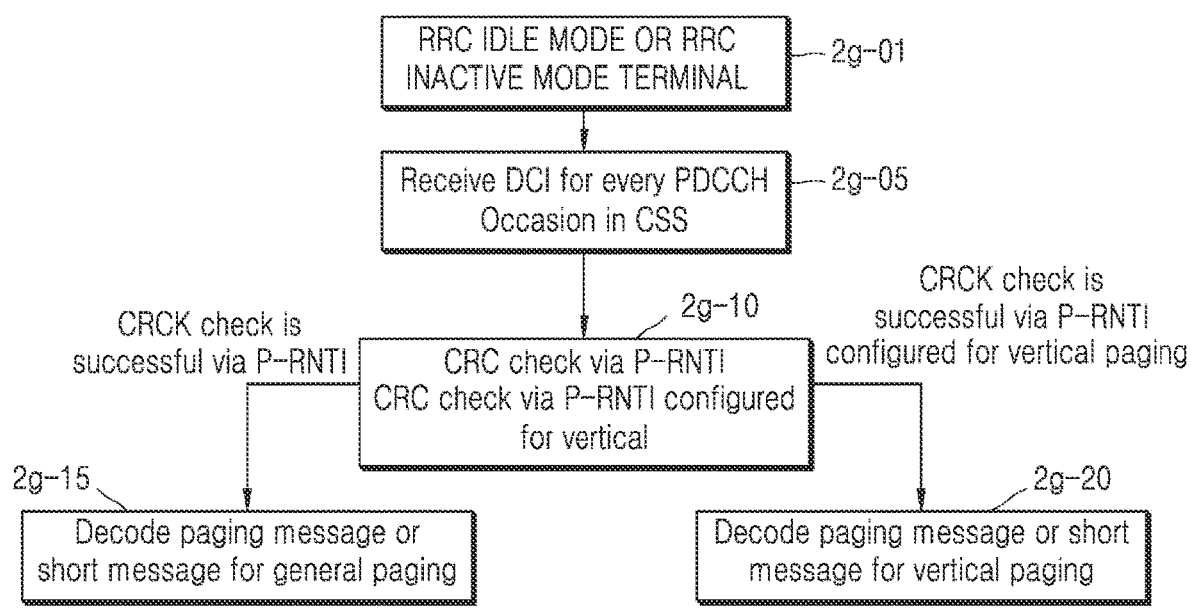
FIG. 2G is a diagram for describing a method by which an RRC idle mode or RRC inactive mode terminal receives downlink control information (DCI) to receive a general paging signal or a vertical paging signal and interprets the paging signal in a next generation mobile communication system, according to an embodiment of the present disclosure.

FIG. 2G is a diagram for describing a method by which an RRC idle mode or RRC inactive mode terminal receives DCI to receive a general paging signal or a vertical paging signal and interprets the paging signal in a next generation mobile communication system, according to an embodiment of the present disclosure.

Referring to FIG. 2G, an RRC idle mode or RRC inactive mode terminal 2g-01 may receive DCI for all PDCCH occasions in a common search space (CSS) to receive a general paging signal or a vertical paging signal (2g-05). In operation 2g-10, the RRC idle mode or RRC inactive mode terminal may perform a cyclic redundancy check (CRC) by using a default and common P-RNTI across all UEs, to receive a general paging signal. In operation 2g-10, the RRC idle mode or RRC inactive mode terminal may perform a CRC by using a P-RNTI configured for vertical paging, to receive a vertical paging signal. When the CRC is successfully performed by using the P-RNTI, the terminal may determine a short message for a general paging signal and may decode the short message (2g-15). A message received through a PDSCH scheduled in DCI in which the CRC is successfully performed through the P-RNTI may be determined as a general paging message and may be decoded (2g-15). When the CRC is successfully performed by using the P-RNTI configured for vertical paging, the terminal may determine a short message for a vertical paging signal and may decode the short message (2g-20). A message received through a PDSCH scheduled in DCI where the CRC is successfully performed through the P-RNTI configured for vertical paging may be determined as a paging message for a vertical paging signal and may be decoded (2g-20).

Figure 2H:
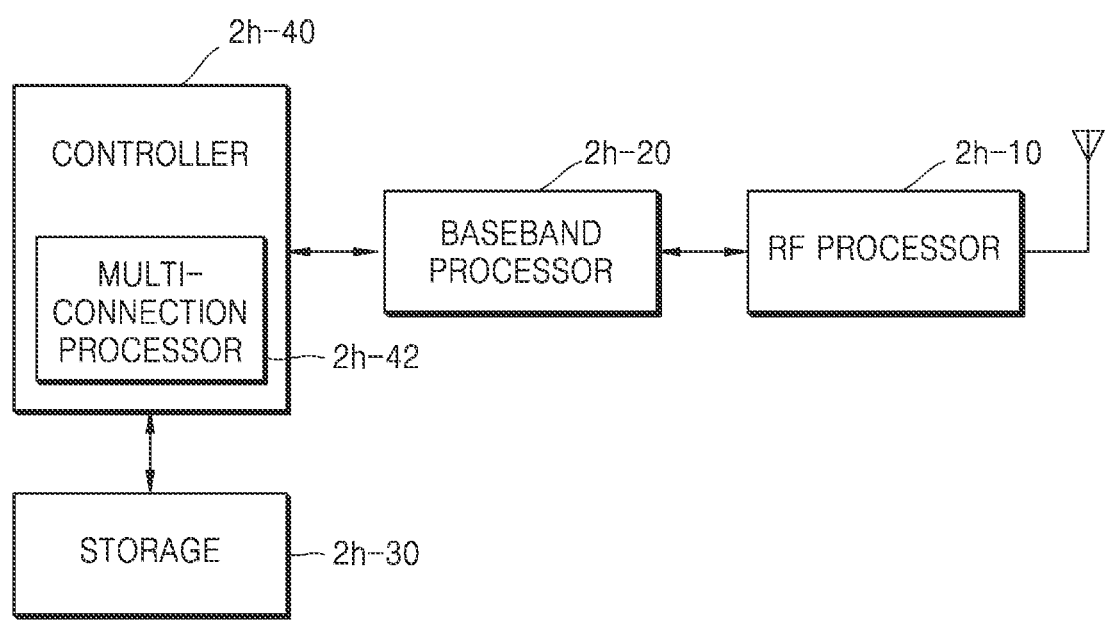
FIG. 2H is a block diagram illustrating a structure of a terminal according to an embodiment of the present disclosure.
Figure 21:
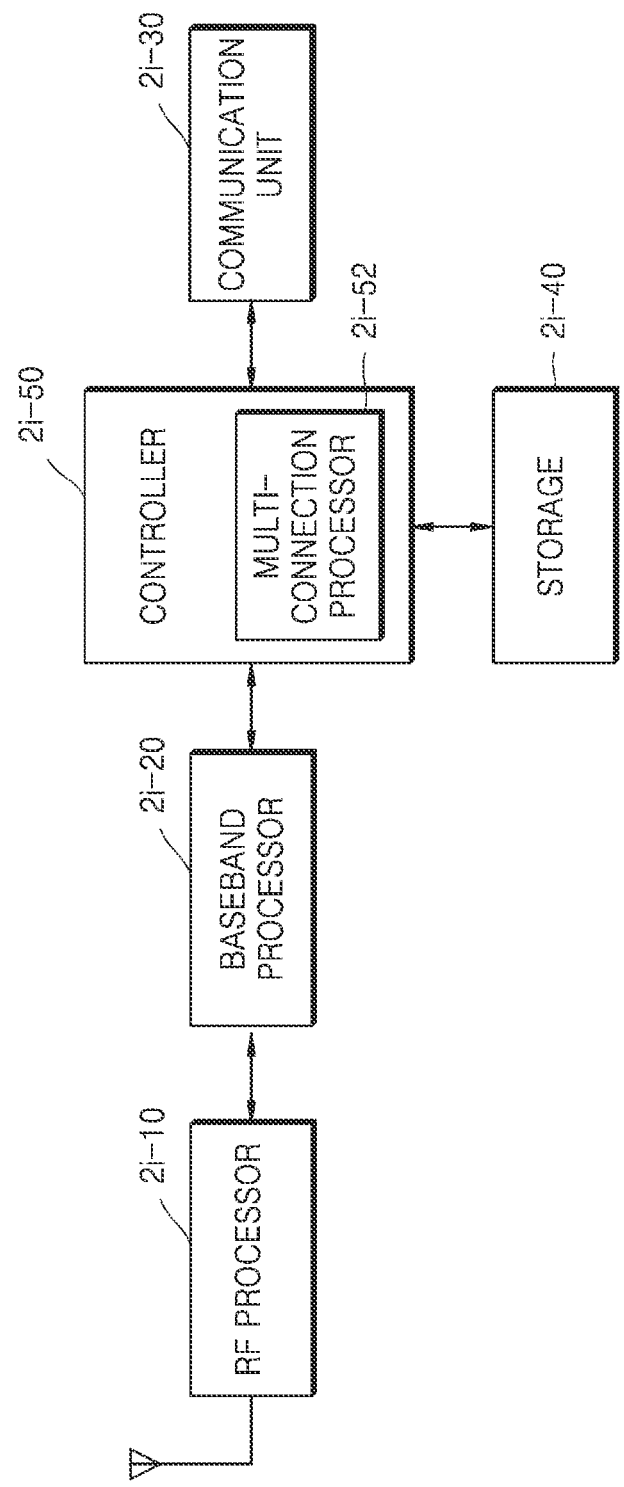

FIG. 2H is a block diagram illustrating a structure of a terminal according to an embodiment of the present disclosure.

The terminal may include a radio frequency (RF) processor 2h-10, a baseband processor 2h-20, a storage 2h-30, and a controller 2h-40.

The terminal according to an embodiment of the present disclosure may perform operations for implementing the above embodiments described with reference to FIGS. 1A through 2G.

The RF processor 2h-10 according to an embodiment of the present disclosure may perform a function for transmitting/receiving a signal through a wireless channel such as band conversion and amplification of a signal. That is, the RF processor 2h-10 may up-convert a baseband signal applied from the baseband processor 2h-20 into an RF band signal and then may transmit the RF band signal through an antenna, and may down-convert an RF band signal received through the antenna into a baseband signal. For example, the RF processor 2h-10 may include a transmission filter, a reception filter, an amplifier, a mixer, an oscillator, a digital-to-analog converter (DAC), an analog to digital converter (ADC), and the like.

Although only one antenna is shown in FIG. 2H, the terminal may include a plurality of antennas.

Also, the RF processor 2h-10 may include a plurality of RF chains. Furthermore, the RF processor 2h-10 may perform beamforming. For the beamforming, the RF processor 2h-10 may adjust a phase and size of each of signals transmitted/received through a plurality of antennas or antenna elements. Also, the RF processor 2h-10 may perform multiple-input multiple-output (MIMO), and may receive multiple layers during a MIMO operation. The RF processor 2h-10 may perform reception beam sweeping by appropriately configuring a plurality of antennas or antenna elements under the control of the controller 2h-40, or may adjust a direction and beam width of a reception beam so that the reception beam is coordinated with a transmission beam.

The baseband processor 2h-20 may perform a conversion function between a baseband signal and a bit string according to a physical layer specification of a system. For example, during data transmission, the baseband processor 2h-20 may generate complex symbols by encoding and modulating a transmitted bit string. Also, during data reception, the baseband processor 2h-20 may recover a received bit string by demodulating and decoding a baseband signal applied from the RF processor 2h-10. For example, according to an orthogonal frequency division multiplexing (OFDM) scheme, during data transmission, the baseband processor 2h-20 may generate complex symbols by encoding and modulating a transmitted bit string, may map the complex symbols to subcarriers, and then may construct OFDM symbols through an inverse fast Fourier transform (IFFT) operation and cyclic prefix (CP) insertion. Also, during data reception, the baseband processor 2h-20 may divide a baseband signal applied from the RF processor 2h-10 into OFDM symbol units, may recover signals mapped to subcarriers through a fast Fourier transform (FFT) operation, and then may recover a received bit string through demodulation and decoding.

The baseband processor 2h-20 and the RF processor 2h-10 may transmit and receive a signal as described above. Accordingly, each of the baseband processor 2h-20 and the RF processor 2h-10 may be referred to as a transmitter, a receiver, a transceiver, or a communication unit. Furthermore, at least one of the baseband processor 2h-20 and the RF processor 2h-10 may include a plurality of communication modules to support a plurality of different radio access technologies. Also, at least one of the baseband processor 2h-20 and the RF processor 2h-10 may include different communication modules to process signals in different frequency bands. For example, the different radio access technologies may include an LTE network, an NR network, and the like. Also, the different frequency bands may include a super high frequency (SHF) band (e.g., 2.2 GHz or 2 GHz), and a millimeter wave band (e.g., 60 GHz).

The storage 2h-30 may store data such as a default program, an application program, or configuration information for operating the terminal. The storage 2h-30 may provide the stored data according to a request of the controller 2h-40.

The controller 2h-40 may control overall operations of the terminal. For example, the controller 2h-40 may transmit/receive a signal through the baseband processor 2h-20 and the RF processor 2h-10. Also, the controller 2h-40 may record data to and read data from the storage 2h-40. To this end, the controller 2h-40 may include at least one processor. For example, the controller 2h-40 may include a communication processor (CP) for performing communication control and an application processor (AP) for controlling an upper layer such as an application program. Also, the controller 2h-40 according to an embodiment may include a multi-connection processor 2h-42.

FIG. 2I is a block diagram illustrating a structure of a base station according to an embodiment of the present disclosure.

The base station according to an embodiment of the present disclosure may include a transmission/reception point (TRP).

The base station according to an embodiment of the present disclosure may include an RF processor 2i-10, a baseband processor 2i-20, a communication unit 2i-30, a storage 2i-40, and a controller 2i-50.

The base station according to the present disclosure may perform operations for implementing the above embodiments described with reference to FIGS. 1A through 2G.

The RF processor 2i-10 may perform a function for transmitting/receiving a signal through a wireless channel such as band conversion and amplification of a signal. That is, the RF processor 2i-10 may up-convert a baseband signal applied from the baseband processor 2i-20 into an RF band signal and then may transmit the RF band signal through an antenna, and may down-convert an RF band signal received through the antenna into a baseband signal. For example, the RF processor 2i-10 may include a transmission filter, a reception filter, an amplifier, a mixer, an oscillator, a DAC, an ADC, and the like.

Although only one antenna is shown in FIG. 2I, the base station may include a plurality of antennas.

Also, the RF processor 2i-10 may include a plurality of RF chains. Furthermore, the RF processor 2i-10 may perform beamforming. For the beamforming, the RF processor 2i-10 may adjust a phase and size of each of signals transmitted/received through a plurality of antennas or antenna elements. The RF processor 2i-10 may perform a downlink MIMO operation by transmitting one or more layers.

The baseband processor 2i-20 may perform a conversion function between a baseband signal and a bit string according to a physical layer specification of first radio access technology. For example, during data transmission, the baseband processor 2i-20 may generate complex symbols by encoding and modulating a transmitted bit string. Also, during data reception, the baseband processor 2i-20 may recover a received bit string by demodulating and decoding a baseband signal applied from the RF processor 2i-10. For example, according to an OFDM scheme, during data transmission, the baseband processor 2i-20 may generate complex symbols by encoding and modulating a transmitted bit string, may map the complex symbols to subcarriers, and then may construct OFDM symbols through an IFFT operation and CP insertion. Also, during data reception, the baseband processor 2*i*-20 may divide a baseband signal applied from the RF processor 2*i*-10 into OFDM symbol units, may recover signals mapped to subcarriers through an FFT operation, and then may recover a received bit string through demodulation and decoding. The baseband processor 2*i*-20 and the RF processor 2*i*-10 may transmit and receive a signal as described above.

Accordingly, each of the baseband processor 2*i*-20 and the RF processor 2*i*-10 may be referred to as a transmitter, a receiver, a transceiver, a communication unit, or a wireless communication unit.

The communication unit 2*i*-30 may provide an interface for performing communication with other nodes in a network. That is, the communication unit 2*i*-30 may convert a bit string transmitted from a primary base station to another node, for example, an auxiliary base station or a core network into a physical signal, and may convert a physical signal received from the other node into a bit string.

The storage 2*i*-40 may store data such as a default program, an application program, or configuration information for operating the base station. In particular, the storage 2*i*-40 may store information on a bearer allocated to an accessed terminal, a measurement result reported from the accessed terminal, and the like. Also, the storage 2*i*-40 may store information that is a criterion for determining whether to provide or stop multiple connections to the terminal. The storage 2*i*-40 may provide the stored data according to a request of the controller 2*i*-50.

The controller 2*i*-50 may control overall operations of the base station. For example, the controller 2*i*-50 may transmit/receive a signal through the baseband processor 2*i*-20 and the RF processor 2*i*-10 or through the communication unit 2*i*-30. Also, the controller 2*i*-50 may record data to and read data from the storage 2*i*-40. To this end, the controller 2*i*-50 may include at least one processor. Also, the controller 2*i*-50 according to an embodiment may include a multi-connection processor 2*i*-52.

FIG. 3E is a diagram for describing a procedure by which a terminal performs an RRC connection establishment procedure with a base station to switch from an RRC idle mode to an RRC connected mode and a procedure by which the base station and the terminal perform an RRC connection reconfiguration (RRC reconfiguration) procedure, according to an embodiment of the present disclosure.

Referring to FIG. 3E, a UE 3*e*-01, may be in an RRC connected mode (RRC_CONNECTED) by configuring RRC connection with a gNB 3*e*-02 (3*e*-05). When the UE 3*e*-01 has not transmitted or received data for some reason or for a certain period of time in the RRC connected mode, the gNB 3*e*-02 may make the UE 3*e*-01 switch to an RRC idle mode (RRC_IDLE) by transmitting an RRC connection release message (RRCRelease) that includes no suspend configuration information (suspendConfig) to the UE 3*e*-01 (3*e*-10). In the RRC idle mode, the UE 3*e*-01 may search for and camp on a suitable cell through a cell selection procedure and/or a cell re-selection procedure and may receive system information (3*e*-15).

The UE 3*e*-01 may perform a random access procedure to configure RRC connection with the gNB 3*e*-02. When random access is triggered (3*e*-16), the UE 3*e*-01 may select a physical random access channel (PRACH) occasion and may transmit a random access preamble to the gNB 3*e*-02 (3*e*-20). When receiving the random access preamble, the gNB 3*e*-02 may transmit a random access response (RAR) message to the UE 3*e*-01 (3*e*-25). The UE 3*e*-01 in the RRC idle mode may establish reverse transmission synchronization with the gNB 3*e*-02 in operations 3*e*-20 and 3*e*-25.

After establishing the reverse transmission synchronization, the UE 3*e*-01 in the RRC idle mode may perform an RRC connection establishment procedure with the gNB 3*e*-02. First, the UE 3*e*-01 may transmit an RRC connection setup request message (RRCSetupRequest) to the gNB 3*e*-02 (3*e*-30). The message may include a UE identifier (ue-Identity) and a cause (establishmentCause) for configuring RRC connection. When receiving the RRC connection setup request message, the gNB 3*e*-02 may transmit an RRC connection setup message (RRCSetup) to the UE 3*e*-01 (3*e*-35). The message may include radio bearer configuration information (radioBearerConfig) and master cell group configuration information (masterCellGroup). In detail, the radio bearer configuration information and the master cell group configuration information may include information involving signaling radio bearer 1 (SRB1) connection, RLC bearer configuration information for an SRB1, MAC cell group configuration information (mac-CellGroupConfig), and physical cell group configuration information (physicalCellGroupConfig). That is, the RRC connection establishment may involve SRB1 connection and may not involve other radio bearer connection except an SRB1 (e.g., the RRC connection establishment may not involve SRB2 connection for transmitting or receiving a NAS message or data radio bearer (DRB) connection for transmitting or receiving data between the UE 3*e*-01 and the gNB 3*e*-02). When receiving the RRC connection setup message, the UE 3*e*-01 may apply the above information and may switch to the RRC connected mode (3*e*-36). After switching to the RRC connected mode, the UE 3*e*-01 may transmit an RRC connection setup complete message (RRCSetupComplete) to the gNB 3*e*-02 through the SRB1 (3*e*-40). The message may include a service request message in which the UE 3*e*-01 requests an AMF or the MMF to configure a bearer for a certain service.

When the RRC connection establishment procedure is successfully performed, the gNB 3*e*-02 may transmit a security mode command message (securitymodecommand) to the UE 3*e*-01 to activate AS security with the UE 3*e*-01 that is in the RRC connected mode (3*e*-45). When receiving the security mode command message, the UE 3*e*-01 may transmit a security mode complete message (SecurityModeComplete) to the gNB 3*e*-02 (3*e*-50).

The gNB 3*e*-02 may perform an RRC connection reconfiguration (RRC reconfiguration) procedure with the UE 3*e*-01 when or after transmitting the security mode command message or after receiving the security mode complete message. First, the gNB 3*e*-02 may transmit an RRC connection reconfiguration message (RRCReconfiguration) to the UE 3*e*-01 (3*e*-55). The message may include some or all of the following information:

Indicator indicating whether to apply full configuration information (fullConfig)

Radio bearer configuration information (radioBearerConfig): radioBearerConfig may include at least one of the following information:

SRB list to be added or modified (srb-ToAddModList):

srb-ToAddModList may include one or more SRB configuration information (SRB-ToAddMod), and each SRB-ToAddMod may include an SRB identifier (srb-Identity), an indicator (reestablishmentPDCP) indicating whether to re-establish a PDCP, an indicator indicating whether to discard a service data unit (SDU) and a protocol data unit (PDU) stored in the UE, or PDCP configuration information (pdcp-Config).

Indicator indicating whether to release an SRB3 (srb3-ToRelease): An SRB3 may be released only through an SRB1, and the SRB3 may be released only when a secondary cell group (SCG) configured in the UE is released and/or only by reconfiguration with sync.

DRB list to be added or modified (drb-ToAddModList): drb-ToAddModList may include one or more DRB configuration information (DRB-ToAddMod), and each DRB-ToAddMod may include a DRB identifier (drb-Identity), an indicator (reestablishmentPDCP) indicating whether to re-establish a PDCP, an indicator (recoverPDCP) indicating whether a PDCP is to perform a recovery procedure, PDCP configuration information (pdcp-Config), or information (cnAssociation) indicating whether a bearer is associated with eps-bearerIdentity or is associated with SDAP configuration information (sdapConfig). cnAssociation may include eps-BearerIdentity when connected to EPC, and may include sdap-Config when connected to 5GC.

DRB list to be released (drb-ToReleaseList): drb-ToReleaseList may include one or more DRB identifiers (DRBIdentity) to be released.

Security configuration information (securityConfig): securityConfig may include security algorithm configuration information (SecurityAlgorithmConfig), or information indicating whether to use a master key (a key for a master cell group (MCG)) or a secondary key (key for a secondary cell group (SCG)) to derive a key for ciphering and/or integrity protection.

Master cell group configuration information (masterCellGroup): masterCellGroupConfig may include at least one of the following information:

Information for identifying a cell group (cellGroupId): CellGroupId may be indicated as one value. For example, when indicated as 0, it may indicate an MCG, and when indicated as another value, it may indicate SCGs.

RLC bearer configuration information list to be added or modified (rlc-BearerToAddModList): rlc-BearerToAddModList may include one or more RLC bearer configuration information (RLC-BearerConfig), and each RLC-BearerConfig may include a logical channel identifier (logicalChannelIdentity), an SRB identifier (srb_Identity) or a DRB identifier (drb-Identity) associated with an RLC bearer, an indicator (reestablishRLC) indicating whether to re-establish an RLC, RLC configuration information (rlc-Config), or MAC-logical channel configuration information (mac-LogicalChannelConfig) including logical channel information.

RLC bearer configuration information list to be released (rlcBearerToReleaseList): rlcBearerToReleaseList may include one or more logicalChannelIdentity associated with an RLC bearer to be released.

MAC cell group configuration information (mac-CellGroupConfig)

PHYSICAL cell group configuration information (physicalCellGroupConfig)

SpCell configuration information (spCellConfig): spCellConfig may include an index (servCellIndex) for identifying SpCell (meaning a primary cell (PCell) of an MCG or a primary SCG cell (PSCell) of an SCG), parameters (reconfigurationWithSync) for synchronous reconfiguration in a target SpCell, information (rlf-TimerAndConstants) on whether to configure or release parameters including a constant value and timer values for detecting and triggering a cell level radio link failure, rlmInSyncOutOfSyncThreshold, or spCellConfigDedicated.

SCell configuration information list to be added or modified (sCellToAddModList)

SCell configuration information list to be released (sCellToReleaseList)

Measurement configuration information (measConfig)

Updated master key configuration information (masterKeyUpdate): masterKeyUpdate may include keySetChangeIndicator, nextHopChainingCount, or a NAS container. masterKeyUpdate may always be included when an RRC connection reconfiguration procedure is performed by using a handover for changing a security algorithm, and may be optionally included when ReconfigurationWithSync is included by other cases.

The message may additionally include dedicatedNAS-MessageList, dedicatedSIB1-Delivery, dedicatedSystemInformationDelivery, or otherConfig. When receiving the RRC connection reconfiguration message, the UE 3e-01 may apply the above information and then may transmit an RRC connection reconfiguration complete message (RRCReconfigurationComplete) to the gNB 3e-02 (3e-60).

FIG. 3F is a diagram for describing a procedure by which a UE performs an RRC connection resume (RRC connection establishment) procedure with a gNB to switch from an RRC inactive mode (RRC idle mode) to an RRC connected mode and a procedure by which the gNB and the UE perform an RRC connection reconfiguration (RRC reconfiguration) procedure, according to an embodiment of the present disclosure.

Referring to FIG. 3F, a UE 3*f*-01 may be in an RRC connected mode (RRC_CONNECTED) by configuring RRC connection with a gNB 3*f*-02 (3*f*-05). When the UE 3*f*-01 has not transmitted or received data for some reason or for a certain period of time in the RRC connected mode, the gNB 3*f*-02 may make the UE 3*f*-01 switch to an RRC inactive mode (RRC_IDLE) by transmitting an RRC connection release message (RRCRelease) that includes suspend configuration information (suspendConfig) to the UE 3*f*-01 (3*f*-10). In the RRC inactive mode, the UE 3*f*-01 may search for and camp on a suitable cell through a cell selection procedure and/or a cell re-selection procedure and may receive system information (3*f*-15).

The UE 3*f*-01 may perform a random access procedure to resume RRC connection with the gNB 3*f*-02. When random access is triggered (3*f*-16), the UE 3*f*-01 may select a PRACH occasion and may transmit a random access preamble to the gNB 3*f*-02 (3*f*-20). When receiving the random access preamble, the gNB 3*f*-02 may transmit a random access response (RAR) message to the UE 3*f*-01 (3*f*-25). The UE 3*f*-01 in the RRC inactive mode may establish reverse transmission synchronization with the gNB 3*f*-02 in operations 3*f*-20 and 3*f*-25.

After establishing the reverse transmission synchronization, the UE 3*f*-01 in the RRC inactive mode may perform an RRC connection resume procedure with the gNB 3*f*-02. First, the UE 3*f*-01 may transmit an RRC connection resume request message (RRCResumeRequest) or an RRC connection resume request 1 message (RRCResumeRequest1) to the gNB 3*f*-02 (3*f*-30). The RRC connection resume request message or the RRC connection resume request 1 message may include a UE identifier (resumeIdentity) for retrieving terminal context from the gNB, resume encryption information (resumeMAC-I), or a cause (resumeCause) for resuming RRC connection. When receiving the RRC connection resume request message or the RRC connection resume request 1 message, the gNB 3*f*-02 may transmit an RRC resume message (RRCResume) to the UE 3*f*-01 (3*f*-35). The message may include radio bearer configuration information (radioBearerConfig), master cell group configuration information (masterCellGroup), and measurement configuration information (measConfig). In detail, the radio bearer configuration information and the master cell group configuration information may include one or more resumed signaling radio bearer (SRB) configuration information, one or more data radio bearers (DRB) configuration information, RLC bearer configuration information thereof, MAC cell group configuration information (mac-CellGroupConfig), and physical cell group configuration information (physicalCellGroupConfig). When receiving the RRC connection resume message, the UE 3*f*-01 may apply the above information and may switch to the RRC connected mode (2*f*-36). After switching to the RRC connected mode, the UE 3*f*-01 may transmit an RRC connection resume complete message (RRCResumeComplete) to the gNB 3*f*-02 through an SRB1 (2*f*-40).

When the RRC connection resume procedure is successfully performed, the gNB 3*f*-02 may transmit a security mode command message (SecurityModeCommand) to the UE 3*f*-01 to activate AS security with the UE 3*f*-01 that is in the RRC connected mode (3*f*-45). When receiving the security mode command message, the UE 3*f*-01 may transmit a security mode complete message (SecurityModeComplete) to the gNB 3*f*-02 (3*f*-50).

The gNB 3*f*-02 may perform an RRC connection reconfiguration (RRC reconfiguration) procedure with the UE 3*f*-01 when or after transmitting the security mode command message or after receiving the security mode complete message. First, the gNB 3*f*-02 may transmit an RRC connection reconfiguration message (RRCReconfiguration) to the UE 3*f*-01 (3*f*-55). The message may include some or all of the following information:

Indicator indicating whether to apply full configuration information (fullConfig)

Radio bearer configuration information (radioBearerConfig): radioBearerConfig may include at least one of the following information:

SRB list to be added or modified (srb-ToAddModList): srb-ToAddModList may include one or more SRB configuration information (SRB-ToAddMod), and each SRB-ToAddMod may include an SRB identifier (srb-Identity), an indicator (reestablishmentPDCP) indicating whether to re-establish a PDCP, an indicator indicating whether to discard a service data unit (SDU) and a protocol data unit (PDU) stored in the UE, or PDCP configuration information (pdcp-Config).

Indicator indicating whether to release an SRB3 (srb3-ToRelease): An SRB3 may be released only through an SRB1, and the SRB3 may be released only when a secondary cell group (SCG) configured in the UE is released and/or only by reconfiguration with sync.

DRB list to be added or modified (drb-ToAddModList): drb-ToAddModList may include one or more DRB configuration information (DRB-ToAddMod), and each DRB-ToAddMod may include a DRB identifier (drb-Identity), an indicator (reestablishmentPDCP) indicating whether to re-establish a PDCP, an indicator (recoverPDCP) indicating whether a PDPC is to perform a recovery procedure, PDCP configuration information (pdcp-Config), or information (cnAssociation) indicating whether a bearer is associated with eps-bearerIdentity or is associated with SDAP configuration information (sdapConfig). cnAssociation may include eps-BearerIdentity when connected to EPC, and may include sdap-Config when connected to 5GC.

DRB list to be released (drb-ToReleaseList): drbToReleaseList may include one or more DRB identifiers (DRBIdentity) to be released.

Security configuration information (securityConfig): securityConfig may include security algorithm configuration information (SecurityAlgorithmConfig), or information indicating whether to use a master key (a key for a master cell group (MCG)) or a secondary key (key for a secondary cell group (SCG)) to derive a key for ciphering and/or integrity protection.

Master cell group configuration information (masterCellGroup): masterCellGroupConfig may include at least one of the following information:

Information for identifying a cell group (cellGroupId): CellGroupId may be indicated as one value. For example, when indicated as 0, it may indicate an MCG, and when indicated as another value, it may indicate SCGs.

RLC bearer configuration information list to be added or modified (rlc-BearerToAddModList): rlc-BearerToAddModList may include one or more RLC bearer configuration information (RLC-BearerConfig), and each RLC-BearerConfig may include a logical channel identifier (logicalChannelIdentity), an SRB identifier (srb_Identity) or a DRB identifier (drb-Identity) associated with an RLC bearer, an indicator (reestablishRLC) indicating whether to re-establish an RLC, RLC configuration information (rlc-Config), or MAC-logical channel configuration information (mac-LogicalChannelConfig) including logical channel information.

RLC bearer configuration information list to be released (rlcBearerToReleaseList): rlcBearerToReleaseList may include one or more logicalChannelIdentity associated with an RLC bearer to be released.

MAC cell group configuration information (mac-CellGroupConfig)

PHYSICAL cell group configuration information (physicalCellGroupConfig)

SpCell configuration information (spCellConfig): spCellConfig may include an index (servCellIndex) for identifying SpCell (meaning a primary cell (PCell) of an MCG or a primary SCG cell (PSCell) of an SCG), parameters (reconfigurationWithSync) for synchronous reconfiguration in a target SpCell, information (rlfTimerAndConstants) on whether to configure or release parameters including a constant value and timer values for detecting and triggering a cell level radio link failure, rlmInSyncOutOfSyncThreshold, or spCellConfigDedicated.

SCell configuration information list to be added or modified (sCellToAddModList)

SCell configuration information list to be released (sCellToReleaseList)

Measurement configuration information (measConfig)

Updated master key configuration information (masterKeyUpdate): masterKeyUpdate may include keySetChangeIndicator, nextHopChainingCount, or a NAS container. masterKeyUpdate may always be included when an RRC connection reconfiguration procedure is performed by using a handover for changing a security algorithm, and may be optionally included when ReconfigurationWithSync is included by other cases.

The message may additionally include dedicatedNAS-MessageList, dedicatedSIB1-Delivery, dedicatedSystemInformationDelivery, or otherConfig. When receiving the RRC connection reconfiguration message, the UE 3*f*-01 may apply the above information and may transmit an RRC connection reconfiguration complete message (RRCReconfigurationComplete) to the gNB 3*f*-02 (3*f*-60).

FIG. 3G is a flowchart of a UE operation according to a condition in which a radio bearer configuration is indicated, when a terminal in an RRC connected mode (RRC_CONNECTED) receives an RRCReconfiguration message from a base station, according to an embodiment of the present disclosure.

In operation 3*g*-05, a terminal in an RRC idle mode (RRC_IDLE) or an RRC inactive mode (RRC_INACTIVE) may receive an RRCSetup message from a base station.

In operation 3*g*-10, the terminal may configure an SRB1 by applying the received RRCSetup message. The terminal may transition to an RRC connected mode. In an embodiment, when an SRB2 is not configured and only the SRB1 is configured, the base station and the terminal may transmit/receive an RRC message including a NAS message through the SRB1. In another embodiment, when the SRB2 is not configured and only the SRB1 is configured, the terminal transmits MDT-related information to the base station through the SRB1.

In operation 3*g*-15, the terminal transitioning to the RRC connected mode may receive an RRCReconfiguration message from the base station.

In operation 3*g*-20, the terminal may determine whether an ath event, a bth event, or a cth event described below occurs based on the received RRCReconfiguration message.
  ath event: when SRB2 and DRB are indicated to be configured
  bth event: when only DRB is indicated to be configured
  cth event: when only SRB2 is indicated to be configured When the SRB2 is indicated by the base station, the terminal may configure up to one SRB2. When the DRB is indicated by the base station, the terminal may configure up to n DRBs.

When it is determined in operation 3*g*-20 that the cth event occurs, in operation 3*g*-25, the terminal may initiate an operation of transitioning to an RRC idle mode state. When the operation of transitioning to the RRC idle mode state is initiated but security is not activated, the terminal may not perform a NAS recovery procedure by setting a release cause for releasing RRC connection as 'other'. When the operation of transitioning to the RRC idle mode state is initiated and AS security is activated, the terminal may perform a NAS recovery procedure by setting a cause for releasing RRC connection as 'RRC connection failure'.

When it is determined in operation 3*g*-20 that the ath event or the bth event occurs, in operation 3*g*-30, the terminal may determine whether a first event, a second event, a third event, or a fourth event occurs.
  First event: when reconfigurationWithSync is included in the received RRCReconfiguration message, and security is activated
  Second event: when reconfigurationWithSync is included in the received RRCReconfiguration message, and security is not activated
  Third event: when some or all configurations indicated in the received RRCReconfiguration message may not be performed, and security is activated
  Fourth event: when some or all configurations indicated in the received RRCReconfiguration message may not be performed, and security is not activated When the terminal may not perform some or all configurations indicated in the received RRCReconfiguration message (the third event and the fourth event), the terminal may regard it as a reconfiguration failure. When the terminal may not perform some or all configurations indicated in the received RRCReconfiguration message, the terminal may continue to use configuration information used before the RRCReconfiguration message is received.

When it is determined in operation 3*g*-30 that the first event occurs, in operation 3*g*-35, the terminal may perform an RRCReconfiguration operation. For example, the terminal may transmit an RRCReconfigurationComplete message to the base station. In an embodiment, when the RRCReconfiguration message including content corresponding to the bth event is received, the terminal determines whether reconfigurationWithSync is included in the received RRCReconfiguration message and determines whether security is activated. When reconfigurationWithSync is included in the received RRCReconfiguration message and security is activated, the terminal may perform an RRCReconfiguration operation, and may transmit the RRCReconfigurationComplete message to the base station.

When it is determined in operation 3*g*-30 that the second event occurs, in operation 3*g*-40, the terminal may initiate an operation of transitioning to an RRC idle mode state. When the operation of transitioning to the RRC idle mode state is initiated, the terminal may not perform a NAS recovery procedure by setting a release cause for releasing RRC connection as 'other'.

In an embodiment, when the RRCReconfiguration message including content corresponding to the bth event is received, the terminal determines whether reconfigurationWithSync is included in the received RRCReconfiguration message and determines whether security is activated. When reconfigurationWithSync is included in the received RRCReconfiguration message and security is not activated, the terminal may perform an operation of transitioning to an RRC idle state.

When it is determined in operation 3*g*-30 that the third event occurs, in operation 3*g*-45, the terminal may initiate an RRC connection re-establishment procedure to the base station. In an embodiment, when the RRCReconfiguration message including content corresponding to the bth event is received, the terminal determines whether some or all of configurations included in the received RRCReconfiguration message may be performed. When it is determined that at least some of the configurations included in the received RRCReconfiguration message may not be performed and security is activated, the terminal may perform an RRCReconfiguration operation, and may initiate an RRC connection re-establishment procedure by transmitting an RRCReconfigurationComplete message to the base station.

When it is determined in operation 3*g*-30 that the fourth event occurs, in operation 3*g*-50, the terminal may initiate an operation of transitioning to the RRC idle mode state. When the operation of transitioning to the RRC idle mode state is initiated, the terminal may not perform a NAS recovery procedure by setting a release cause for releasing RRC connection as 'other'. In an embodiment, when the RRCReconfiguration message including content corresponding to the bth event is received, the terminal determines whether some or all of configurations included in the received RRCReconfiguration message may be performed. When it is determined that at least some of the configurations included in the received RRCReconfiguration message may not be performed and security is not activated, the terminal may perform an operation of transitioning to the RRC idle state.

FIG. 3H is a flowchart of a UE operation according to a pre-configured radio bearer configuration, when a terminal in an RRC connected mode (RRC_CONNECTED) receives an RRCRelease including suspend configuration information (suspendConfig) from a base station, according to an embodiment of the present disclosure.

In operation 3h-05, a terminal in an RRC idle mode (RRC_IDLE) or an RRC inactive mode (RRC_INACTIVE) may receive an RRCSetup message from a base station.

In operation 3h-10, the terminal may configure an SRB1 by applying the received RRCSetup message. The terminal may transition to an RRC connected mode. In an embodiment, when an SRB2 is not configured and only the SRB1 is configured, the base station and the terminal may transmit/receive an RRC message including a NAS message through the SRB1. In another embodiment, when the SRB2 is not configured and only the SRB1 is configured, the terminal transmits MDT-related information to the base station through the SRB1.

In operation 3h-15, the terminal transitioning to the RRC connected mode after operation 3h-10 may receive an RRCRelease message not including suspendConfig from the base station.

In operation 3h-20, the terminal may initiate an operation of transitioning to an RRC idle mode state. When the operation of transitioning to the RRC idle mode state is initiated but security is not activated, the terminal may not perform a NAS recovery procedure by setting a release cause for releasing RRC connection as 'other'. When the operation of transitioning to the RRC idle mode state is initiated and AS security is activated, the terminal may perform a NAS recovery procedure by setting a cause for releasing RRC connection as 'RRC connection failure'.

Alternatively, after transitioning to the RRC connected mode in operation 3h-10, in operation 3h-25, the terminal may receive an RRCReconfiguration message from the base station.

In operation 3h-30, the terminal may determine whether an ath event, a bth event, or a cth event described below occurs based on the received RRCReconfiguration message.
  ath event: when SRB2 and DRB are indicated to be configured
  bth event: when only DRB is indicated to be configured
  cth event: when only SRB2 is indicated to be configured
  When the SRB2 is indicated by the base station, the terminal may configure up to one SRB2. When the DRB is indicated by the base station, the terminal may configure up to n DRBs.

When it is determined in operation 3h-30 that the cth event occurs, in operation 3h-35, the terminal may initiate an operation of transitioning to an RRC idle mode state. When the operation of transitioning to the RRC idle mode state is initiated but security is not activated, the terminal may not perform a NAS recovery procedure by setting a release cause for releasing RRC connection as 'other'. When the operation of transitioning to the RRC idle mode state is initiated and AS security is activated, the terminal may perform a NAS recovery procedure by setting a cause for releasing RRC connection as 'RRC connection failure'.

When it is determined in operation 3h-30 that the ath event or the bth event occurs, in operation 3h-40, the terminal may receive an RRCRelease message including suspendConfig from the base station.

In operation 3h-45, when it is determined that the ath event or the bth event occurs and the RRCRelease message including suspendConfig is received, the terminal may transition to an RRC inactive state. In an embodiment, when the RRCReconfiguration message including content corresponding to the bth event is received, the DRB is configured, and the terminal receives the RRCRelease message, the terminal determines whether the message includes suspendConfig. When the received RRCRelease message is received and includes suspendConfig, the terminal may perform an operation of transitioning to an RRC inactive state.

In operation 3h-50, when the terminal receives a message relate to an indication for performing RRC connection resume from the base station or the terminal determines that an RRC connection resume process is necessary, the terminal may initiate an RRC connection resume procedure.

FIG. 3I is a flowchart of a UE operation according to a configured radio bearer, when a terminal in an RRC connected mode (RRC_CONNECTED) detects a radio link failure (RLF), according to an embodiment of the present disclosure.

In operation 3i-05, a terminal in an RRC idle mode (RRC_IDLE) or an RRC inactive mode (RRC_INACTIVE) may receive an RRCSetup message from a base station.

In operation 3i-10, the terminal may configure an SRB1 by applying the received RRCSetup message. The terminal may transition to an RRC connected mode. In an embodiment, when an SRB2 is not configured and only the SRB1 is configured, the base station and the terminal may transmit/receive an RRC message including a NAS message through the SRB1. In another embodiment, when the SRB2 is not configured and only the SRB1 is configured, the terminal transmits MDT-related information to the base station through the SRB1.

When the terminal transitioning to the RRC connected mode after operation 3i-10 detects an RLF, in operation 3i-15, the terminal may initiate an operation of transitioning to an RRC idle mode state. When the operation of transitioning to the RRC idle mode state is initiated and security is not activated, the terminal may not perform a NAS recovery procedure by setting a release cause for releasing RRC connection as 'other'.

When the operation of transitioning to the RRC idle mode state is initiated and AS security is activated, the terminal may perform a NAS recovery procedure by setting a cause for releasing RRC connection as 'RRC connection failure'.

Alternatively, in operation 3i-20, the terminal transitioning to the RRC connected mode after operation 3i-10 may receive an RRCReconfiguration message from the base station.

In operation 3i-25, the terminal may determine whether an ath event, a bth event, or cth event described below occurs based on the received RRCReconfiguration message.
  ath event: when SRB2 and DRB is indicated to be configured
  bth event: when only DRB is indicated to be configured
  cth event: when only SRB2 is indicated to be configured
  When the SRB2 is indicated by the base station, the terminal may configure up to one SRB2. When the DRB is indicated by the base station, the terminal may configure up to n DRBs.

When it is determined in operation 3i-25 that the cth event occurs, in operation 3i-30, the terminal may initiate an operation of transitioning to an RRC idle mode state. When the operation of transitioning to the RRC idle mode state is initiated and security is not activated, the terminal may not perform a NAS recovery procedure by setting a release cause for releasing RRC connection as 'other'. When the operation of transitioning to the RRC idle mode state and AS security is activated, the terminal may perform a NAS recovery procedure by setting a cause for releasing RRC connection as 'RRC connection failure'.

When it is determined in operation 3*i*-25 that an RLF is detected and the ath event or the bth event occurs, in operation 3*i*-35, the terminal may determine whether a first event or a second event described below occurs.

First event: when security is not activated
Second event: when security is activated When it is determined in operation 3*i*-35 that an RLF is detected and the first event occurs, in operation 3*i*-40, the terminal may initiate an RRC connection re-establishment procedure to the base station.

When it is determined in operation 3*i*-35 that an RLF is detected and the second event occurs, in operation 3*i*-45, the terminal may initiate an operation of transitioning to an RRC idle mode state. When the operation of transitioning to the RRC idle mode state is initiated, the terminal may not perform a NAS recovery procedure by setting a release cause for releasing RRC connection as 'other'.

FIG. 3J is a block diagram illustrating a structure of a terminal according to an embodiment of the present disclosure.

According to an embodiment of the present disclosure, the terminal may include a radio frequency (RF) processor 3*j*-10, a baseband processor 3*j*-20, a storage 3*j*-30, and a controller 3*j*-40.

According to an embodiment of the present disclosure, the RF processor 3*j*-10 may perform a function for transmitting/receiving a signal through a wireless channel such as band conversion and amplification of a signal.

That is, the RF processor 3*j*-10 may up-convert a baseband signal applied from the baseband processor 3*j*-20 into an RF band signal and then may transmit the RF band signal through an antenna, and may down-convert an RF band signal received through the antenna into a baseband signal. For example, the RF processor 3*j*-10 may include a transmission filter, a reception filter, an amplifier, a mixer, an oscillator, a digital-to-analog converter (DAC), an analog-to-digital converter (ADC), and the like.

Although only one antenna is shown in FIG. 3J, the terminal may include a plurality of antennas.

Also, the RF processor 3*j*-10 may include a plurality of RF chains. Furthermore, the RF processor 3*j*-10 may perform beamforming. For the beamforming, the RF processor 3*j*-10 may adjust a phase and size of each of signals transmitted/received through a plurality of antennas or antenna elements. Also, the RF processor 3*j*-10 may perform MIMO, and may receive multiple layers during a MIMO operation. The RF processor 3*j*-10 may perform reception beam sweeping by appropriately configuring a plurality of antennas or antenna elements under the control of the controller 3*j*-40, or may adjust a direction and beam width of a reception beam so that the reception beam is coordinated with a transmission beam.

The baseband processor 3*j*-20 may perform conversion between a baseband signal and a bit string according to a physical layer specification of a system. For example, during data transmission, the baseband processor 3*j*-20 may generate complex symbols by encoding and modulating a transmitted bit string. Also, during data reception, the baseband processor 3*j*-20 may recover a received bit string by demodulating and decoding a baseband signal applied from the RF processor 3*j*-10. For example, according to an orthogonal frequency division multiplexing (OFDM) scheme, the baseband processor 3*j*-20 may generate complex symbols by encoding and modulating a transmitted bit string, may map the complex symbols to subcarriers, and then may construct OFDM symbols through an inverse fast Fourier transform (IFFT) operation and cyclic prefix (CP) insertion. Also, during data reception, the baseband processor 3*j*-20 may divide a baseband signal applied from the RF processor 3*j*-10 into OFDM symbol units, may recover signals mapped to subcarriers through a fast Fourier transform (FFT) operation, and then may recover a received bit string through demodulation and decoding.

The baseband processor 3*j*-20 and the RF processor 3*j*-10 may transmit and receive a signal as described above. Accordingly, each of the baseband processor 3*j*-20 and the RF processor 3*j*-10 may be referred to as a transmitter, a receiver, a transceiver, or a communication unit. Furthermore, at least one of the baseband processor 3*j*-20 and the RF processor 3*j*-10 may include a plurality of communication modules to support a plurality of different radio access technologies. Also, at least one of the baseband processor 3*j*-20 and the RF processor 3*j*-10 may include different communication modules to process signals in different frequency bands. For example, the different radio access technologies may include an LTE network, an NR network, and the like. Also, the different frequency bands may include a super high frequency (SHF) band (e.g., 2.2 GHz or 2 GHz), and a millimeter wave band (e.g., 60 GHz).

The storage 3*j*-30 may store data such as a default program, an application program, or configuration information for operating the terminal. The storage 3*j*-30 may provide the stored data according to a request of the controller 3*j*-40.

The controller 3*j*-40 may control overall operations of the terminal. For example, the controller 3*j*-40 may transmit/receive a signal through the baseband processor 3*j*-20 and the RF processor 3*j*-10. Also, the controller 3*j*-40 may record data to and read data from the storage 3*j*-40. To this end, the controller 3*j*-40 may include at least one processor. For example, the controller 3*j*-40 may include a communication processor (CP) for performing communication control and an application processor (AP) for controlling an upper layer such as an application program.

FIG. 3N is a block diagram 3*n*00 of an electronic device 3*n*-001 for supporting legacy network communication and 5G network communication, according to various embodiments. The electronic device 3*n*-001 may include a first communication processor 3*n*-12, a second communication processor 3*n*-14, a first radio frequency integrated circuit (RFIC) 3*n*-22, a second RFIC 3*n*-24, a third RFIC 3*n*-26, a fourth RFIC 3*n*-28, a first radio frequency front end (RFFE) 3*n*-32, a second RFFE 3*n*-34, a first antenna module 3*n*-42, a second antenna module 3*n*-44, and an antenna 3*n*-48.

The electronic device 3*n*-001 may further include a processor 3*n*-20 and a memory 3*n*-30. The network 3*n*-99 includes a first network 3*n*-92 and a second network 3*n*-94. According to another embodiment, the electronic device 3*n*-001 may further include at least one of components described in 3*n*0, and the network 3*n*-99 may further include at least one other network. According to an embodiment[d2], the first communication processor 3*n*-12, the second communication processor 3*n*-14, the first RFIC 3*n*-22, the second RFIC 3*n*-24, the fourth RFIC 3*n*-28, the first RFFE 3*n*-32, and the second RFFE 3*n*-34 may form at least a part of a wireless communication module 3*n*-092. According to another embodiment, the fourth RFIC 3*n*-28 may be omitted, or may be included as a part of the third RFIC 3*n*-26.

The first communication processor 3n-12 may support the establishment of a communication channel of a band to be used for wireless communication with the first network 3n-92 and legacy network communication through the established communication channel. According to various embodiments, the first network 3n-92 may be a legacy network including a 2G, 3G, 4G, and/or long term evolution (LTE) network. The second communication processor 3n-14 may support the establishment of a communication channel corresponding to a designated band (e.g., about 6 GHz to about 60 GHz) among bands to be used for wireless communication with the second network 3n-94 and 5G network communication through the established communication channel. According to various embodiments, the second network 3n-94 may be 5G network defined in the 3GPP. Additionally, according to an embodiment, the first communication processor 3n-12 or the second communication processor 3n-14 may support establishment of a communication channel corresponding to another designated band (e.g., about 6 GHz or lower) among the bands to be used for wireless communication with the second network 3n-94 and 5G network communication through the established communication channel. According to an embodiment, the first communication processor 3n-12 and the second communication processor 3n-14 may be implemented within a single chip or a single package. According to various embodiments, the first communication processor 3n-12 or the second communication processor 3n-14 may be formed within a single chip or a single package with the processor 3n-20, an auxiliary processor 3n023, or a communication module 3n090.

During transmission, the first RFIC 3n-22 may convert a baseband signal generated by the first communication processor 3n-12 into a radio frequency (RF) signal of about 700 MHz to about 3 GHz used for the first network 3n-92 (e.g., a legacy network). During reception, the RF signal may be obtained from the first network 3n-92 via an antenna (e.g., the first antenna module 3n-42), and may be preprocessed via an RFFE (e.g., the first RFFE 3n-32). The first RFIC 3n-22 may convert the preprocessed RF signal into a baseband signal so as to be processed by the first communication processor 3n-12.

During transmission, the second RFIC 3n-24 may convert a baseband signal generated by the first communication processor 3n-12 or the second communication processor 3n-14 into an RF signal (hereinafter referred to as a "5G sub-6 RF signal") in a sub-6 band (e.g., about 6 GHz or lower) used in the second network 3n-94 (e.g., a 5G network). During reception, the 5G sub-6 RF signal may be obtained from the second network 3n-94 (e.g., a 5G network) via an antenna (e.g., the second antenna module 3n-44), and may be preprocessed via an RFFE (e.g., the second RFFE 3n-34). The second RFIC 3n-24 may convert the preprocessed 5G sub-6 RF signal into a baseband signal so as to be processed by a communication processor corresponding to the 5G sub-6 RF signal from among the first communication processor 3n-12 and the second communication processor 3n-14.

The third RFIC 3n-26 may convert a baseband signal generated by the second communication processor 3n-14 into an RF signal (hereinafter referred to as a "5G above-6 RF signal") in a 5G above-6 band (e.g., about 6 GHz to about 60 GHz) to be used in the second network 3n-94 (e.g., a 5G network). During reception, the 5G above-6 RF signal may be obtained from the second network 3n-94 via the antenna 3n-48, and may be preprocessed via a third RFFE 3n-36. The third RFIC 3n-26 may convert the preprocessed 5G above-6 RF signal into a baseband signal so as to be processed by the second communication processor 3n-14. According to an embodiment, the third RFFE 3n-36 may be formed as a part of the third RFIC 3n-26.

According to an embodiment, the electronic device 3n-001 may include the fourth RFIC 3n-28 that is independent of the third RFIC 3n-26 or is at least a part of the third FRIC 3n-26. In this case, the fourth RFIC 3n-28 may convert a baseband signal generated by the second communication processor 3n-14 into an RF signal (hereinafter referred to as an intermediate frequency (IF) signal) of an intermediate frequency band (e.g., about 9 GHz to about 13 GHz), and then may transmit the IF signal to the third RFIC 3n-26. The third RFIC 3n-26 may convert the IF signal into a 5G above-6 RF signal. During reception, the 5G above-6 RF signal may be received from the second network 3n-94 (e.g., a 5G network) via an antenna (e.g., the antenna 3n-48) and may be converted into an IF signal by the third RFIC 3n-26. The fourth RFIC 3n-28 may convert the IF signal into a baseband signal so as to be processed by the second communication processor 3n-14.

According to an embodiment, the first RFIC 3n-22 and the second RFIC 3n-24 may be implemented as at least a part of a single chip or a single package. According to an embodiment, the first REFE 3n-32 and the second REFE 3n-34 may be implemented as at least a part of a single chip or a single package. According to an embodiment, at least one of the first antenna module 3n-42 and the second antenna module 3n-44 may be omitted or may be combined with any other antenna module to process RF signals of a plurality of bands.

According to an embodiment, the third RFIC 3n-26 and the antenna 3n-48 may be located on the same substrate to form a third antenna module 3n-46. For example, the wireless communication module 3n-092 or the processor 3n-20 may be located on a first substrate (e.g., a main printed circuit board (PCB)). In this case, the third RFIC 3n-26 may be located on a portion (e.g., on a bottom surface) of a second substrate (e.g., a sub-PCB) independent of the first substrate and the antenna 3n-48 may be located on another portion (e.g., on a top surface) of the second substrate, so as to form the third antenna module 3n-46. According to an embodiment, the antenna 3n-48 may include, for example, an antenna array that may be used for beamforming. Because the third RFIC 3n-26 and the antenna 3n-48 are located on the same, a length of a transmission line between the third RFIC 3n-26 and the antenna 3n-48 may be reduced. For example, the loss (or attenuation) of a signal in a high-frequency band (e.g., about 6 GHz to about 60 GHz) used for 5G network communication due to the transmission line may be reduced. Accordingly, the electronic device 3n-001 may improve the quality or speed of communication with the second network 3n-94 (e.g., a 5G network).

The second network 3n-94 (e.g., a 5G network) may be used independently of the first network 3n-92 (e.g., a legacy network) (e.g., stand-alone (SA)), or may be used in conjunction with the first network 3n-92 (e.g., non-stand alone (NSA)). For example, only an access network (e.g., a 5G radio access network (RAN) or a next generation RAN (NG RAN)) may be present in a 5G network, and a core network (e.g., a next generation core (NGC)) may not be present in the 5G network. In this case, the electronic device 3n-001 may access the access network of the 5G network, and then may access an external network (e.g., the Internet) under control of the core network (e.g., an evolved packed core (EPC)) of a legacy network. Protocol information (e.g., LTE protocol information) for communication with the legacy network or protocol information (e.g., NR protocol information) for communication with the 5G network may be stored in the memory 3n-30, and may be accessed by another component (e.g., the processor 3n-20, the first communication processor 3n-12, or the second communication processor 3n-14).

FIG. 3K is a block diagram illustrating a structure of a base station according to an embodiment of the present disclosure. A base station according to an embodiment of the present disclosure may include a transmission/reception point (TRP).

The base station according to an embodiment of the present disclosure may include an RF processor 3k-10, a baseband processor 3k-20, a backhaul communication unit 3k-30, a storage 3k-40, and a controller 3k-50.

The RF processor 3k-10 may perform a function of transmitting/receiving a signal through a wireless channel such as band conversion and amplification of a signal. That is, the RF processor 3k-10 may up-convert a baseband signal applied from the baseband processor 3k-20 into an RF band signal and then may transmit the RF band signal through an antenna, and may down-convert an RF band signal received through the antenna into a baseband signal. For example, the RF processor 3k-10 may include a transmission filter, a reception filter, an amplifier, a mixer, an oscillator, a DAC, an ADC, and the like. Although only one antenna is shown in FIG. 3K, a first access node may include a plurality of antennas. Also, the RF processor 3k-10 may include a plurality of RF chains. Furthermore, the RF processor 3k-10 may perform beamforming. For the beamforming, the RF processor 3k-10 may adjust a phase and size of each of signals transmitted/received through a plurality of antennas or antenna elements. The RF processor 3k-10 may perform a downlink MIMO operation by transmitting one or more layers.

The baseband processor 3k-20 may perform a conversion function between a baseband signal and a bit string according to a physical layer specification of first radio access technology. For example, during data transmission, the baseband processor 3k-20 may generate complex symbols by encoding and modulating a transmitted bit string. Also, during data reception, the baseband processor 3k-20 may recover a received bit string by demodulating and decoding a baseband signal applied from the RF processor 3k-10. For example, according to an OFDM scheme, during data transmission, the baseband processor 3k-20 may generate complex symbols by encoding and modulating a transmitted bit string, may map the complex symbols to subcarriers, and then may construct OFDM symbols through an IFFT operation and CP insertion. Also, during data reception, the baseband processor 3k-20 may divide a baseband signal applied from the RF processor 3k-10 into OFDM symbol units, may recover signals mapped to subcarriers through an FFT operation, and then may recover a received bit string through demodulation and decoding. The baseband processor 3k-20 and the RF processor 3k-10 may transmit and receive a signal as described above. Accordingly, each of the baseband processor 3k-20 and the RF processor 3k-10 may be referred to as a transmitter, a receiver, a transceiver, a communication unit, or a wireless communication unit.

The communication unit 3k-30 may provide an interface for performing communication with other nodes in a network.

The storage 3k-40 may store data such as a default program, an application program, or configuration information for operating a primary base station. In particular, the storage 3k-40 may store information on a bearer allocated to an accessed terminal, a measurement result reported from the accessed terminal, and the like. Also, the storage 3k-40 may store information that is a criterion for determining whether to provide or stop multiple connections to the terminal. The storage 3k-40 may provide the stored data according to a request of the controller 3k-50.

The controller 3k-50 may control overall operations of the primary base station. For example, the controller 3k-50 may transmit/receive a signal through the baseband processor 3k-20 and the RF processor 3k-10 or through the backhaul communication unit 3k-30. Also, the controller 3k-50 may record data to and read data from the storage 3k-40. To this end, the controller 3k-50 may include at least one processor. Each of the storage 3k-20 and the RF processor 3k-10 may be referred to as a transmitter, a receiver, a transceiver, a communication unit, or a wireless communication unit.

The communication unit 3k-30 may provide an interface for performing communication with other nodes in a network.

The storage 3k-40 may store data such as a default program, an application program, or configuration information for operating the primary base station. In particular, the storage 3k-40 may store information on a bearer allocated to the accessed terminal, a measurement result reported from the accessed terminal, and the like. Also, the storage 3k-40 may store information that is a criterion for determining whether to provide or stop multiple connections to the terminal. The storage 3k-40 may provide the stored data according to a request of the controller 3k-50.

The controller 3k-50 may control overall operations of the primary base station. For example, the controller 3k-50 may transmit/receive a signal through the baseband processor 3k-20 and the RF processor 3k-10 or through the backhaul communication unit 3k-30. Also, the controller 3k-50 may record data to and read data from the storage 3k-40. To this end, the controller 3k-50 may include at least one processor.

The methods according to the claims or embodiments of the present disclosure described herein may be implemented in the form of hardware, software, or a combination of hardware and software.

When the methods are implemented by software, a computer-readable storage medium for storing one or more programs (software modules) may be provided. The one or more programs stored in the computer-readable storage medium are configured to be executable by one or more processors in an electronic device. The one or more programs include instructions for allowing the electronic device to execute the methods according to the claims or embodiments of the present disclosure described herein.

These programs (software modules or software) may be stored in a random-access memory (RAM), a non-volatile memory including a flash memory, a read-only memory (ROM), an electrically erasable programmable read only memory (EEPROM), a magnetic disc storage device, a compact disc (CD)-ROM, a digital versatile disc (DVD), another optical storage device, or a magnetic cassette. Alternatively, the programs may be stored in a memory configured by combining some or all of them. Also, each constituent memory may include a plurality of memories.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may connect to a device according to embodiments of the disclosure through an external port. Also, a separate storage device on a communication network may connect to a device according to embodiments of the present disclosure.

In specific embodiments of the disclosure described above, components included in the present disclosure were expressed as singular or plural in accordance with the specific embodiments of the disclosure set forth. However, singular or plural representations are selected appropriately for the sake of convenience of explanation, the present disclosure is not limited to the singular or plural constituent elements, and even expressed as a singular element, it may be composed of plural elements, and vice versa.

Although specific embodiments of the present disclosure are described in the detailed description, various modifications may be made without departing from the scope of the present disclosure. Hence, the scope of the present disclosure is not limited to the above embodiments, and may be defined by not only the following claims but also equivalents thereof.

The invention claimed is:

1. A method by which a first terminal performs communication in a wireless communication system, the method comprising:
receiving, from a base station, risk area information including synchronization signal block (SSB) identification information corresponding to a risk area;
performing SSB measurement for at least one SSB received from the base station;
identifying an SSB among the at least one SSB, based on the SSB measurement;
in case that the first terminal is located in the risk area, obtaining pedestrian-to-vehicle (P2V) data based on the SSB identification information corresponding to the identified SSB; and
transmitting, to a second terminal, the P2V data, on a resource allocated to the first terminal by the base station.

2. The method of claim 1, further comprising:
in case that the risk area information comprises location information of the risk area,
determining whether the first terminal is located in the risk area, by comparing the location information of the risk area with location information of the first terminal.

3. The method of claim 1,
wherein the identifying the SSB among the at least one SSB comprises:
identifying the SSB in which a reference signal received power (RSRP) exceeds a threshold value, based on the SSB measurement.

4. The method of claim 1, wherein the receiving of the risk area information comprises receiving the risk area information through at least one of system information, a paging signal, and a short message.

5. The method of claim 4, wherein the receiving of the risk area information comprises:
obtaining the SSB identification information corresponding to the risk area from the system information or the paging signal; and
receiving a short message indicating that the first terminal is located in the risk area in an area covered by the SSB corresponding to the risk area.

6. A method by which a base station performs communication in a wireless communication system, the method comprising:
transmitting risk area information including synchronization signal block (SSB) identification information corresponding to a risk area;
transmitting at least one synchronization signal block (SSB);
in case that a first terminal is located in the risk area, receiving a pedestrian-to-vehicle (P2V) transmission resource allocation request from the first terminal based on the at least one SSB and the SSB identification information corresponding to the risk area; and
allocating a P2V transmission resource to the first terminal, based on the P2V transmission resource allocation request.

7. The method of claim 6, wherein the transmitting of the risk area information comprises transmitting the risk area information through at least one of a paging signal and a short message to a cover area of the SSB corresponding to the risk area.

8. A first terminal for performing communication in a wireless communication system, the first terminal comprising:
a transceiver; and
a processor coupled with the transceiver and configured to:
receive, from a base station, risk area information including synchronization signal block (SSB) identification information corresponding to a risk area,
perform SSB measurement for at least one SSB received from the base station,
identify an SSB among the at least one SSB, based on the SSB measurement,
in case that the first terminal is located in the risk area, obtain pedestrian-to-vehicle (P2V) data based on the identified SSB and the SSB identification information corresponding to the risk area, and
transmit, to a second terminal, the P2V data, on a resource allocated to the first terminal by the base station.

9. The first terminal of claim 8, wherein the risk area information is information indicating whether the first terminal is located in the risk area.

10. The first terminal of claim 8,
wherein the processor is further configured to, in case that the risk area information comprises location information of the risk area, determine whether the first terminal is located in the risk area, by comparing the location information of the risk area with location information of the first terminal.

11. The first terminal of claim 8, wherein the processor is further configured to identify the SSB in which a reference signal received power (RSRP) exceeds a threshold value, based on the SSB measurement.

12. The first terminal of claim 8, wherein the processor is further configured to control the transceiver to receive the risk area information through at least one of system information, a paging signal, and a short message.

13. The first terminal of claim 12, wherein the processor is further configured to:
obtain the SSB identification information corresponding to the risk area from the system information or the paging signal; and
control the transceiver to receive a short message indicating that the first terminal is located in the risk area in an area covered by the SSB corresponding to the risk area.

14. A base station for performing communication in a wireless communication system, the base station comprising:
a transceiver; and
a processor coupled with the transceiver and configured to:

control the transceiver to transmit risk area information including synchronization signal block (SSB) identification information corresponding to a risk area, transmit at least one synchronization signal block (SSB), in case that a first terminal is located in the risk area, receive a pedestrian-to-vehicle (P2V) transmission resource allocation request from the first terminal based on the at least one SSB and the SSB identification information corresponding to the risk area, and allocate a P2V transmission resource to the first terminal, based on the P2V transmission resource allocation request.

* * * * *